(12) United States Patent
Petersen

(10) Patent No.: US 6,891,343 B2
(45) Date of Patent: May 10, 2005

(54) MULTIPHASE MOTORS WITH SINGLE POINT SENSING BASED COMMUTATION

(75) Inventor: Christian C. Petersen, Sandwich, MA (US)

(73) Assignee: Petersen Technology Corporation, Bourne, MA (US)

( * ) Notice: Subject to any disclaimer, the term of this patent is extended or adjusted under 35 U.S.C. 154(b) by 0 days.

(21) Appl. No.: 10/706,412

(22) Filed: Nov. 12, 2003

(65) Prior Publication Data

US 2004/0178757 A1 Sep. 16, 2004

Related U.S. Application Data

(60) Provisional application No. 60/454,767, filed on Mar. 14, 2003.

(51) Int. Cl.[7] .............................................. H02P 1/18
(52) U.S. Cl. ...................... 318/254; 318/439; 318/138
(58) Field of Search ................................ 318/138, 254, 318/439

(56) References Cited

U.S. PATENT DOCUMENTS

| | | | |
|---|---|---|---|
| 4,558,264 A | * 12/1985 | Weischedel | ................. 318/254 |
| 4,814,677 A | * 3/1989 | Plunkett | ..................... 318/254 |
| 5,105,115 A | 4/1992 | Shinryo et al. | |
| 5,519,270 A | 5/1996 | Yamada et al. | |
| 5,536,985 A | 7/1996 | Ward et al. | |
| 5,675,231 A | * 10/1997 | Becerra et al. | ............. 318/801 |
| 5,821,708 A | * 10/1998 | Williams et al. | ............ 318/254 |
| 5,859,519 A | * 1/1999 | Archer | ....................... 318/801 |
| 6,104,113 A | * 8/2000 | Beifus | ...................... 310/68 B |
| 6,232,681 B1 | 5/2001 | Johnston et al. | |
| 6,271,638 B1 | * 8/2001 | Erdman et al. | ............. 318/439 |
| 6,479,957 B1 | * 11/2002 | Erdman et al. | ............. 318/254 |
| 6,762,575 B2 | * 7/2004 | Douglas | ..................... 318/254 |

* cited by examiner

*Primary Examiner*—Rina Duda
(74) *Attorney, Agent, or Firm*—Mueller and Smith, LPA

(57) ABSTRACT

System, method and apparatus for commutating a multiphase motor utilizing a single sensor. Commutation is carried out by employing a sensible system which incorporates phase commutating transition attributes. A motor is started by assigning a starting phase for a given direction of motor direction. An aligning phase initially is energized to orient the rotor so as to provide adequate starting phase start-up torque. Following such alignment and start-up, the motor is operated in response to transitions of the sensible system. In one aspect, a reference phase attribute may be incorporated in the sensible system to provide a mandated reference phase energization when the rotor is oriented for reference phase activation. Further described is a sensible system magnetic region configuration which is combined with a single package Hall effect sensor to provide three-phase unipolar and four-phase commutation with absolute phase defining information.

48 Claims, 27 Drawing Sheets

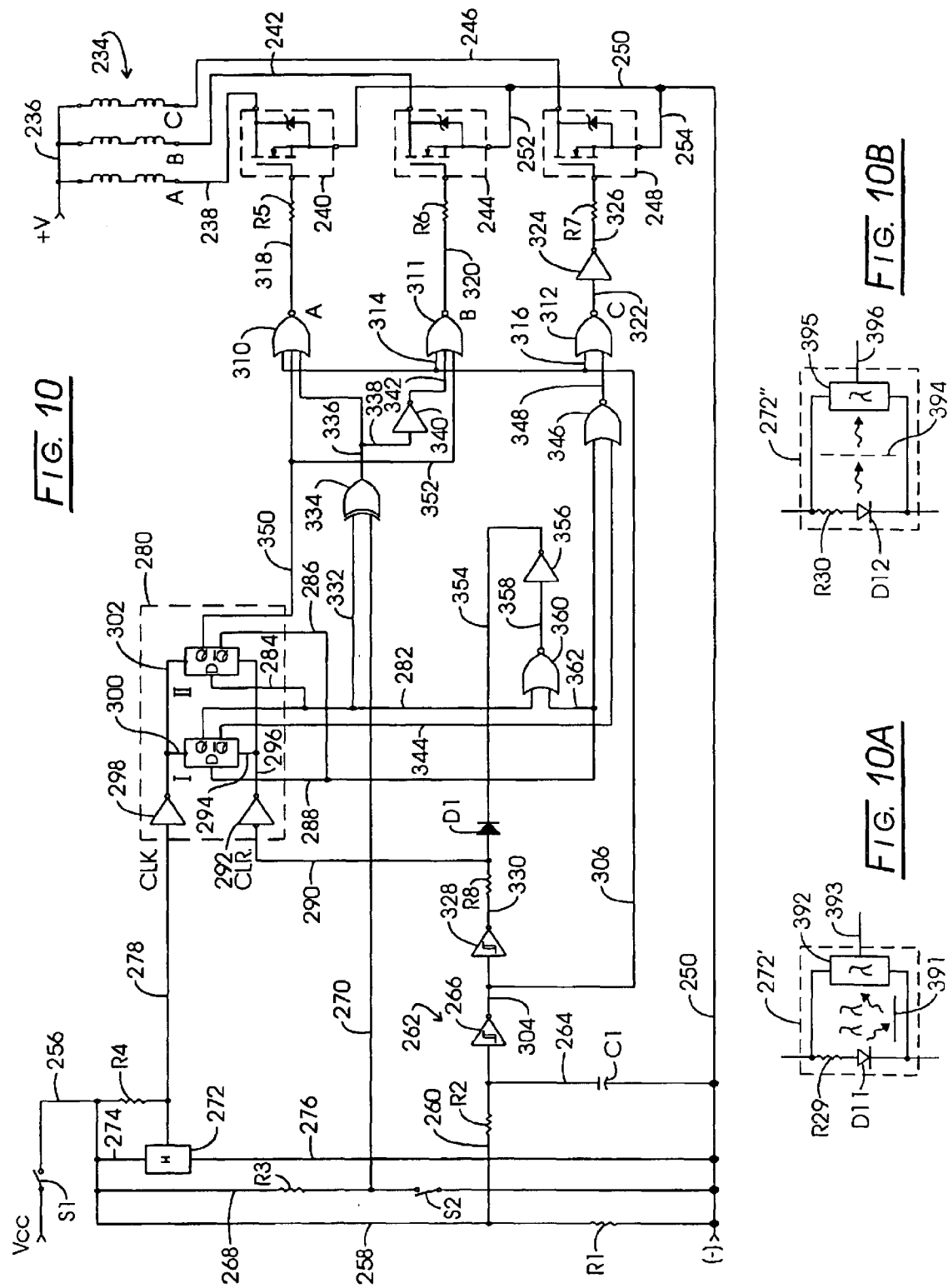

| CW | | |
|---|---|---|
| STEP | TOP | BOTTOM |
| 0 | C | A B |
| 1 | A | B |
| 2 | A | C |
| 3 | B | C |
| 4 | B | A |
| 5 | C | A |
| 6 | C | B |

| CCW | | |
|---|---|---|
| STEP | TOP | BOTTOM |
| 0 | C | A B |
| 1 | B | A |
| 2 | B | C |
| 3 | A | C |
| 4 | A | B |
| 5 | C | B |
| 6 | C | A |

ALIGNING STEP ↓

| | | STEP | | | | | | |
|---|---|---|---|---|---|---|---|---|
| | | 0 | 1 | 2 | 3 | 4 | 5 | 6 |
| I | Q | 0 | 0 | 1 | 1 | 1 | 0 | 0 |
| | Q̄ | 1 | 1 | 0 | 0 | 0 | 1 | 1 |
| II | Q | 0 | 0 | 0 | 1 | 1 | 1 | 0 |
| | Q̄ | 1 | 1 | 1 | 0 | 0 | 0 | 1 |
| III | Q | 0 | 0 | 0 | 0 | 1 | 1 | 1 |
| | Q̄ | 1 | 1 | 1 | 1 | 0 | 0 | 0 |

| CW | |
|---|---|
| STEP | PHASE ON |
| 0 | C |
| 1 | D |
| 2 | A |
| 3 | B |
| 4 | C |
| 5/1 | D |

FIG. 19

| CCW | |
|---|---|
| STEP | PHASE ON |
| 0 | C |
| 1 | B |
| 2 | A |
| 3 | D |
| 4 | C |
| 5/1 | B |

| STEP | 0 | 1 | 2 | 3 | 4 | 1 |
|---|---|---|---|---|---|---|
| Q | 0 | 0 | 1 | 1 | 0 | 0 |
| Q̄ | 1 | 1 | 0 | 0 | 1 | 1 |
| D | 1 | 1 | 0 | 0 | 0 | 1 |

| STEP | 0 | 1 | 2 | 3 | 4 | 1 |
|---|---|---|---|---|---|---|
| Q | 0 | 0 | 0 | 1 | 1 | 0 |
| Q̄ | 1 | 1 | 1 | 0 | 0 | 1 |
| D | 0 | 0 | 1 | 1 | 0 | 0 |

FIG. 23

| CW | |
|---|---|
| STEP | PHASE ON |
| 0 | C |
| 1 | A |
| 2 | B |
| 3 | C |
| 4→1 | A |

FIG. 25

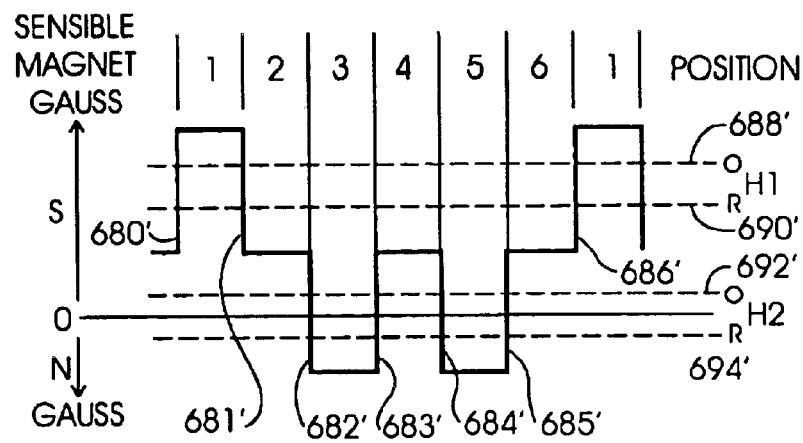
FIG. 28B
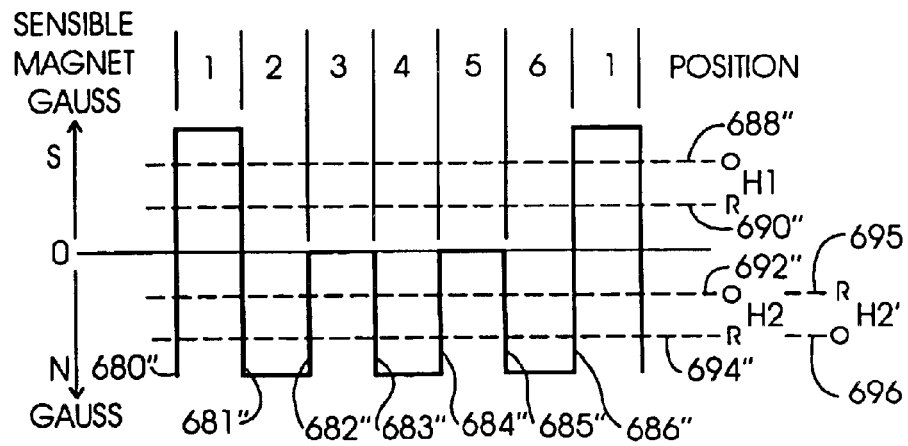
FIG. 28C
FIG. 28D

| POSITION | 1 | 2 | 3 |
|---|---|---|---|
| $H_1$ | 0 | 1 | 1 |
| $H_2$ | 0 | 1 | 0 |
| PHASE | A | B | C |

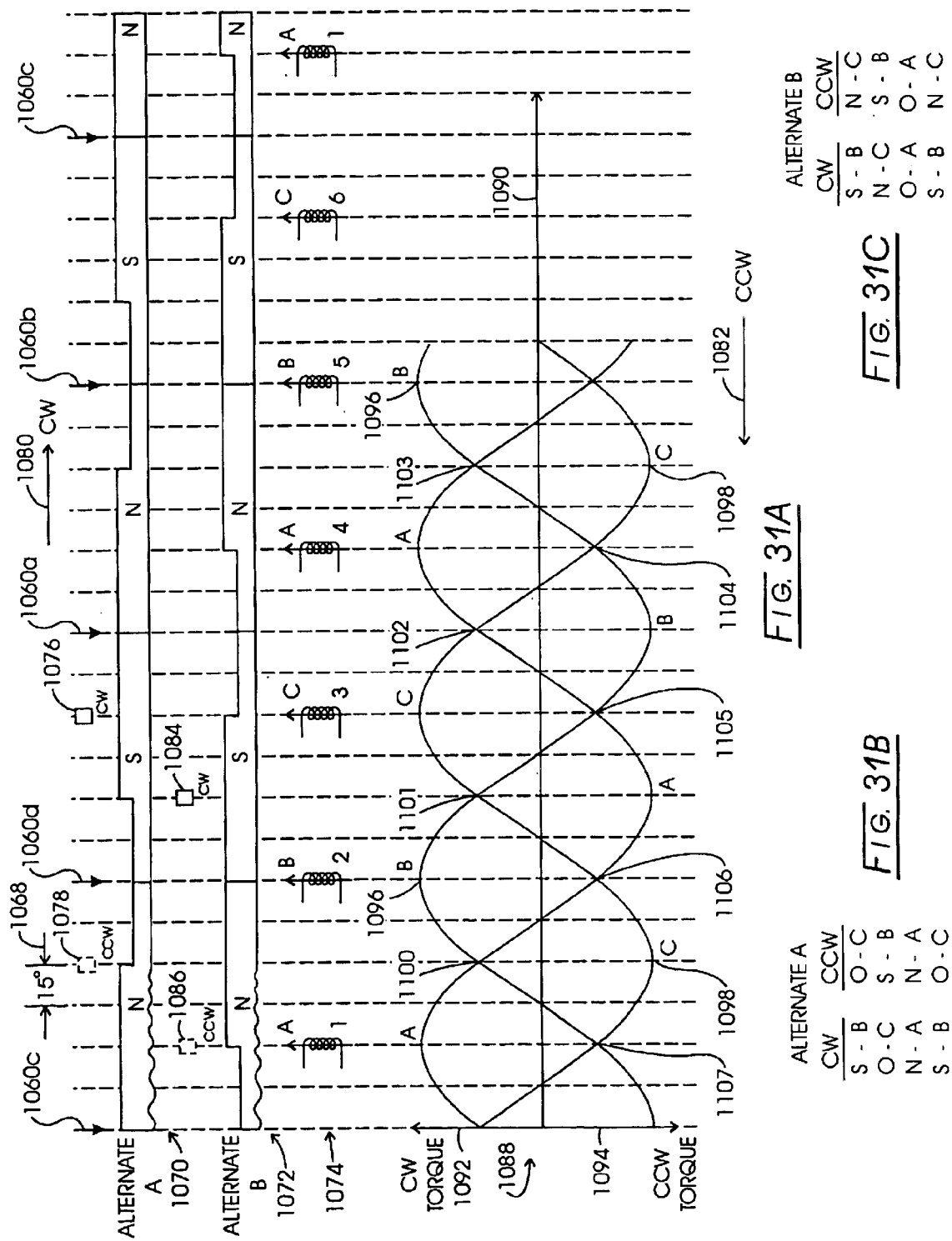

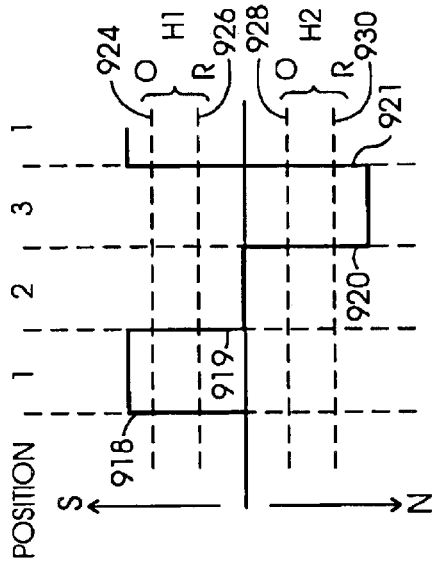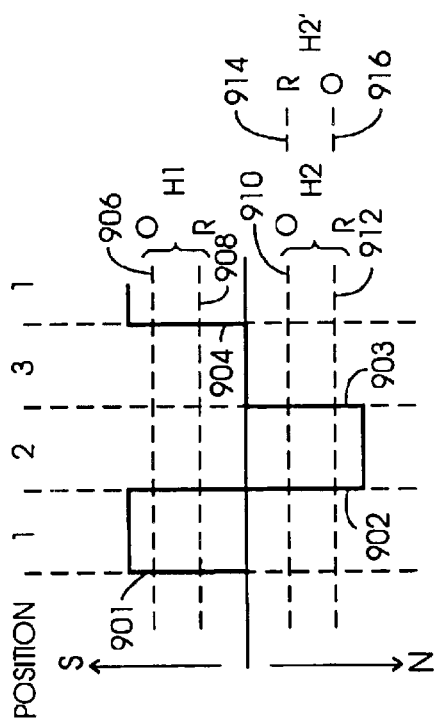

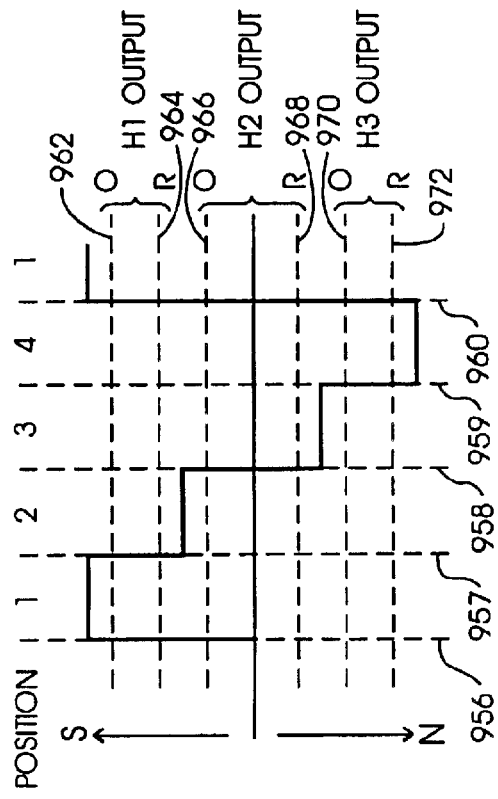
FIG. 39
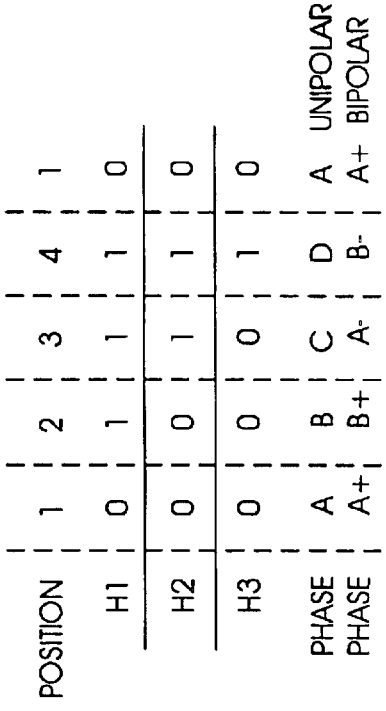
FIG. 40
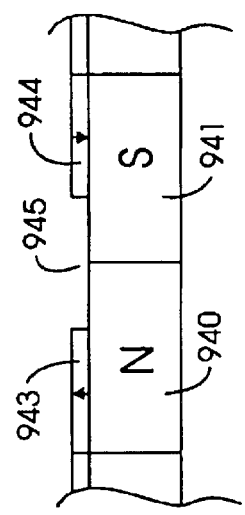
FIG. 38A
FIG. 38B

MULTIPHASE MOTORS WITH SINGLE POINT SENSING BASED COMMUTATION

CROSS-REFERENCE TO RELATED APPLICATIONS

This application claims the benefit of provisional application No. 60/454,767, filed 14 Mar. 2003.

STATEMENT REGARDING FEDERALLY SPONSORED RESEARCH

Not applicable.

BACKGROUND OF THE INVENTION

Investigators in the electric motor arts have been called upon to significantly expand motor technology from its somewhat static status of many decades. Improved motor performance particularly has been called for in such technical venues as computer design and secondary motorized systems carried by vehicles, for example, in the automotive and aircraft fields. With progress in these fields, classically designed electric motors, for example, utilizing brush-based commutation, have been found to be unacceptable or, at best, marginal performers.

From the time of its early formation, the computer industry has employed brushless D.C. motors for its magnetic memory systems. The electric motors initially utilized for these drives were relatively expensive and incorporated a variety of refinements particularly necessitated with the introduction of rotating disc memory. Over the recent past, the computer industry has called for very low profile motors capable of performing in conjunction with very small disc systems and at substantially elevated speeds.

Petersen, in U.S. Pat. No. 4,745,345, entitled "D.C. Motor with Axially Disposed Working Flux Gap", issued May 17, 1988, describes a PM D.C. motor of a brushless variety employing a rotor-stator pole architecture wherein the working flux gap is disposed "axially" with the transfer of flux being in parallel with the axis of rotation of the motor. This "axial" architecture further employs the use of field windings which are simply structured, being supported from stator pole core members, which, in turn, are mounted upon a magnetically permeable base. The windings positioned over the stator pole core members advantageously may be developed upon simple bobbins insertable over the upstanding pole core members. Such axial type motors have exhibited excellent dynamic performance and, ideally, may be designed to assume very small and desirably variable configurations.

Petersen in U.S. Pat. No. 4,949,000, entitled "D.C. Motor", issued Aug. 14, 1990 describes a D.C. motor for computer applications with an axial magnetic architecture wherein the axial forces which are induced by the permanent magnet based rotor are substantially eliminated through the employment of axially polarized rotor magnets in a shear form of flux transfer relationship with the steel core components of the stator poles. The dynamic tangentially directed vector force output (torque) of the resultant motor is highly regular or smooth lending such motor designs to numerous high level technological applications such as computer disc drives which require both design flexibility, volumetric efficiency, low audible noise, and a very smooth torque output.

Petersen et al, in U.S. Pat. No. 4,837,474 entitled "D.C. Motor", issued Jun. 6, 1989, describes a brushless PM D.C. motor in which the permanent magnets thereof are provided as arcuate segments which rotate about a circular locus of core component defining pole assemblies. The paired permanent magnets are magnetized in a radial polar sense and interact without back iron in radial fashion with three core components of each pole assembly which include a centrally disposed core component extending within a channel between the magnet pairs and to adjacently inwardly and outwardly disposed core components also interacting with the permanent magnet radially disposed surface. With the arrangement, localized rotor balancing is achieved and, additionally, discrete or localized magnetic circuits are developed with respect to the association of each permanent magnet pair with the pole assembly.

Petersen in U.S. Pat. No. 5,659,217, issued Aug. 19, 1997 and entitled "Permanent Magnet D.C. Motor Having Radially-Disposed Working Flux-Gap" describes a PM D.C. brushless motor which is producible at practical cost levels commensurate with the incorporation of the motors into products intended for the consumer marketplace. These motors exhibit a highly desirable heat dissipation characteristic and provide improved torque output in consequence of a relatively high ratio of the radius from the motor axis to its working gap with respect to the corresponding radius to the motors' outer periphery. The torque performance is achieved with the design even though lower cost or, lower energy product permanent magnets may be employed with the motors. See also: Petersen, U.S. Pat. No. 5,874,796, issued Feb. 23, 1999.

Over the years of development of what may be referred to as the Petersen motor technology, greatly improved motor design flexibility has been realized. Designers of a broad variety of motor driven products including household implements and appliances, tools, pumps, fans and the like as well as more complex systems such as disc drives now are afforded an expanded configuration flexibility utilizing the new brushless motor systems. No longer are such designers limited to the essentially "off-the-shelf" motor varieties as listed in the catalogues of motor manufacturers. Now, motor designs may become components of and compliment the product itself in an expanded system design approach.

During the recent past, considerable interest has been manifested by motor designers in the utilization of magnetically "soft" processed ferromagnetic particles in conjunction with pressed powder technology as a substitute for the conventional laminar steel core components of motors. So structured, when utilized as a motor core component, the product can exhibit very low eddy current loss which represents a highly desirable feature, particularly as higher motor speeds and resultant core switching speeds are called for. As a further advantage, for example, in the control of cost, the pressed powder assemblies may be net shaped wherein many intermediate manufacturing steps and quality considerations are avoided. Also, tooling costs associated with this pressed powder fabrication are substantially lower as compared with the corresponding tooling required for typical laminated steel fabrication. The desirable net shaping pressing approach provides a resultant magnetic particle structure that is 3-dimensional magnetically (isotropic) and avoids the difficulties encountered in the somewhat two-dimensional magnetic structure world of laminations. See generally U.S. Pat. No. 5,874,796 (supra) and U.S. Pat. No. 6,441,530.

The above-discussed PM D.C. motors achieve their quite efficient and desirable performance in conjunction with a multiphase-based rotational control. This term "multiphase" is intended to mean at least a three step commutation sequence in conjunction with either a unipolar or bipolar stator coil excitation. Identification of these phases in conjunction with rotor position to derive a necessary controlling sequence of phase transitions traditionally has been carried out with two or more rotor position sensors. By contrast, simple, time domain-based multiphase switching has been considered to be unreliable and impractical since the rotation of the rotor varies in terms of speed under load as well as in consequence of a variety of environmental conditions.

The multiphase motors may be described, for instance, by arbitrarily designating the commutation phase sequence of a three-phase motor as: A, B, and C. During those phases, a three-phase unipolar motor control must determine rotor position information for establishing the transitions from phase A to phase B to phase C to phase A as the sequence continues. Such control has been considered to require three rotor position sensors. The most typical of the position sensors are dual output state Hall devices and optical sensors. Somewhat costlier control also can be achieved with a back EMF circuit monitoring approach which eliminates all physical position sensors.

Still higher efficiencies are achieved with a three-phase bipolar motor wherein such commutation phase sequencing arbitrarily may be designated as calling for transitions from phase AB to phase AC, to phase BC to phase BA, to phase CA, to phase CB, to phase AB as the sequence continues. Here again, a practical control for such motor architecture has been considered to require three rotor position sensors. Four-phase motors with an arbitrarily designated commutation sequence of A, B, C and D are considered to require two rotor position sensors.

While the stator architecture and pressed powder implementation of the above-discussed motors has not only substantially enhanced their practically and has lowered their structural cost, further, quite substantial cost improvements can be realized by limiting the number of bi-state rotor position sensors required for multiphase motors to only one such sensor. In this regard, currently, the multiple sensors must be positioned in substantially spaced apart locations with respect to the rotor or some slave form of sensing structuring. Thus, the significant cost advantages associated with the integration of the positional sensor and the control circuit in a single chip is lost. The resultant cost factor generally precludes the use of efficient multiphase motors with very low cost applications such as electrical circuit cooling fans. However, as the era of electronic-based systems expands, battery-based power limitations are setting the stage for much higher motor efficiency requirements. Those higher efficiencies only are available with multiphase motors. Higher efficiencies for fan motors may be required, for example, for utilization with a rapidly expanding development of laptop computers. The technology long associated with electronic circuit, low load cooling fans has been somewhat static. Usually implemented as D.C. PM devices, the motors have been structured with a single phase or "two-pulse" architecture in order to retain a capability for operation with a single sensor. Such phasing is highly inefficient, the motors necessarily experiencing zero torque based commutation switching.

An implementation of a control system for a multiphase motor which contains only one sensor requires that, from that sensor, effective positional and timing information for carrying out phase commutation transitions in conjunction with reliable performance under load variations extending to those evoking stall phenomena.

BRIEF SUMMARY OF THE INVENTION

The present invention is addressed to improved multiphase electronically commutated electric motors having a simplified method for their control wherein a single sensor is employed with an associated sensible system to establish reliable phase commutation sequencing. As a consequence, motors incorporating the sensible system and associated single sensor find economically practical application in substantially expanded segments of commerce requiring the use of motor-driven functions. These advantageous economic attributes follow from a now-presented capability for employing motor control and sensing systems within a compact region readily assembled with the motors as opposed to conventional mandated spaced-apart multiple sensor approaches.

The primary difference between the inventions' single sensor based system, in one embodiment, and the traditional three-phase motor three sensor based system is that the single sensor has normally only two states of information available vs. six states in the three sensor based system and supplies to the motor control system in concert with the sensible system, rotor phase commutating information only and not a logic code for absolute phase defining information along with phase commutating information. Therefore, the single sensor based motor control system with only two states of information available has a pre-programmed phase sequence it follows upon receiving the phase commutating information. In a properly timed and phased motor a rotor phase commutating signal is generated when the rotor moves to a position relative to the stator where the torque being produced by the activated phase(s) would fall below the torque that would be produced by the next to be activated phase(s) in the commutational sequence. Traditionally that occurs when a rotor position sensing sensor, set at the appropriate position, senses a transition in the sensible system rotating in concert with the rotor of the motor under control.

Multiphase motors are characterized incorporating a rotor having a sequence of rotor poles which differ in number from the number of poles of an operationally associated wound stator. The single sensor feature performs in conjunction with a sensible system which rotates in correspondence with the rotor and supplies phase commutating signals to the control system to define at least three-phase transitions for each 360° of electrical rotation of the rotor. Responding to transitions in the sensible system, the single sensor derives a sensor output that alternates between sensor states. The control circuit responds to the sensor outputs to effect energization of stator assembly windings in correspondence with a predetermined commutational sequence of phases.

The above embodiment incorporating a sensible system, single sensor and a control system that operates with a predetermined commutational sequence of phases also requires that to achieve consistent adequate start-up torque the motor control start-up sequence provides for the presence of a designated motor starting phase working in conjunction with an alignment phase. A control circuit of the motor responds to a start input to energize those stator windings constituting an alignment phase prior in commutational sequence to the starting phase. This alignment phase is characterized in exhibiting a phase stable position exhibiting a zero torque or stable position when the alignment phase is held energized. To align the rotor for motor start-up, the alignment phase is energized to drive the rotor toward a phase stable condition to an extent providing for adequate start-up torque upon subsequent energization of a designated starting phase. Following such start-up, the sensible system phase commutating information attributes, performing in concert with the single sensor, and the control system provide reliable motor performance under rather extended load variations. Testing of the system has revealed continued proper commutational performance following loads reaching a stalled condition.

As another aspect of the motor control system at hand, the noted sensible system is accorded a reference attribute. That reference attribute corresponds with an elected reference phase in a commutational sequence of phases which will represent a mandated energization phase when uniquely acquired by the single sensor from the sensible system. A variety of sensible system and sensor configurations are available to provide this reference attribute as combined with a single sensor corresponding with it. As one exemplar disclosed, a two-level, two output Hall effect sensor is employed in conjunction with a sensible system configured with dual magnetization operating levels. One such level is patterned to evoke sequential phase commutation via the phase commutating signals, while the second level identifies a rotor orientation at which the reference phase is mandated for excitation. For this approach, the control circuit may treat the phase commutational signal based response provided at one sensor output as precedential. The second sensor output represents the sensible system reference phase attribute which then may be treated as having an overriding aspect for that singular reference phase notwithstanding the presence or event of a phase identification variance or vagary.

Another disclosed exemplar for establishing this reference phase attribute at the sensible system performing in concert with a single sensor, provides the sensible system with a reference phase defining attribute which persists to a discernable extent longer than a normal phase commutating signal in the course of rotor rotation. An operatively associated control circuit responds to a single sensor output representing the sensible system phase commutating information to provide phase excitation in the preordained commutation sequence, but further is responsive to the sensor output representing a reference phase attribute to mandate reference phase excitation in the presence of an output corresponding with that reference attribute.

Where a Hall effect device is employed as the single sensor and the rotor employs permanent magnet polar regions the resultant sensible system magnetic attributes may be configured in immediate adjacency with the magnetized regions of the rotor magnet poles. Thus, the rotor magnetization can be carried out with a manufacturing template providing for manufacture wherein rotor pole magnetization and sensible system magnetization can be carried out essentially simultaneously. Other sensible systems may employ attributes such as optical response to achieve the sensible system and single sensor control aspects of the invention.

An optical sensor based system, utilizing either reflective or interruption type of sensible system, may, in most cases, be substituted directly for the magnetic type sensor based systems illustrated in the embodiments described herein.

Another aspect and feature of the invention provides a method for commutating an electric motor employing a rotor with regions responsive to an applied electromagnetically derived field to effect its driven rotation about a motor axis and a stator assembly configured with energizable stator winding is provided which comprises the steps of:

providing a sensible system rotatable in correspondence with the rotation of the rotor and having phase commutating information defining transitions at the commencement of each phase as they occur in commutational succession;

providing a single sensor operably associated with the sensible system, having a sensor output altering between sensor states in response to sensible system transitions;

identifying a starting phase for energizing the stator windings to cause the rotor to rotate about the motor axis in a given direction;

commencing the operation of the motor by energizing those stator windings establishing an aligning phase occurring prior to the identified starting phase in the commutational succession to an extent effective to cause the rotor to rotate toward a magnetically stable position exhibiting substantially zero torque;

then de-energizing the stator windings representing the aligning phase and energizing the stator windings representing the starting phase; and energizing only those stator windings representing a next phase in the commutational succession in response to the sensor output.

Another feature of the invention provides a method for commutating a multiphase electric motor having a rotor with regions responsive to an applied electromagnetic field to effect its driven rotation about a motor axis and a stator assembly configured with energizable stator windings, comprising steps of:

providing a sensible system rotatable in correspondence with the rotation of the rotor and having a reference sensing attribute defining a reference phase and a phase commutating transition attribute corresponding with the commencement of each phase in a commutational sequence of phases;

providing a sensor having an output with a first attribute in the presence of the sensible system reference sensing attribute and having a second attribute in correspondence with the phase commutating transition attribute;

mandatorily energizing those stator windings representing the reference phase in the presence of the output with the first attribute; and de-energizing those stator windings representing the reference phase upon the occurrence of the output having the second attribute in the absence of the first attribute and then successively energizing those stator windings representing subsequent phases in the commutational sequence in response to the second attribute without the presence of the first attribute.

Another aspect of the invention provides a multiphase electric motor which comprises a stator assembly having a given number of stator poles with windings configured for multiphase performance. A rotor is incorporated having a sequence of regions responsive to an applied electromagnetically derived field to effect its driven rotation about an axis in operational association with the stator assembly. A magnetically characterized sensible system is provided which is rotatable in correspondence with the rotation of the rotor and which has at least three regions, at least two of which exhibit magnetic intensities of opposite polar sense to define three or more transitions for each 360° of electrical rotation of the rotor. A sensor is provided comprising a sensor circuit operatively configured with one or more Hall effect plates physically located in one package with multiple outputs. Each output is responsive to a different level of flux intensity and the combined outputs define the function of a truth table with a different set of output conditions for each of the three or more regions of the sensible system. The combined outputs provide to the control circuit absolute phase defining information as well as phase commutating information equivalent to a conventional multiple sensor based system to cause the control circuit to effect energization of the stator assembly windings in a three or more phase commutational sequence.

In one embodiment the sensible system has two regions magnetized in one polar sense and one in the other polar sense in 360° of electrical rotation. 360° of electrical rotation is defined at that amount of angular rotation a rotor moves through without repeating the phase energization sequence, typically, the angular extent of one north-south magnetic rotor pair in a PM rotor motor. Of the two regions one is provided having a higher level of flux intensity. A second embodiment has two regions of alternating polar sense and a third region of zero or neutral polar sense. In an additional variance for application in motors with a four step commutational sequence, i.e., four-phase operation, a sensor with three outputs is utilized, each of different flux operating level. The three level sensor is employed with a sensible system that has two regions magnetized in one polar sense and two regions magnetized in a second polar sense in 360° of electrical rotation. The two regions in each polar sense have differing levels of flux intensity.

Other objects of the invention will, in part, be obvious and will, in part, appear hereinafter.

The invention, accordingly, comprises the system, method and apparatus possessing the construction, combination of elements, arrangement of parts and steps which are exemplified in the following detailed disclosure.

For a fuller understanding of the nature and objects of the invention, reference should be had to the following detailed description taken in connection with the accompanying drawings.

BRIEF DESCRIPTION OF THE DRAWINGS

FIG. 5 is a step and phase commutation sequence for clockwise operation of the motor described in connection with FIG. 4;

FIG. 6 is a step and phase sequencing diagram for a counterclockwise operation of the motor discussed in connection with FIG. 4.;

FIG. 8 is a tabulation comparing steps and phase sequences for the clockwise operation of the motor described in connection with FIG. 7;

FIG. 9 is a tabulation showing steps and phase sequencing for a counterclockwise performance of the motor described in connection with FIG. 7;

FIG. 10 is an electrical schematic diagram for a control system employed with the motor described in connection with FIG. 4;

FIG. 10A schematically illustrates an alternate optical based sensor embodiment for circuits as described in conjunction with FIG. 10;

FIG. 10B schematically illustrates another optically based sensor embodiment which may be employed with circuits as described in conjunction with FIG. 10;

FIG. 11 is a truth table for the counting function of the circuit of FIG. 10;

FIG. 19 is a tabulation relating steps and phase sequencing for clockwise rotation of the motor of FIG. 18;

FIG. 20 is a tabulation relating steps and phase sequencing for counterclockwise rotation of the motor of FIG. 18;

FIG. 22 is a truth table for one D-type flip-flop of the counter function of the control system of FIG. 21;

FIG. 23 is a truth table for a second D-type flip-flop of the counting function of the circuit of FIG. 21;

FIG. 25 is a tabulation of the commutational phase sequence of the motor of FIG. 24;

FIG. 28B is a schematic representation of a sensible system magnetic Gauss intensity vs. position incorporating a reference phase, further showing operate or trip and release levels for a two level Hall device;

FIG. 28C is a truth table showing the logic state of the outputs of the two level Hall device utilized in conjunction with the sensible system magnetic architecture of FIG. 28B;

FIG. 28D is a schematic representation of sensible system magnetic Gauss intensities vs. position incorporating a reference phase, further showing trip and release levels for a two level Hall device;

FIG. 31A is a timing and torque curve diagram for a three-phase unipolar motor incorporating a single, two output sensor and showing a developed sensible system formed within an upper edge of the permanent magnet carried by a rotor;

FIG. 31B is a truth table showing phase designations for sensor read sensible system fields for clockwise and counterclockwise rotor rotation corresponding with an Alternate A sensible system of FIG. 31A;

FIG. 31C is a truth table showing phase designations for an Alternate B sensible system for clockwise and counterclockwise rotor rotation as shown in FIG. 31A;

FIG. 34 is a schematic representation of sensible system magnetic Gauss intensities vs. position, the diagram further showing operate or trip and release levels for a two output Hall effect-based sensor;

FIG. 35 is a truth table showing the logic level outputs for the two output Hall effect sensor employed with the sensible system architecture in FIG. 34;

FIG. 36 is a schematic representation of sensible system magnetic Gauss intensities vs. position, the diagram further showing operate or trip and release levels for a two output Hall effect-based sensor;

FIG. 37 is a truth table showing the logic states of the outputs of the two level Hall device employed with the sensible system architecture in FIG. 36;

FIG. 38A is a schematic representation of a portion of a rotor magnet which is combined with sensible system magnetic region one such region representing the substantial absence of a magnetic field;

FIG. 38B is a schematic representation of a portion of a rotor magnet showing the formation of sensible system magnetic regions therein including formation of one region as a depression in the height dimension of rotor magnet segments;

FIG. 39 is a schematic representation of sensible system magnetic Gauss intensities vs. position for a four-phase motor with positive identification of each phase, the diagram further showing operate or trip and release levels for three outputs of a Hall effect sensor;

FIG. 40 is a truth table showing the logic states of the three sensor outputs employed in connection with the sensible system architecture represented in FIG. 39;

DETAILED DESCRIPTION OF THE INVENTION

Figure 1:
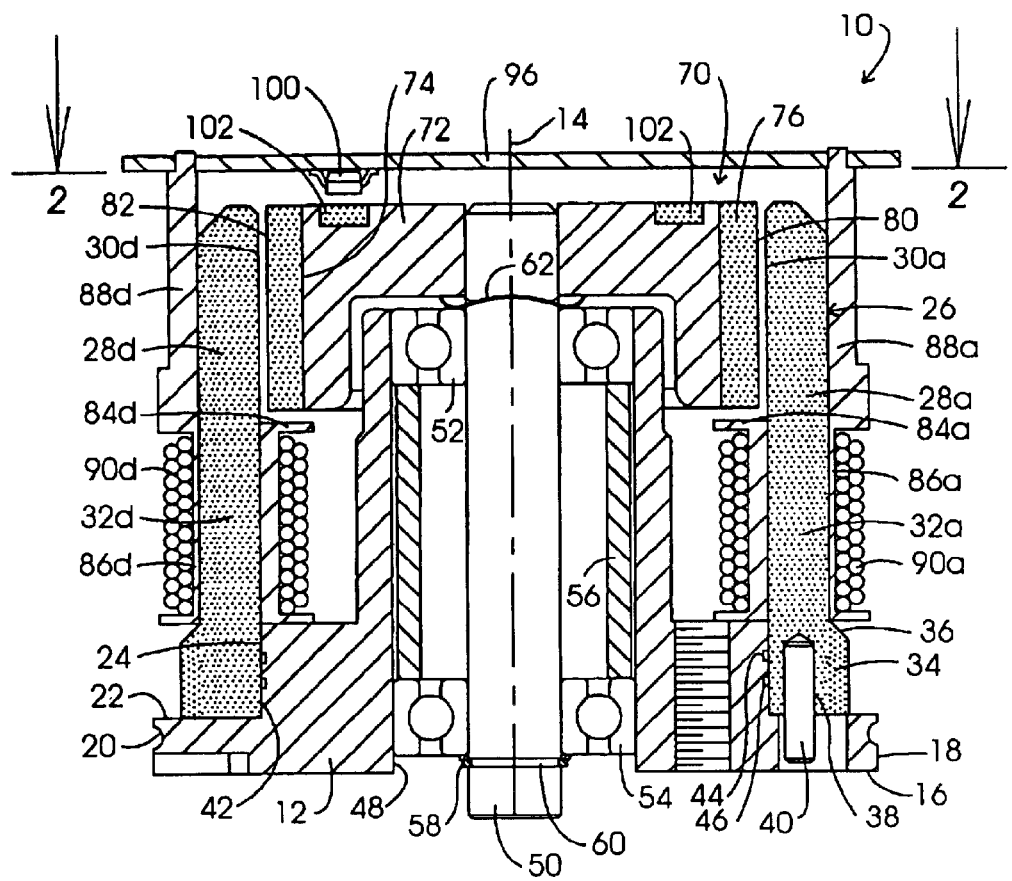
FIG. 1 is a sectional view of a D.C. PM motor employing a sensible system and single sensor arrangement according to the invention.
Figure 2:
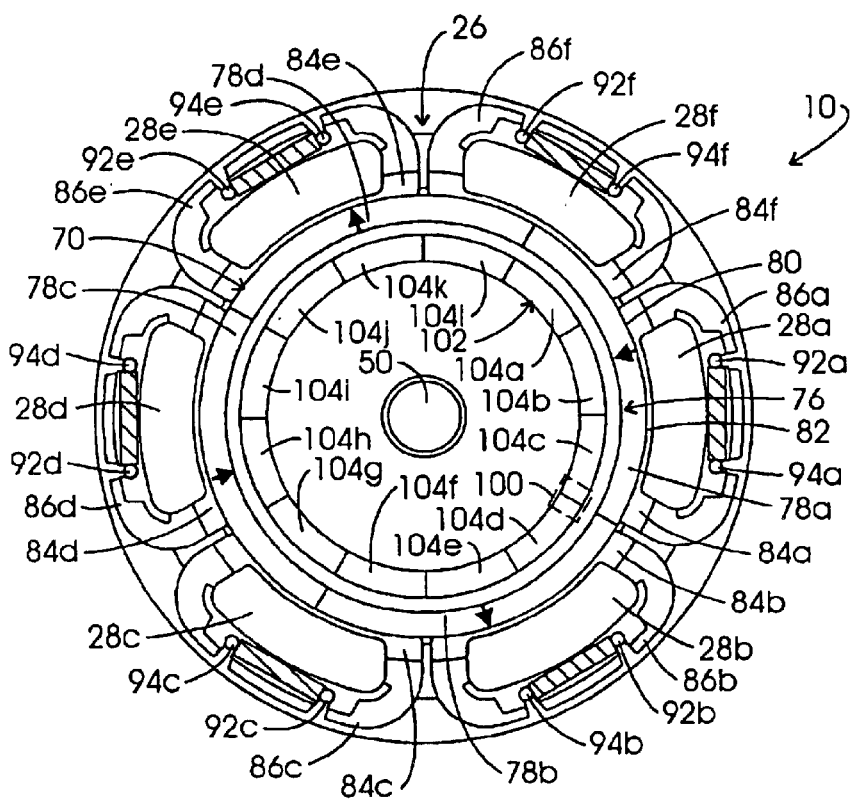
FIG. 2 is a sectional view taken through the plane 2—2 shown in FIG. 1.

Referring to FIGS. 1 and 2, a multiphase D.C. PM motor incorporating the single sensor based control features of the invention is revealed in general at 10. As noted earlier, the term "multiphase" as used herein is intended to mean three or more phases. Such motors are further characterized in that the number of rotor poles will be different than the number of stator poles. Motor 10 is seen in FIG. 1 to be formed with an aluminum base 12 disposed symmetrically about a rotor axis 14 and having a circular flange represented in general at 16, the circular edge 18 of which carries a connecting groove 20 employed for mounting motor 10 within an appliance. Supported upon the annular rearward surface 22 of flange 16, as well as in conjunction with a recessed cylindrical based shoulder portion 24 is a pressed powdered metal stator core assembly represented generally at 26. The six pole, integrally formed stator core assembly 26, as represented in FIG. 2, is seen to incorporate spaced apart isotropic core components 28a–28f. Each such core component 28a–28f includes a flux interaction region, two of which are identified at 30a and 30d in FIG. 1 which has a length parallel with the motor axis 14 and which is generally coextensive with the principal dimension of the permanent magnet assembly of an associated rotor. The flux interaction regions as exemplified at 30a and 30d are each integrally associated with a winding region as seen in FIG. 1 at 32a and 32d. These winding regions also are arranged generally in parallel with the axis 14 and extend a field winding length from a location in spaced adjacency with the flux interaction region to an integrally formed annulus-shaped back iron region 34. Note that the radial dimension of back iron region 34 is enlarged by being stepped outwardly as at 36. This enlarged cross sectional area along with each upstanding core component is designed to avoid saturation under maximum rated load with a safety factor of, for instance, about 20% to about 25%. FIG. 1 further reveals an upstanding cylindrically-shaped cavity 38 which functions to receive a locating pin 40.

The internal surface 42 of the back iron region 34 is slide fitted and glued against base shoulder portion 24. FIG. 1 further reveals that formed within the base shoulder portion 24 are two annular adhesive-retaining grooves 44 and 46 to secure the assembly 26.

Base 12 further is configured to define an open cylindrical bearing housing 48 which is symmetrically disposed about motor axis 14 and functions to rotatably support a motor shaft 50 with ball bearings 52 and 54. In this regard, the inner races of bearings 52 and 54 support and rotate the shaft 50 and, bearing 52 is spaced apart from bearing 54 with a spacer cylinder 56 which is glued into position. Shaft 50 is retained in position by a snap ring 58 located within a shaft groove 60 and the bearings are loaded by spring or wavy washer 62 abutting the inner race of bearing 52. The outside surfaces of bearings 52 and 54 are glued in position.

Attached to the shaft 50 is a permanent magnet rotor or rotor assembly represented generally at 70 which is formed having a cylindrical steel back iron 72 with a cylindrical outer surface 74 which carries a four segment or region cylindrical permanent magnet 76. The four poles or regions of alternating magnetic polarity of the permanent magnet 76 are seen in FIG. 2 at 78a–78d in conjunction with schematic radial polar representations. The permanent magnet 76 preferably is formed from a bonded rare earth material and provides a confronting magnetic surface 80 which is spaced from the corresponding flux interaction regions of the stator as shown in FIG. 1 at 30a and 30d a working or functional gap distance to define a working gap 82. The confronting magnetic surface 80 is configured with a principal dimension parallel with the motor axis 14 which corresponds with or is generally coextensive with the length taken in parallel with axis 14 of the flux interaction regions as described at 30a and 30d.

FIG. 1 reveals that the winding regions 32a and 32d as well as the winding regions for the remaining stator core components extend a field winding length from a location at the inward winding flanges of bobbins represented generally at 84a–84f to the integrally formed back iron region 34. Accordingly, the winding regions extend in generally parallel relationship with the axis 14 such a field winding length from a location in spaced adjacency with the flux interaction region as described in conjunction with FIG. 1 at 30a and 30d. Each of the bobbins 86a–86f is configured additionally with an integrally formed elongate lead support portion 88a–88f shown in FIG. 1 at 88a and 88d. Those lead support portions incorporate slots which, in turn, support the start and finish leads shown respectively in FIG. 2 at 92a–92f and 94a–94f of the field windings. Support portions 88a–88f further support a circular printed circuit board seen in FIG. 1 at 96. Supported at the underside of circuit board 96 is a single sensor 100 which may be provided as a Hall effect device and, where power switching levels are appropriate, can be one integrated component of an overall integrated circuit chip functioning to carry out all commutational control of the motor 10.

Note in FIG. 1 that the sensor 100 is positioned over the sensor magnet represented in general at 102 of a sensible system forming a component of the control system and rotatable about the axis 14 in correspondence with the rotation of rotor 70. FIG. 2 schematically portrays this annulus or ring shaped assembly 102 as having twelve regions of alternating magnetic polarity 104a–104l which provide phase commutational attributes functioning to define a sensible transition identifying the commencement of each phase in a commutational sequence of phases. FIG. 2 also reveals that there are three of these sensible system regions with respect to each pole of the rotor magnet assembly 76. For example, schematically portrayed regions 104a–104c are shown for illustrative purposes as being aligned with rotor magnet region 78a. Sensible system magnetic regions 104d–104f are shown schematically as being aligned with next rotor polar region 78b. Sensible system magnetic regions 104g–104i are shown schematically as being aligned with next alternating rotor polar region 78c; and sensible system regions 104j–104l are shown for illustrative purposes as being aligned with rotor segment 78d. Accordingly, the sensible system for the instant demonstration defines six transitions for each 360° of electrical rotation of the rotor 70. With the control system of the invention at least three such transitions are required for each 360° of electrical rotation. The sensing system and sensor of the control system may be of different varieties, for example, an optical approach can be used for sensing and establishing the sensible system attributes which define phase entry transitions. Also the sensible transitions need not line up with respective polar regions of the motor magnet if accompanied by appropriate shifting of the location of sensor 100.

Figure 3:
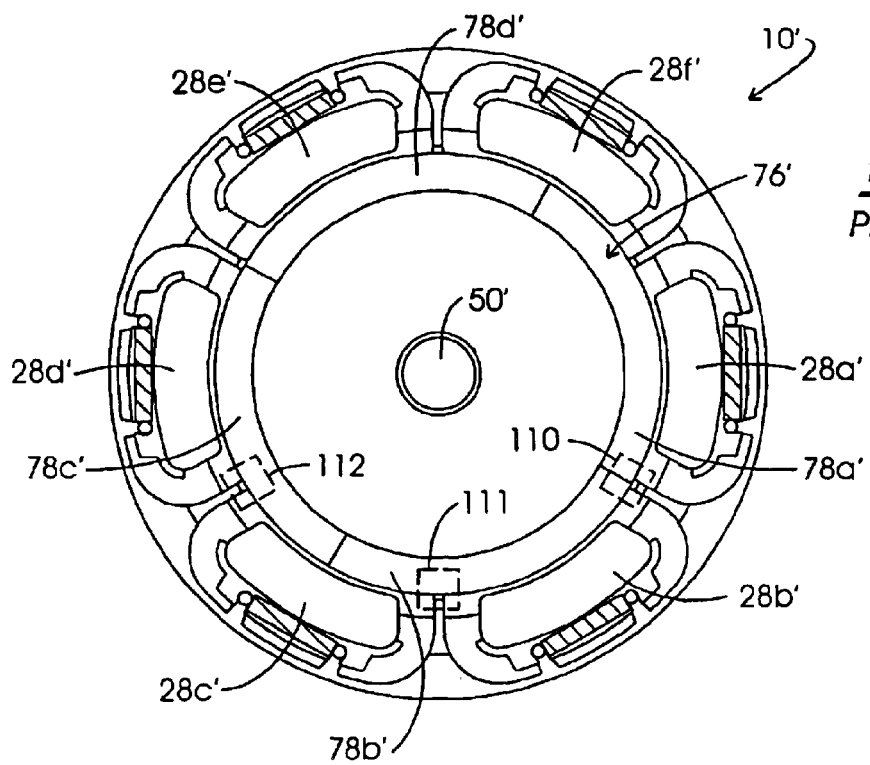
FIG. 3 is a sectional view similar to FIG. 2 but showing the utilization of three spaced apart sensors.

Referring to FIG. 3, motor 10 is reproduced without the single sensor 100 and sensible system magnetic regions 102 as an illustration of the control approach heretofore generally employed with three-phase motors. In this regard, three Hall effect devices are utilized in conjunction with the permanent magnet assembly 76 of the motor. The salient components earlier described in conjunction with FIGS. 1 and 2 are identified with the same but primed numeration. However, note that three Hall effect devices are shown at 110–112 being spaced apart as is required in order to evolve the absolute rotor position information utilized in the conventional control system. With that arrangement, a positive binary identification of rotor position and consequently the appropriate phase energization is always present. However, because of the requisite spacing of devices 110–112 the advantages of an integrated and readily assembled sensing and control arrangement are precluded with the attendant higher cost.

The basic single sensor control approach of the invention is one wherein a starting phase for the motor as at 10 is identified with respect to a desired direction for rotor rotation, either clockwise or counterclockwise. For that start-up phase to be effective, the rotor must be in a position wherein torque is generated in the appropriate direction for that starting phase. This requires that the rotor be properly positioned for start-up. That positioning of the rotor is carried out with the energization of an aligning phase such that it is moved toward a stable position which will represent zero torque for the aligning phase but which will position the rotor for subsequent adequate start-up torque with the selected starting phase. Such a stable position will occur when the stator windings representing an alignment phase, as energized to a given polarity will cause the rotor to move to a position wherein a rotor pole of the opposite polarity is centered over those alignment phase windings.

The above features are illustrated in connection with the motor schematic layout diagrams and torque curves provided in FIG. 4. Looking to that figure, a sequence of vertical dashed lines are represented and as identified at arrow pair 116, the spacing between adjacent ones of those vertical lines is intended to represent 15° of mechanical rotation of a four pole rotor similar to that described in conjunction with FIGS. 1 and 2 at 70. In this case, 15° of mechanical rotation equals 30° of electrical rotation since the phase sequence for advancing the rotor is repeated twice in one rotation of the rotor. This is also revealed by the presence of four magnet rotor poles or two N-S pairs. The rotor magnet as at 118 is assumed to be performing rotationally in conjunction with six stator poles represented in general at level 120 and numbered one through six, wherein stator poles one and four represent a phase A; stator poles two and five represent a phase B; and stator poles three and six represent a phase C. In terms of mechanical rotation, stator pole one may be considered at zero degrees mechanical rotation and stator pole one following stator pole six may be considered to be at a 360° extent of rotor rotation or zero degrees for a next rotation. It is assumed that operation of the schematically depicted and graphically depicted motor will be in a three-phase unipolar fashion with each phase arbitrarily designated as being energizable with a south pole. The single sensor or Hall device position is represented by the block 124. The orientation of the rotor poles at 118 is representative of a maximum torque condition occurring with the energization of phase C. Note in this regard, that the junction or transition between north and south poles at 118 is centered over phase C at poles three and six. Now look to the torque curves for phases A, B and C shown in general at 126 in conjunction with a zero torque defining axis 128. Clockwise torque levels are represented by ordinate arrow 130 as increasing in an upward sense and counterclockwise torque is represented by arrow 132 as increasing in a downward sense. Note that maximum clockwise torque is evidenced at the phase C curve at point 134 in correspondence with the energization of phase C at poles three and six and in correspondence with the rotor orientation represented in general at 118. For this alignment, a stable point or position or "C stable" position is present at 136 on the phase C torque curve. Accordingly, energization of phase C alone for a sufficient interval of time, for example, about 200 milliseconds, will cause the rotor poles to move to the corresponding orientation represented in general by the developed rotor poles at 138. Note that a north pole in the orientation at 138 is centered over a south excited C phase at pole three and at pole six. Accordingly, the C phase torque may be represented at the noted stable point 136.

For the rotor pole orientation represented at development 138, the corresponding movement of the sensing system magnetic assembly, for example, as described in connection with FIG. 2 at 102 will be as represented in general at 140. Note, for example, as represented by the spacing between vertical dashed lines 142 and 144, there are six sensible system poles for each rotor north/south pole pair and, thus, for each 360° of electrical rotation. For three-phase unipolar commutation, it further is assumed for the instant demonstration that the control system will react only to south to north transitions in the sensible system magnetic region array 140. It may be observed that when the rotor poles and sensible system poles 140 are in the orientation shown, the single sensor or Hall device 124 will be centered on a sensible system north pole. Note in the torque curves 126 that the C stable position 136 is aligned with vertical dashed line 144 and that vertical dashed line is positioned to intersect the torque curve for phase A at point 146 which represents the torque provided by a south pole excited phase A when the rotor is in the C stable alignment orientation. Thus, significant torque is present to start the motor. For three-phase unipolar operation, commutation from phase to phase occurs theoretically at 50% of maximum torque for the elected direction. Accordingly for clockwise operation, commutation will occur from phase A to phase B as represented at points 148 and 150; from phases B to C as represented at points 152 and 154; and from C to A as represented at points 156 and 158.

Correspondingly, counterclockwise rotation of the rotor can be commenced following its movement to C stable position 136 by energizing phase B. In this regard, note that the counterclockwise torque represented at point 160 is close to maximum, the magnitude of which is represented at arrow 132, and therefore supplies a significant start-up force to accelerate the rotor. Note that point 160 falls again at dashed vertical line 144. Following such start-up at phase B, and 45o of mechanical rotation of the rotor, commutation will occur from phase B to phase A at point 162. Following 60° of mechanical rotation in a counterclockwise sense, a transition is made from phase A to phase C as represented at point 164 and then, following 60° of mechanical rotation, transition occurs from phase C to phase B as represented at point 166. Commutation continues to occur at 60° mechanical intervals. For each of the transitions, the sensible system magnet array 140 will have positioned a south-to-north transition over the sensor or Hall device 124.

Accordingly, following the alignment phase and directionally selected start-up phase the control system functions to operate the motor phasing sequence with physically sensed phase commutating information only, the sequence being predetermined, such timing being developed from the magnetic transitions of the sensible system. By contrast, where three sensing devices are employed in the manner described in conjunction with FIG. 3, a logic code for positive phase energization information is always available from a three signal, six step sequence generated every 360° of electrical rotation. Of interest, the operation of the motor with this single sensor based control shows that the motor can be subjected to wide variations of loads all the way to stall and will continue to perform, for example, even when released from that stalled condition. In effect, the motor control can only be defeated by reversing the direction of the rotor from its intended rotational direction to an extent passing a point of commutation, while motor control circuit power is maintained.

FIG. 5 summarizes the sequence of steps described above for operating the motor. Step 0 is designated as called for to carry out energization of alignment phase C. Following that alignment phase for clockwise rotation, phase A is energized as a step 1. Then, phase B is energized as a step 2, following which phase C is energized as a step 3. Step 1 then is repeated in the commutational sequence A, B, C.

FIG. 6 provides a similar summary for counterclockwise rotation of the rotor. In the figure, the aligning phase is represented as a step 0 and shows that phase C is energized for an interval sufficient to achieve counterclockwise torque on energization of phase B. Accordingly, step 1 is shown as providing for the energization of phase B following alignment phase energization. Next, as a step 2, phase A is energized, following which as a step 3, phase C is energized. The commutational sequence then continues as phases B, A, C with a repetition of step 1 and the energization of phase B.

The above control approach has been demonstrated with a four pole rotor and six pole stator. The control will perform with any architecture where the number of rotor poles represent ⅔ the number of stator poles. The same form of control may be achieved in motor architectures where the number of rotor poles for a three-phase unipolar control is doubled to eight poles while the number of stator poles remains at six. This control further holds for any stator-to-rotor pole architecture having the same ratio.

Figure 7:
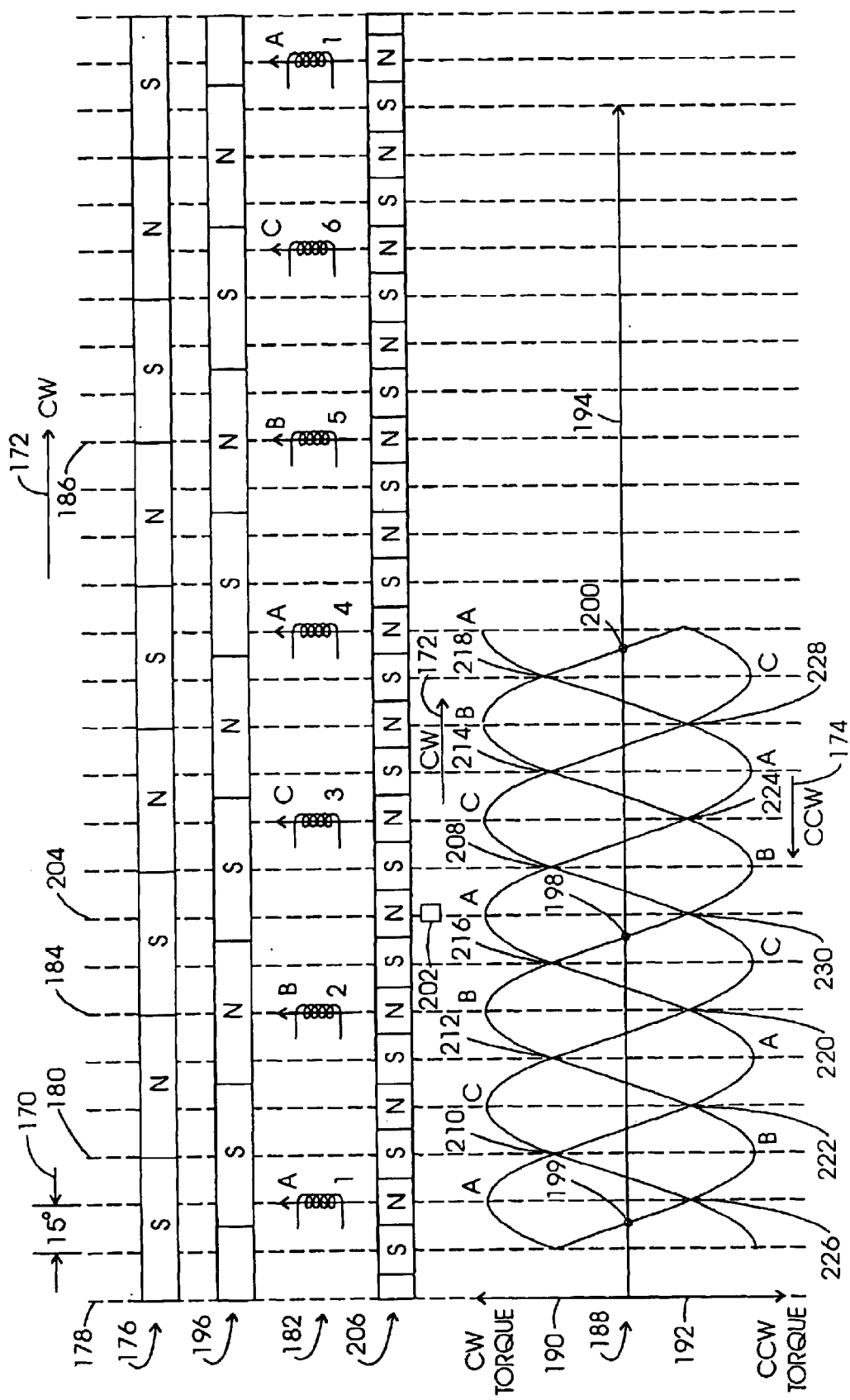
FIG. 7 is a motor schematic layout and torque curve diagram for an alternate construction of a three-phase unipolar motor employing the sensible system and single sensor arrangement of the invention.

Turning to FIG. 7, motor schematic layout diagrams for such a motor are presented with rotor magnet regions and sensible system magnet regions shown for a sample position along with theoretical torque curves of the phase torques vs. angular rotation. The figure is shown with the earlier-described vertical dashed lines wherein the spacing between adjacent lines represents 15° of mechanical rotation as represented at dual arrow 170. Stator poles are arbitrarily designated to be excited with a south polarity; a clockwise direction is in the sense of from left to right in the figure as represented at arrows 172 and a counterclockwise designated direction is established in the sense of right to left in the figure as represented at arrow 174. Development of the eight pole rotor shown with angles of rotation represented by vertical dashed lines is represented initially in general at 176. Note that the rotor poles are 45° in rotational length as represented, for example, between dashed lines 178 and 180 as contrasted with the 90° length of the rotor poles described in conjunction with FIG. 4. The rotor magnets shown in all embodiments herein are labeled with the polarity facing the stator. The six stator poles are represented generally at 182 and, as before, are shown numbered 1–6 in conjunction with a selected identification of phases A, B, and C. These stator poles are considered to be energized in a south polar sense and thus, the orientation of the rotor poles at 176 is one representing a maximum clockwise torque for the energization of phase B as shown at stator pole two and dashed line 184 and stator pole five in conjunction with dashed line 186. Note that the south energized phase B at the subject stator poles is aligned with the junction between north and south rotor poles.

Torque curves for the three-phases, A, B, and C are represented generally at 188, clockwise torque being arbitrarily assigned in conjunction with torque level arrow 190 and counterclockwise torque levels being represented by arrow 192. An x-axis at 194 again represents angle of rotation schematically represented by the vertical dashed lines having 15° mechanical rotation spacing. For this demonstration, phase B is the alignment phase and the energization of that alignment phase in a south polar sense for an adequate interval of for example, about 200 milliseconds will cause the rotor to rotate to a stable position as represented by the developed rotor orientation shown in general at 196. Note that a north pole is centered over the south excited B phases as shown at stator poles two and five. The zero torque "B stable" points at the torque curves 188 occur at zero torque positions 198 and 200. Note additionally, that the torque curves are "tighter" in nature for the extended number of rotor poles. The sensor or Hall device 202 is physically positioned in an angular sense between two stator poles, for example, poles two and three or phases B and C as indicated at dashed line 204. Now looking to the corresponding magnetic region of the sensible system as represented in general at 206, it may be observed that, as before, three sensible system magnetic regions are aligned with each rotor pole. Thus, there will be six such regions for each 360° of electrical rotation.

Figure 4:
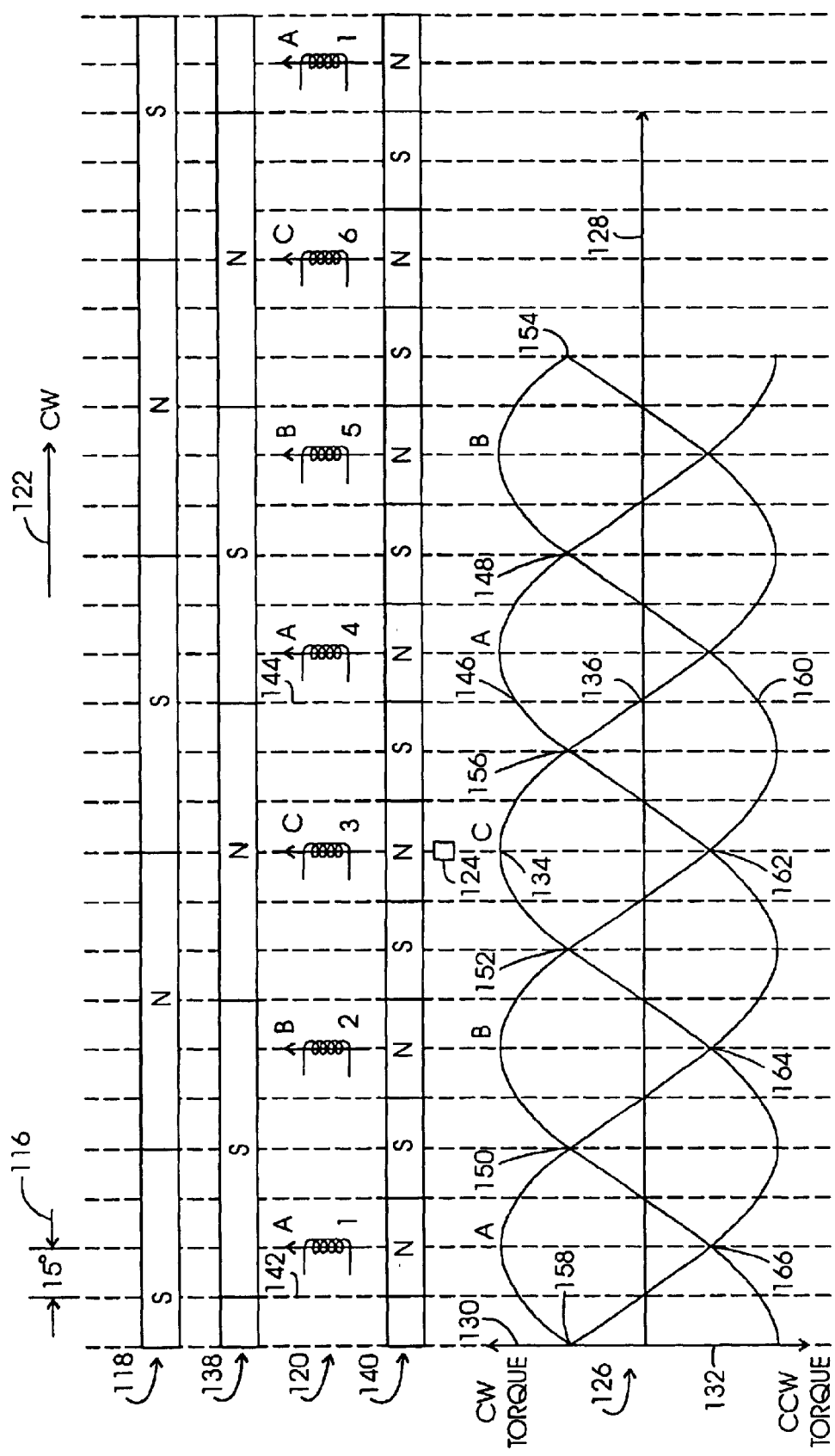
FIG. 4 is a motor schematic layout and torque curve diagram describing a three-phase unipolar motor embodiment of the invention.

As in the embodiment of FIG. 4, an aligning phase initially is energized, for example, for an interval permitting energized rotation of the rotor toward the noted B stable positions identified at 198–200. For a selected direction of rotation the control system is programmed to start after the aligning phase with an initial or starting phase and then follow a defined sequence of phases upon each phase commutating transition from the sensible system. Therefore, in sequence the aligning phase B then is de-energized and a starting phase located physically over the zero torque point of the aligning phase is energized to commence operation of the motor in the direction desired. In the instant demonstration, for clockwise rotation of the rotor and control system recognition of only south to north transitions at the sensible system polar array 206, the A phase is energized and such energization continues until the next phase transition signal is derived from the sensible system 206 and sensor 202. This occurs on the torque curves 188 at points 208 or 210. The C phase then remains latched on until a C phase-to-B phase transition is generated by the sensible system 206 and sensor 202 as represented at points 212 or 214. The B phase remains latched on or energized until such time as the sensible system 206 provides a transition signal to indicate a commutational transition from phase B to phase A as represented at points 216 or 218. Note that following the energization of the starting phase, i.e., phase A, the phases are energized for 30° of mechanical rotation.

For counterclockwise rotation of the motor, winding phase B again initially is energized to cause the rotor to rotate to or toward the noted B stable position as represented at points 198–200. Phase B then is de-energized. Next, programmed starting phase C is energized until encountering a next occurring south-to-north transition at the sensible system 206 as represented at point 220 or 228. After transition point 220 or 228, phase A is energized for 30° of mechanical rotation until a transition is sensed by sensible system 206 and sensor 202 as represented at point 222 or 224. Phase B then is energized until the next sensible system 206 developed south-to-north transition, whereupon phase C is energized as represented at points 226 or 230 the cycle then repeats.

The above energization and commutational sequences for clockwise rotation are summarized or tabulated in FIG. 8. As before, the aligning phase is represented as step zero providing for the energization of phase B for an adequate interval as the rotor moves toward a B stable position. Then, as step 1, phase A is energized until a sensible system transition occurs, whereupon, as step 2, phase C is energized. Phase C energization continues for 30° of mechanical rotation and the receipt of a sensible system transition output whereupon, as step 3, phase B is energized for 30° of mechanical rotation and the receipt of a next sensible system transition output. Then, step 1 and the energization of phase A occurs until a transition signal is developed by the sensible system and the commutational sequence continues as A, C, B.

Looking to FIG. 9, a similar compilation of energization and commutational sequences for counterclockwise rotation is provided. In the events of motor operation, as before, as a step 0, the alignment phase B is energized to cause the rotor to move toward a B stable position, the approach, generally being implemented with a timing feature of the control system. Next, as a step 1, starting phase C is energized until a transition output is received from the sensible system and single sensor. Upon receipt of that transition, as a step 2, phase A is energized for 30° of mechanical rotation and receipt of a next transition output from the sensible system and Hall device. When this next transition output from the sensible system is received, as a step 3, phase B is energized, again until a transition output is received from the sensible system and sensor. Then, the control reverts to phase C as a step 1 and phase C is energized until a transition output is received from the sensible system and sensor. As noted earlier, when the rotor employs a slave type sensible system as illustrated in FIG. 1 at 102 and as illustrated in FIGS. 4 and 7, the transitions of such sensible system do not need to line up with transitions in the polar regions of the motor magnet if the angular position of the sensor is adjusted to compensate for such misalignment.

Referring to FIG. 10, a prototype circuit functioning to operate in conjunction with motor architectures as discussed in connection with FIGS. 4 and 7, is disclosed. When motor control circuits with the instant architecture are placed in typically high volume production, the requisite logic is supplied to integrated circuit manufacturers, whereupon a typically computerized or computer assisted design procedure prepares the ultimate chip. As indicated earlier herein, depending upon power switching requirements, the entire circuit including the single Hall effect sensor may be integrated upon a single chip. This permits the use of higher efficiency three-phase motors for low cost applications heretofore implemented with one or two phase motor architectures which are inherently inefficient.

In the figure, paired windings representing phases A, B and C are represented with that labeling in general at 234. These windings are coupled at line 236 with plus voltage supply. For the instant demonstration that supply will be at twelve volts. The opposite side of the windings of phase A at line 238 extends to the drain terminal of a power switching (MOSFET) transistor 240. In similar fashion, the opposite side of the windings of phase B extend via line 242 to the drain terminal of power switching (MOSFET) transistor 244 and the opposite side of the windings of phase C extend via line 246 to the drain terminal of power switching (MOSFET) transistor 248. Correspondingly, the source terminal of device 240 is coupled via line 250 to minus D.C. supply. The source terminal of device 244 is coupled via line 252 to line 250 and similarly, the source terminal of device 248 is coupled to line 250 via line 254.

Looking to the opposite side of the circuit, plus D.C. power supply is supplied through on/off switch S1 at line 256 to the circuit. Line 256, in turn, is coupled via line 258 and resistor R1 to minus supply at line 250. A voltage thus is placed across resistor R1. Line 258 additionally is coupled via line 260 to an alignment phase timing network represented generally at 262 and comprised of resistor R2, capacitor C1 within line 264 extending between line 260 and line 250 and an inverter 266. Recalling the C stable point 136 discussed in connection with FIG. 4, the timing network 262 functions to energize phase C from device 248 for an interval selected to permit the rotor as at 118 to assume the orientation shown at 138. Typically, that interval will be about 200 ms. With the exception of this RC circuit 262, the circuit at hand performs with a digital nature. Accordingly, in the description to follow, a plus voltage is deemed a logic "1" while a zero or near zero voltage will be considered a "0". Also extending between lines 258 and 250 is line 268 incorporating resistor R3 and switch S2. Resistor R3 functions to bring line 270 to a logic 1 level, while switch S2 is a motor rotational direction selection switch. In the open orientation shown, switch S2 will cause the motor to operate in a counterclockwise direction in accordance with the conventions established in conjunction with FIG. 4. Next coupled between lines 258 and 250 is a single output Hall effect sensor 272. In this regard, one input from device 272 is coupled via line 274 to line 258 and the opposite side of the device 272 is coupled via line 276 to line 250. The output of device 272 at line 278 is deemed a clock (CLK) output. Inasmuch as the Hall device 272 output is of an open collector variety, a pull-up resistor R4 is coupled within line 256 to output line 278. A sensor derived clock output at line 278 is seen directed to the common clock input of a D-type flip-flop represented within dashed boundary 280. Device 280 may be provided, for example as a type CD40175BCN D-type flip-flop with a common clear, marketed by Fairchild Semiconductor Corp. of Portland, Me. Within the device 280, flip-flop I is coupled with flip-flop II in a manner establishing a counter function counting from one to four at the Q and $\overline{Q}$ outputs of the devices. Note that the Q output of device I is coupled via lines 282 and 284 to the D input of flip-flop II. Correspondingly, the $\overline{Q}$ output of flip-flop II is coupled via lines 286 and 288 to the D input of flip-flop I. A common clear input to device 280 is applied via line 290 and dual inverter 292 to the clear inputs of devices I and II as represented at lines 294 and 296. Note, additionally, that the clock signal at line 278 is coupled to the clock inputs of devices I and II via inverter 298 and lines 300 and 302.

With closure of switch S1 at time $T_0$ the voltage across capacitor C1 of the FC network 262 is 0 and, thus, a logic 0 level is applied to the input of inverter 266. Accordingly, the output of device 266 at line 304 is a logic 1 level. That logic 1 is conveyed via line 306 to one input of a NOR gate 310 operably associated with phase A. Additionally, the logic 1 is applied via connecting line 314 to one input of NOR gate 311 operably associated with phase B, and through connecting line 316 to one input of NOR gate 312 which is operably associated with phase C. It may be recalled that NOR logic requires a 0 logic level input at all of its inputs in order to provide a logic 1 level at its output. Any other combination at the input will result in a logic 0 level output. Accordingly, the 1 input to gates 310 and 311 emanating from lines 304 and 306 will render a 0 logic level at their outputs, notwithstanding the other inputs. Thus, the output of gate 310 at line 318 at this time is at a logic 0 level. The line is seen to extend through gate resistor R5 to the gate of switching device 240. With the arrangement, phase A is un-energized because MOSFET transistor 240 is an N-channel device which requires a plus level voltage relative to its source to turn it "on". In similar fashion, the output of NOR gate 311 at line 320 extends through gate resistor R6 to the gate input of switching device 244. A 0 input level during this aligning phase results in phase B being in an off condition. The 0 output level of NOR gate 312 which is operably associated with phase C at line 322 will be at a logic 0 level during this alignment phase. However, output line 322 is directed to the input of an inverter 324, the output of which is seen at line 326 to extend through gate resistor R7 to the gate input of switching device 248. Since line 326 is at a logic 1 level, phase C is turned on. As described in conjunction with FIG. 4, the rotor of the motor is driven toward the orientation represented at 138, i.e., toward the C stable point 136.

Counting device 280 is cleared with the assertion of a 0 logic level at line 290. Accordingly, during the interval of energization of aligning phase C as established by RC network 262, the logic 1 level at line 304 is asserted at the input of an inverter 328 to provide a 0 logic level at its output line 330 incorporating resistor R8 and extending to line 290. No output will be recognized from Hall device 272 if it should occur during the alignment phase inasmuch as the clear line 290 will be held at a 0 and thus clamping and setting the outputs Q and $\overline{Q}$ of the D flip-flops I and II at 0 for the Q outputs and 1 for the $\overline{Q}$ outputs throughout the alignment phase energization. As identified at step 0 in the truth table for device 280 set forth in FIG. 11, the Q output of flip-flop I at line 282 is then at a 0 logic level. That 0 logic level is asserted via line 332 to one input of an exclusive OR gate 334. The opposite input to gate 334 is provided from line 270 and, in view of the open condition of switch S2, that line will be at a logic 1 level. It may be recalled that exclusive OR logic requires either a 0, 0 or 1, 1 logic level input to provide a 0 logic level at its output. Accordingly, the output of gate 334 at line 336 is at a logic 1 level. Line 336 is seen directed to one input of NOR gate 310 and via line 338 to the input of inverter 340. As a result, a 0 logic level is applied to one input of gate 311 via line 342.

The $\overline{Q}$ output of flip-flop I is asserted via line 344 to one input of NOR gate 346. Further, the opposite input to that gate emanates from the $\overline{Q}$ output of flip-flop II via lines 286 and 288 which, during the energization of the alignment phase, is at a logic 1 level. Under these conditions the resultant output of gate 346 at line 348 is at a 0 logic level which is asserted to one input of NOR gate 312. The Q output of flip-flop II is at a 0 logic level during the alignment phase energization. This 0 logic level is provided at line 350 which is directed to one input of NOR gate 310 and via line 352 to an input to NOR gate 311.

With the logic thus described, alignment phase C is energized for the interval determined by aligning RC network 262. At the termination of the alignment interval, the input to inverter 266 has reached a logic 1 level and thus, its output at lines 304 and 306 carry a 0 logic level. The 0 logic level is asserted at line 316 to NOR gate 312. The opposite input to gate 312 at line 348 also is at a logic 0 level to cause line 322 to assume a logic 1 level and line 326 at the output of inverter 324 to assume a 0 logic level turning off switching device 248 and de-energizing phase C. As noted above no outputs from Hall device 272 due to the motor rotor moving will have been recognized during this aligning time. The logic represented at FIG. 11 for counter function 280 shows that the outputs of flip-flops I and II have not changed at step 1 and the counterclockwise computational sequence shown in FIG. 6 indicates that for step 1, phase B will be energized. Accordingly, at this juncture the inputs to gate A from lines 306, 350 and 336, respectively, will be at 0, 0, 1 logic levels such that its output at line 318 will remain at a 0 logic level.

Now consider the status of phase B at gate 311. The inputs to gate 311 at lines 314, 342 and 352 will be at respective logic levels 0, 0, 0 to cause output line 320 to assume a logic 1 level and thus turn on switching device 244 to energize phase B as a step 1 described in connection with FIG. 6. From this point-in-time and throughout the duration of operation of the motor, the logic level at line 304 evoked by RC network 262 will remain at a logic 0 level and, thus, the output of inverter 328 at line 330 is at a logic 1 level which is asserted via line 290 to the clear input of counting function 280. The counting function 280 therefore is enabled for purpose of recognizing a transition signal or clock pulse from the Hall device 272 at line 278. In effect, the rotor of the motor is rotationally advancing in a counterclockwise direction toward a next sensed transition as described at FIG. 4 at point 162, at which time commutation to phase A will occur as described at step 2 in connection with FIG. 6. During the initial energization of phase B, the logic 1 level at line 330 also will be asserted at the anode of diode D1, the cathode of which is coupled via line 354 to the output of an inverter 356. The input of inverter 356 is coupled via line 358 to the output of a NOR gate 360. The inputs to gate 360 during the energization of phase B will be a logic level 0 at line 282 as well as a logic level 1 from the $\overline{Q}$ output of flip-flop II as asserted via lines 286, 288 and 362. The result is a 0 logic level at line 358 and a logic level 1 at line 354 which functions to back bias diode D1 and maintain a removal of the clear signal from line 290.

Device 280 being released to respond to a count or clock input from line 278, a 0 to 1 transition clock input from line 278 will provide a transition for step 2 to an energization of phase A. With the occurrence of that 0–1 level transition at line 278 the output of flip-flop I changes as represented in FIG. 11 step 2 such that its Q output is at a 1 logic level and its $\overline{Q}$ output is changed to a 0 logic level. The outputs of flip-flop II do not change inasmuch as at the transition occurrence there was a 0 logic level at its D terminal. Correspondingly, the D terminal of flip-flop I was provided a logic level 1 as the transition occurred. The logic level 1 at line 282 now is asserted via line 332 to one input of exclusive OR gate 334. Inasmuch as the opposite input thereto at line 270 remains at a 1 its output at line 336 is at logic level 0. That level is asserted to one input of NOR gate 310 and to one input of NOR gate 311 as a 1 logic level via line 338, inverter gate 340 and line 342. Device 244 is now turned off as a result of the 1 input and therefore 0 output of gate 311. Line 350, extending from the Q terminal of flip-flop II remains at a 0 logic level and line 306, as described above remains at a 0 logic level. Accordingly, the output of gate 310 at line 318 assumes a logic 1 level to turn on switching device 240 and thus energize phase A. As described in connection with FIG. 4, phase A remains energized until the next 0–1 logic level transition occurs at line 278 and as represented at 164 in FIG. 4, at that transition, phase C is energized as represented at step three in FIG. 6. As the 0 to 1 logic level transition representing entry into phase C occurs at line 278, the D terminal at flip-flop I is at a logic level 1, being coupled via lines 288 and 286 to the $\overline{Q}$ output of flip-flop II, therefore the Q output of flip-flop I remains at a 1 level. However, flip-flop II responds to the transition clock pulse and, as shown at step 3 in FIG. 11, responds such that its Q output at line 350 is switched to a logic level 1 and its $\overline{Q}$ output at line 286 to a logic level 0. The resultant logic level 1 at line 350 is directed to gate 310 and thus, its output at line 318 reverts to a 0 logic level and phase A is turned off. Line 352, extending from line 350, also alters to a logic 1 level which is asserted to one input of NOR gate 311. Input line 342 to gate 311 remains at a logic 1 level and line 314 extending from line 306 remains at a 0 logic level. Accordingly, the output of gate 311 at line 320 is at a 0 logic level and phase B remains un-energized. Looking to gate 312 in phase C, the $\overline{Q}$ output of flip-flop II has transitioned to a 0 logic level which is asserted via lines 286 and 288 to one input of NOR gate 346, The opposite input to that gate from line 344 and the $\overline{Q}$ output of flip-flop I remain at a 0 logic level and thus, the output of gate 346 at line 348 reverts to a logic 1 level. That logic 1 level is asserted at one input of gate 312, the opposite input thereto being from lines 306 and 316 which remain at a 0 logic level. Accordingly, the output of gate 312 at line 322 reverts to a 0 logic level which is inverted at inverter 324 to provide a logic 1 level at output line 326 to turn on switching device 248 and energize phase C.

On the next 0–1 transition or clock input to counting function 280 at line 278, as indicated at FIG. 6, the logic will revert to step 1 and the energization of phase B. Looking to counting function 280, the D terminal of flip-flop I will be at a 0 logic level by virtue of its connection with the $\overline{Q}$ output of flip-flop II. Accordingly, the next transition signal at line 278 will cause flip-flop I to revert to a 0, 1 level status at its respective Q and $\overline{Q}$ outputs. The corresponding D terminal at flip-flop II had a logic level 1 asserted upon it by virtue of its connection with the Q output of flip-flop I via lines 282 and 284, therefore no change in the Q and $\overline{Q}$ outputs is brought about by the 0–1 clock transition since Q was at a 1 level and $\overline{Q}$ was at a 0 level. At that 0–1 transition, line 332 extending to exclusive NOR gate 334 from line 282 becomes a logic level 0 while line 270 remains at a logic level 1. This results in a logic level 1 at output line 336 which is directed via line 338 to inverter 340 to provide a logic level 0 at line 342 extending to NOR gate 311. The input to gate 311 at line 314 from line 306 remains at a 0 logic level.

Looking to gate 346, the input thereto from line 288 emanating from the $\overline{Q}$ terminal of flip-flop II is at a logic 0 level, while the opposite input to the gate from line 344 and the $\overline{Q}$ of flip-flop I is now at a logic level 1. The output of gate 346 at line 348 becomes a 0 logic level along with the input to gate 312 and the opposite input thereto from lines 306 and 316 is at a 0 level. The resultant output at line 322 of gate 312 is a logic level 1 which is inverted at inverter 324 to provide a logic level 0 at line 326. As a consequence, phase C is de-energized. Looking again to gate 311, the Q output of flip-flop II is at this instant at a 1 which is asserted via lines 350 and 352 to the input of NOR gate 311. This results in a 0 logic level output at line 320 for, as will be seen, an instant in time. Accordingly, gates 310–312 are all in a condition de-energizing their associated phase.

However, returning to NOR gate 360, its input lines 282 and 362 are at 0 logic level and its output at line 358 is at a logic level 1 which is inverted at inverter 356 to provide a 0 logic level at line 354 to permit the forward biasing of diode D1 causing line 290 to revert to a 0 logic level and assert a clear to the counting function 280. Flip-flops I and II are simultaneously cleared, their Q and $\overline{Q}$ terminals setting respectively to 0 and 1 logic levels. The result is a return to step 1 as described at FIGS. 6 and 11 with the resultant turning on of phase B as described in connection with the initial step one. The interval during which all three-phases were turned off is a manner of microseconds, i.e., the time for a D flip-flop to change states.

At this point in time, as above-discussed a 0 logic level is asserted from lines 282 and 362 to NOR gate 360. As soon as the above clear or reset of the counting function 280 occurs, line 362 returns to a logic level 1 due to its connection to $\overline{Q}$ terminal of flip-flop II; the output of gate 360 at line 358 reverts to a 0 logic level; and thus, the output of inverter 356 at line 354 returns to a logic level 1 to back bias diode D1. This removes the clear input from line 290, that line reverting to a logic 1 level. Accordingly, the clear signal at line 290 occurs only for the time it takes to reset the counter function 280. Counter function 280 normally would count to four before repeating itself. Therefore, a reset is forced after three counts which represents the function of devices 360, 356 and diode D1.

Closure of switch S2 will cause the circuit to perform in the commutational phase sequence set forth in FIG. 5. For the circuit of FIG. 10 to perform in conjunction with a motor architecture as described in conjunction with FIG. 7, gate 311 is connected as a C phase energization stage and gate 312 is connected as a B phase energization component.

As noted earlier herein, alternate sensor approaches can be used with respect to the single sensor shown as a Hall device represented at block 272. Looking momentarily to FIG. 10A an optical based sensor is represented within dashed boundary 272'. Sensor 272' is a reflective type performing in conjunction with reflective and non-reflective surfaces symbolically represented at 391. Sensor 272' is seen to employ a resistor R29 and light emitting diode D11. The diode D11, when energized, provides a light source reflected by the surface 391 and which is detected by a photo detection circuit 392 to provide sensor outputs at line 393.

Referring next to FIG. 10B, an optical sensor 272" is seen to perform in conjunction with a sensible system interruption surface 394 which will transmit light through select portions thereof. Surface 394 performs in association with resistor R30, light emitting diode D12 and photo detection circuit 395. With the arrangement, the sensor output is derived at line 396. FIGS. 10A and 10B illustrate the interchangeability of sensor forms from magnetic base to optical base. As is apparent, a similar output signal is provided at lines 393 or 396 as is evolved at line 278 with respect to Hall sensor 272.

Essentially the same circuit design approach as discussed above in connection with FIG. 10 can be employed to operate the single sensor system of the invention with, for example, a three-phase bipolar architecture. As noted above, the circuits essentially are digital in nature and may be implemented with a variety of devices including microprocessors, programmable logic devices and the like, depending upon the practices of any given circuit designer/manufacturer.

The discourse now turns to a four-pole rotor and six-pole stator motor architecture as discussed in connection with, FIGS. 1, 2, and 4. However, the architecture is provided in conjunction with a three-phase bipolar drive as opposed to the unipolar drive disclosed in connection with FIG. 4. Bipolar drive while, for example, adding the cost of three additional power switches, exhibits a more efficient utilization of the copper windings, as well as the magnetic regions of the rotor. In this regard, two phases will be energized at any given time if a Y form of motor phase connection is employed. This arrangement is illustrated in connection with FIG. 12. Another advantage of the bipolar approach is that commutation occurs theoretically at 86.6% of peak torque. In contrast, the three-phase unipolar architecture as discussed above carries out theoretical commutation at 50% of peak torque.

For simplicity of illustration, only one winding is shown for each of the phases A, B and C and an assumption is made that an application of positive voltage to the dot shown adjacent the winding provides for generation of a south pole at an energized stator pole. For the Y winding as shown or, for example, a delta winding, a combination of six phase energization steps is provided for 360° of electrical rotation as represented in the tabulations of the commutation sequences for clockwise rotation as in FIG. 13, or counter-clockwise rotation as in FIG. 14. These tabulations also show an alignment step 0 which, as before, is utilized only at the start-up of a motor. The term "top" indicates connection to a positive top rail (motor supply voltage) and the term "bottom" indicates connection to a negative bottom rail or ground. As an additional convention, where an indication is made that, for example, phase AB is energized, that means that phase A is coupled to the positive top rail and phase B is coupled to the negative bottom rail as shown in the phase sequence FIGS. 13 and 14. Returning to FIG. 12 step 0, note that the C phase is indicated as being coupled to a top or positive rail, while both phases A and B are shown connected to a bottom or negative rail. This is the initial alignment energization scheme which, in effect, represents an energization of phase C, inasmuch as CB and CA are on or energized simultaneously, A– and B– mutually cancel out, leaving a C+ energization which will be seen to achieve a C+ stable position.

Figure 15:
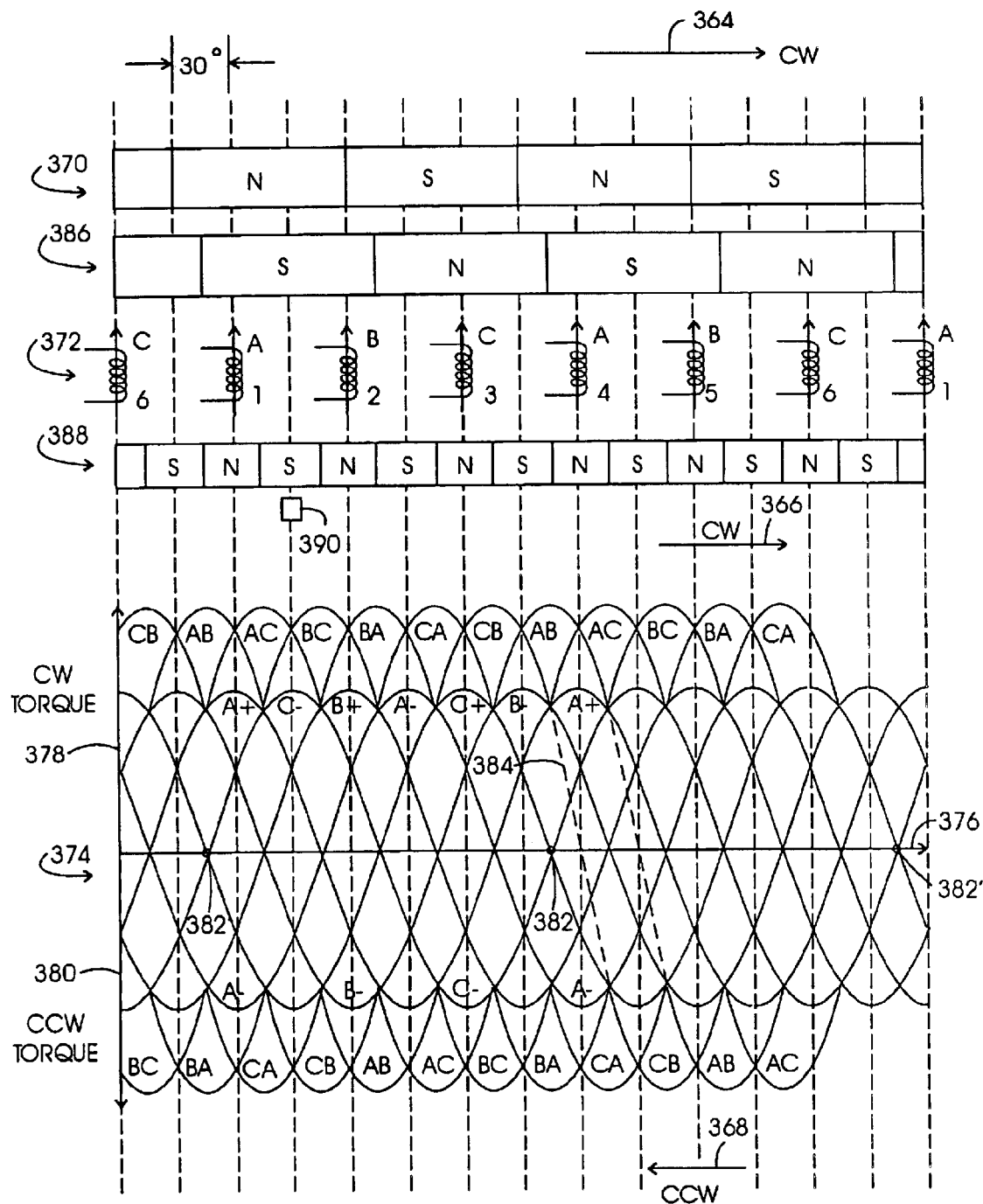
FIG. 15 is a motor schematic layout and torque curve diagram describing the operation of a three-phase bipolar motor incorporating the single sensor and sensible system of the invention.

Referring to FIG. 15, motor schematic layout diagrams and torque curves again are represented in conjunction with a sequence of vertical dashed lines, the spacing between which represents 30° of mechanical rotation of a rotor or 60° of electrical rotation. Clockwise rotation of the rotor involved is represented in the sense of left to right in the figure as indicated at arrows 364 and 366, while counterclockwise rotation of the rotor is in the sense of right to left in the figure as represented at arrow 368. Further, it is assumed that paired phases AB (A+. B−) represent the initial phase for energization in a clockwise operation following the movement of the rotor to a stable position during an aligning phase. Conversely, it is assumed that energization of BA (B+, A−) paired phases is initially carried out following an aligning phase for counterclockwise operation. Additionally, it is assumed that the control circuit at hand responds to both a north-to-south and south-to-north transition of sensible system magnet 388.

A schematic developed representation of the rotor magnet, in particular, the magnet side facing the stator poles is represented in general at 370. As before, the stator poles with associated windings are schematically represented in general at 372 along with an identification of associated phases A, B and C. For convenience, the poles are sequentially numbered 1–6. Torque curves for the bipolar energization at hand are represented generally at 374. Angular rotation again is represented as an x-axis oriented arrow 376, while clockwise torque levels are represented by upwardly directed y-axis arrow 378 and counterclockwise torque intensity is represented downwardly directed by y-axis arrow 380.

To achieve proper start-up of the motor, it again is necessary to drive the rotor toward a stable point during the energization of an alignment phase, that phase, generally, being in adjacency with a desired starting bipolar phase pair selected for either clockwise or counterclockwise rotational direction. For the demonstration at hand, a stable position is shown at point 382 or 382' representing a location on the torque curves of zero torque and which is a C+ stable position. Torque curves 374 for bipolar performance are represented by the uppermost or lowermost phase pair curves. In this regard, for clockwise performance, the six bipolar phase pair curves are identified as the sequence AB, AC, BC, BA, CA, and CB, as shown in connection with FIG. 13. Correspondingly, the energized bipolar phase pairs in a counterclockwise commutational sequence are: BA, BC, AC, AB, CB, CA as shown in connection with FIG. 14. For convenience of illustration and description, the portions of the phase curves with torque values below the level of commutation are not illustrated. In this regard, for example, should an entire phase pair torque curve CB be illustrated it would include that portion represented by the dashed curve completion line 384. This permits torque curves for the discrete six phases A+, C+, B+, A−, B− and C− to be illustrated. It may be observed that the C+ phase curve establishes the stable position 382 or 382' by virtue of its intersection with zero torque arrow 376. This stable orientation of the rotor is represented schematically in developed form in general at 386. Note that a north pole from the rotor as in the array at 386, is centered over a positively excited C phase at stator poles three and six. As noted earlier, the assumption is made that a plus energization of a stator doted winding provides a south polar sense.

Slaved to and aligned with the rotor is a sensible system array of magnetic regions of alternating polarity shown generally at 388. The sensible system array additionally is shown as it is aligned with the rotor when positioned as shown in general at 386. Note that there are three discrete sensing regions for each pole of the rotor magnet or six such sensible system regions for each 360° of electrical rotation. The single sensor, here a Hall device, is shown as a block at 390. Sensor 390 is positioned as being centered on the south region of sensible system 388 but either a north or a south region of the sensible system may be centered over sensor 390 for the convention shown. This corresponds with the stable position 382.

As discussed in connection with FIGS. 12 and 13, to carry out clockwise rotation, the aligning phase initially is excited. In this regard bipolar phases CA and CB are simultaneously excited to, in effect, create the C+ phase which drives the rotor toward the stable position 382 or 382' which is represented at the rotor magnet array 386. By contrast, for example, if phase CB were energized alone as an aligning phase, the stable position would be represented as the intersection of line 384 with arrow 376. That position is in direct alignment with either of two commutation points for clockwise or counterclockwise rotation. Such an arrangement would be undesirable. The alignment phase then is de-energized and clockwise rotation commences with energization of the bipolar phase AB. Note that significant torque is available for this clockwise startup. As described in connection with FIG. 4, the counter array is held in a cleared state during step 0 or the alignment phase and is released from that cleared condition at the commencement of step 1. Thus, a south-to-north or north-to-south transition detected by sensor 390 will be responded to, to transition from bipolar phase AB to step 2 representing bipolar phase AC. Bipolar phase AC remains excited until a next transition signal is detected at Hall device 390. Step 3 then ensues with the energization of bipolar phase BC. The commutation sequence then responds at a next transition detected by sensor 390 to enter step 4 with energization of bipolar phase BA until the next transition is detected at sensor 390. As step 5 in the sequence bipolar phase CA is energized, again until a transition is detected at single sensor 390 whereupon the 6$^{th}$ step in the sequence occurs with the energization of bipolar phase CB. The routine then ignores step 0 and continues on a next sensed transition with the energization of bipolar phase AB.

As described in connection with FIG. 14, to achieve counterclockwise rotation for the instant demonstration, step 0 or the alignment phase energization initially is carried out with simultaneous excitation of bipolar phases CA and CB. This causes the rotor to assume the orientation shown at 386. Then the bipolar aligning phase energization is terminated and step 1 is carried out with the energization of bipolar phase BA. As before, the counter clearing activity taking place during the alignment phase energization is released so that transitions are recognized from single sensor 390. Upon the first occurring transition step 2 is entered with the energization of bipolar phase BC in the commutation sequence. Then, upon receipt of a next transition signal, step 3 is entered with the energization of bipolar phase AC. This energization continues until receipt of the next transition and entry into step 4 with the energization of bipolar phase AB. Phase AB continues to be energized until receipt of the next transition signal from the sensor 390 and step 5 is entered with the energization of bipolar phase CB. Phase CB continues to be energized until single sensor 390 recognizes a next transition and the system then carries out the step 6 energization of bipolar phase CA. Upon receipt of the next transition signal at single sensor 390 the commutation sequence continues with the carrying out of step 1 energization of bipolar phase BA.

For the 6 steps at hand, three D-flip-flops are called for which are identified I, II and III. These three flip-flops are fully utilized such that no resetting is called for as was the case in connection with FIG. 4. The three flip-flops perform as a counter in conformance with the truth table set forth in FIG. 16.

Figure 17:
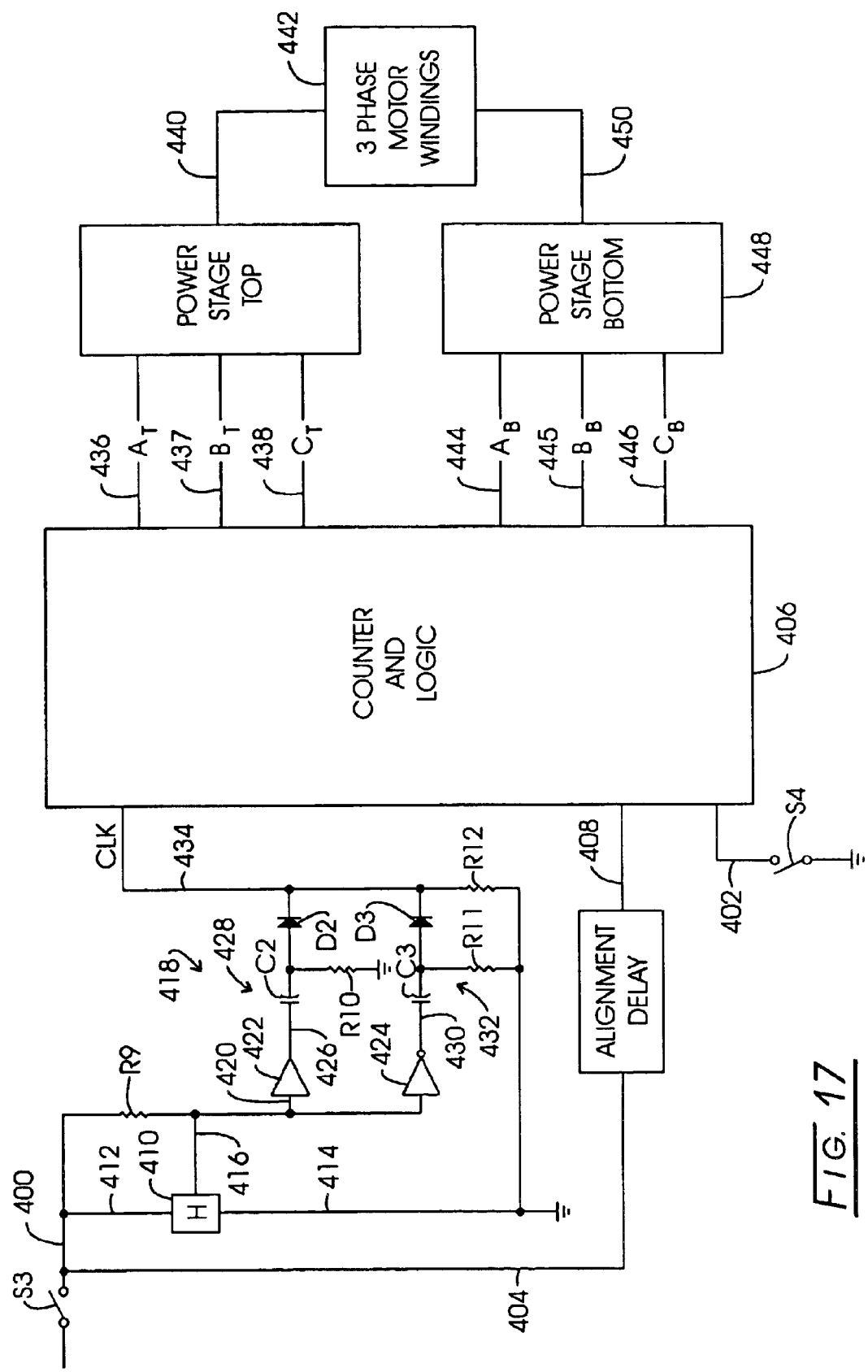
FIG. 17 is an electrical schematic and block diagram of the control system for the motor of FIG. 15.

Referring to FIG. 17, a schematic circuit diagram is provided corresponding with the motor architecture of FIG. 15. As noted, the circuit is implemented with three as opposed to two D-type flip-flops. However, six power switching devices are employed as opposed to three and the single sensor provides a signal on each transition whether it be south-to-north (0 to 1) or north-to-south (1 to 0). Accordingly, a circuit arrangement for generating identical sharp pulses corresponding to each such transition is shown. Looking to the figure, switch S3, as it is located at line 400, is coupled with a D.C. source and its' closure provides for the startup of the motor. Correspondingly, switch S4 at line 402 is opened or closed to provide respective clockwise or counterclockwise rotor rotational direction. Closure of switch S3 also supplies voltage as represented at line 404 to an alignment delay circuit having a time-out interval, for example, of about 200 milliseconds which may for prototyping purposes may be implemented as described in FIG. 10. The alignment delay output condition is asserted to counter and logic gate functions as represented at block 406 via line 408. A single sensor, implemented as a Hall effect device 410 is activated as represented at lines 412 and 414 and provides an output at line 416. Line 416, as before, is connected to line 400 incorporating a pull-up resistor R9 which is provided in view of the open collector output of device 410. In general, that output transistor will be on or off depending upon whether, for example, a north or a south sensible system region as at 388 is operationally associated therewith. Because the control is called upon to carry out a phase transition upon each south-to-north or north-to-south transition, a signal treatment network 418 is provided. In this regard, a 0 to 1 transition will be asserted simultaneously from line 416 to line 420 and buffer 422 and additionally to an inverter 424. The output of buffer 422 at line 426 is directed to a differentiation network 428 comprised of capacitor C2 and resistor R10. Correspondingly, the output of inverter 424 at line 430 is directed to a differentiation network 432 comprised of capacitor C3 and resistor R11. The outputs of differentiating networks 428 and 432 are directed from line 426 to the anode side of a diode D2 and, correspondingly, from line 430 to the anode side of a diode D3. Diodes D2 and D3, for example, pass only positive going signals and, thus, a common, i.e., positive-going and sharp clock pulse is presented at line 434 on each north-to-south or south-to-north transition evoked by the movement of sensible system magnetic regions as described at 388 in FIG. 15. This combination provides the phase commutating attribute discussed earlier that supplies the control system with positional phase commutating information necessary for accurate sequencing of the motor phases at the point where the torque curves of the motor intersect keeping maximum torque available at all times for most efficient operation. A load resistor R12 is provided in line 434 in avoidance of an infinite impedance feed condition. Phase commutating pulses are employed subsequent to carrying out the aligning phase as tabulated at FIG. 16. The logic outputs for the A top phase, B top phase and C top phase are presented at respective lines 436–438 to a power stage top comprised of, for example, the same type (MOSFET) transistors described in conjunction with FIG. 10. Those transistors, in turn, as represented at arrow 440 function to drive the noted three-phase motor windings as represented at block 442. Correspondingly, the logic outputs for A phase bottom, B phase bottom and C phase bottom are presented at respective lines 444–446 to a power stage bottom represented at block 448 and again comprised of MOSFET power switching devices. These devices are coupled with the three-phase motor windings at block 442 as represented by arrow 450.

The discourse now turns to application of the sensible system and single sensor approach with a motor architecture exhibiting four unipolar phases. The architecture, in particular looks to a four pole rotor combined with an eight pole stator. As in the embodiment of FIG. 4 the assumption is made that the phases will be excited in a south polar sense for unipolar operation. Additionally, the sensible system and singular sensor are of the magnetic type and provide a phase transition output for each sensible alternating polar transition whether from north-to-south or south-to-north.

Figure 18:
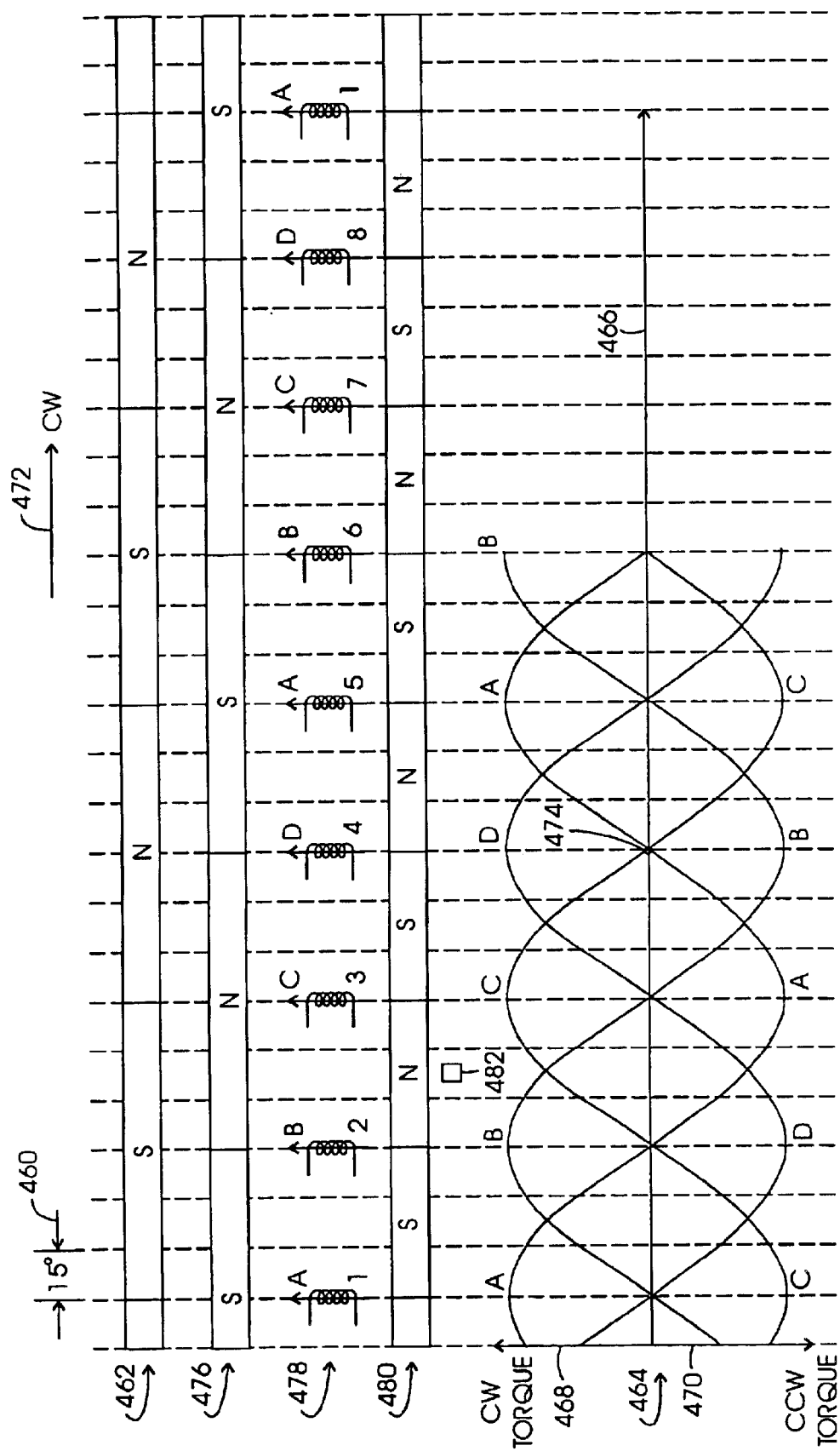
FIG. 18 is a motor schematic layout and torque curve diagram for a four-phase unipolar D.C. PM motor with a four pole rotor and eight pole stator incorporating the sensible system and single sensor of the invention.

Referring to FIG. 18, the schematically developed magnetic regions and torque curves are aligned with an array of vertical parallel dashed lines wherein, as represented at arrow pair 460 spacing between the adjacent ones of the dashed lines corresponds with 15° of mechanical rotation of the rotor. In the latter regard, the stator pole facing surfaces of the rotor magnets are shown in developed form in general at 462 in an orientation representing a maximum phase C torque generating condition. Torque curves for this four-phase implementation are represented in general at 464 and are formed in conjunction with an x-axis arrow 466 representing angular rotation, and upwardly directed ordinate arrow 468 representing torque level for clockwise rotor rotation and at ordinate arrow 470 which represents the level of torque for counterclockwise rotation. Clockwise rotation in the diagram is considered from left to right in the sense of the figure as represented at arrow 472. For the instant demonstration, the C phase is elected as the alignment phase and accordingly, the C phase is energized for an alignment interval of, for example, 200 ms, as the rotor is driven toward a stable orientation or point of zero torque. Such a stable position is shown at the C phase intersection with arrow 466 at point 474. As the rotor of the motor is rotated into the position establishing that stable position 474 it will assume the orientation shown in developed form in general at 476. Looking to the array of eight stator poles as represented in general at 478, again, these stator poles are identified by their associated phase A, B, C and D and they are numbered one through eight. Note that with the energization of the aligning phase C, pole three and seven, having a south excitation, are centered on the rotor north poles with respect to the stator poles. The sensible system array of alternating pole polarities is represented generally at 480. Note that there are two sensible system magnetic pole regions for each rotor polar region or four sensible system transitions for each 360° of electrical rotation, i.e., for every north-south magnet region pair in the rotor, the sensible system will have two north and two south magnetic regions. The singular sensor, here implemented as a Hall device is centered over either a north or south sensible system pole for the alignment stable orientation. Such a sensor and its location is represented at block 482.

Referring additionally to FIG. 19, the operational sequence for phase energization with respect to the instant embodiment is tabulated. Again, the alignment phase is represented as a step 0 wherein phase C alone is energized for an alignment interval of, for example, 200 ms such that the orientation of the rotor and sensible system are as shown respectively at 476 and 480. Next, as a step 1, for clockwise rotation, phase D is energized and the counter is enabled from a clear condition. As sensor 482 detects a first polar transition in the sensible system 480 the energization of phase D is terminated and step 2 ensues with the energization of phase A. The system then latches the energization of phase A until the sensible system and single sensor 482 derive a next polar transition, whereupon phase A is de-energized and step 3 ensues with the energization of phase B. Phase B is latched in an energized state until the sensor 482 again determines a transition in the sensible system 480, whereupon step 4 ensues with the de-energization of phase B and energization of phase C. This commutational sequence then continues with a return to step 1, the de-energization of phase C and energization of phase D.

Looking additionally to FIG. 20, a similar tabulation is provided for carrying out counterclockwise rotation of the rotor. Again the alignment phase is identified as a step 0 and is carried out by the energization of phase C for an alignment interval adequate to essentially reach a zero torque stable position as described, for example, at point 474. At the termination of the alignment interval, the counters are released for response to all sensible system transitions as detected by the singular sensor 482. In this regard, rotational drive is commenced with the energization of phase B as a step 1. Upon detection of the next sensible system transition at sensor 482, the system terminates the energization of phase B and enters step 2 with the energization of phase A. This energization is latched until a next sensible system transition is detected by the singular sensor 482. Phase A is de-energized and step 3 is entered with the energization of phase D. Phase D remains latched into energization until detection of a next transition of the sensible system 480 by the single sensor 482. Phase D is de-energized and step 4 is commenced with the energization of phase C, which energization remains latched until detection of a next transition of sensible system 480 by the sensor 482, whereupon phase C is de-energized and step 1 is re-entered with the energization of phase B. The commutational sequence is repeated until such time as the motor is de-energized.

It may be observed in FIG. 18 that a primary advantage of the four-phase unipolar architecture over a three-phase unipolar motor architecture resides in the higher level of crossover in the commutation sequence as evidenced in the torque curves 464. In this regard, theoretically this cross over occurs at 70.7% of maximum torque as compared to a 50% value as illustrated in FIG. 4. Accordingly, the four-phase approach evidences less torque ripple. While the four-phase unipolar implementation is slightly more expensive than the corresponding three-phase unipolar implementation, the four-phase unipolar implementation is significantly less expensive than a three-phase bipolar implementation.

A two-phase bipolar connected motor (sometimes called four phase bipolar) has the same four step sequence as a four-phase unipolar connected motor when energized A, B, A–, B–. In this connection the unipolar phase C is connected with the unipolar phase A and the unipolar phase B is connected with the unipolar phase D, resulting in only two winding sets. In each case the two unipolar phases that are connected together are connected in reverse polarization such that when phase A (unipolar) is north polarized phase C (unipolar) is south polarized. Since the resulting two winding sets are bipolar driven, requiring eight power devices instead of four, current is driven in both directions in each winding set as part of the four step sequence resulting in the A and A– or B and B– energizations. This technique, although more costly from a control circuit standpoint, uses half the wire in the motor each step of the phase sequence cycle vs. only one quarter of the wire used in the same four step sequence in unipolar drive, resulting in higher torque.

Figure 21:
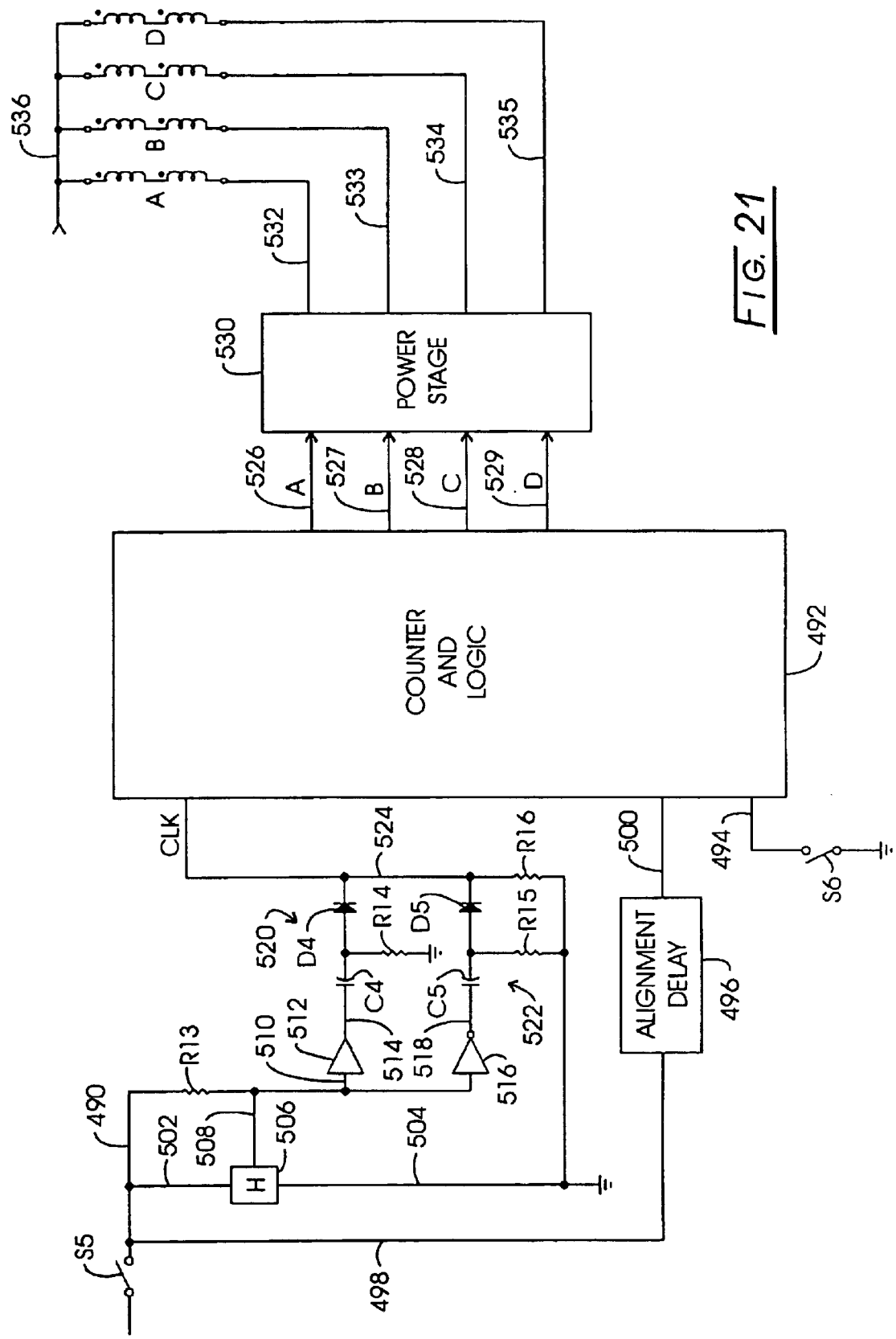
FIG. 21 is a schematic and block diagram of a control system for employment with the motor of FIG. 18.

Referring to FIG. 21, a schematic representation of a control approach to the motor represented in FIG. 18 is provided. As in the case of the embodiment of FIG. 17, the system functions to count on each polar transition of the sensible system. Accordingly, as in the case of FIG. 17, a signal treatment network is provided. Looking to the figure, start switch S5 is identified in conjunction with a power source supplied to line 490. Additionally, rotational direction is provided by appropriate actuation of switch S6. The sense of switch S6 is submitted to a counter and gate logic function at block 492 as represented at line 494. Closure of switch S5 provides power to the earlier-discussed alignment delay network as represented at block 496 via line 498. During this delay interval the alignment phase energization signal is provided as represented at line 500 to the counter logic function 492. It may be recalled that this arrangement functions to retain the counters in a cleared status during the alignment phase energization while the logic functions in conjunction with the clear condition of the counters to carry out the energization of an alignment phase, for example, the earlier described phase C.

Closure of switch S5 functions to energize or enable a single Hall effect device 506 via lines 502 and 504 having an output at line 508. As before, inasmuch as the output transistor of device 506 is of an open collector configuration, a pull-up resistor R13 is coupled between line 508 and within line 490. Line 490, as before, extends to line 510 extending, in turn, to a buffer 512 having an output at line 514. Additionally, the on or off output of device 506 at line 508 simultaneously is submitted via line 490 to an inverter 516 having an output at line 518. The output of buffer 512 at line 514 is submitted to a differentiation network 520 comprised of capacitor C4 and resistor R14. Correspondingly, the output of inverter 516 at line 518 is submitted to a differentiating network 522 comprised of capacitor C5 and resistor R15. The differentiated signal from network 520 is directed to the anode side of a diode D4, the cathode side of which is coupled to clock input line 524 leading to the counter and logic block 492. In similar fashion, the output of differentiation network 522 is directed to the anode side of diode D5, the cathode side of which is coupled to line 524. As before, a load resistor R16 is incorporated in line 524.

Referring additionally to FIGS. 22 and 23, a truth table for the two D-type flip-flops I and II as utilized in the counter component of block 492 are portrayed. As before, step 0 is a clear condition which is maintained during the alignment phase energization. Q and $\overline{Q}$ outputs then are portrayed for each of the earlier-described steps 1–4. Additionally, the status of the D terminals are listed for each of the steps. Inasmuch as four steps are utilized, no reset function is called for as described in conjunction with FIG. 10.

The counter and logic function of FIG. 21 provides phase energization outputs for phases A, B, C and D as represented by respective arrows 526–529 to a MOSFET implemented power stage represented at block 530. These power switches are, in turn, actuated to effect the energization of the dual windings of stages A–D as represented at respective lines 532–535. Those stator core windings are shown coupled to D.C. supply at line 536. The power stage MOSFETS could alternately be IGBTs (insulated gate bipolar transistors) or just bipolar transistors.

As discussed above, the combination of a single sensor with a control system employing an initial aligning phase energization with a predetermined phase operating sequence and a sensible system which supplies phase commutating transitions performs most satisfactorily under varying loads which can extend even to a stall condition. However, the sensible system and control features can incorporate a nominated reference phase in addition to the sequencing transition based information. This is carried out by assigning a particular unique reference sensing attribute to the sensible system and providing a control feature which not only reacts to commutational sequence transitions as described above but also mandates energization of the reference phase when the sensing system and single sensor identify the presence of that phase. The sensible system attribute for this reference phase may assume a variety of implementations. For example, as is disclosed hereinbelow, the reference attribute may be a magnetic region of relatively substantial length detectible by the control system and single sensor. This embodiment may be even more easily accomplished by employing an optical sensor with the appropriate sensible system in place of the example magnetic system. As another approach, the reference attribute may be achieved with levels of magnetization of a magnetic sensible system combined with a dual output Hall effect device. Where the sensible system attribute is magnetic in nature, the pattern of magnetization may be formed conjointly with the formation of the rotor magnetic regions such that no separate sensible system magnetic region carrier is required.

Figure 24:
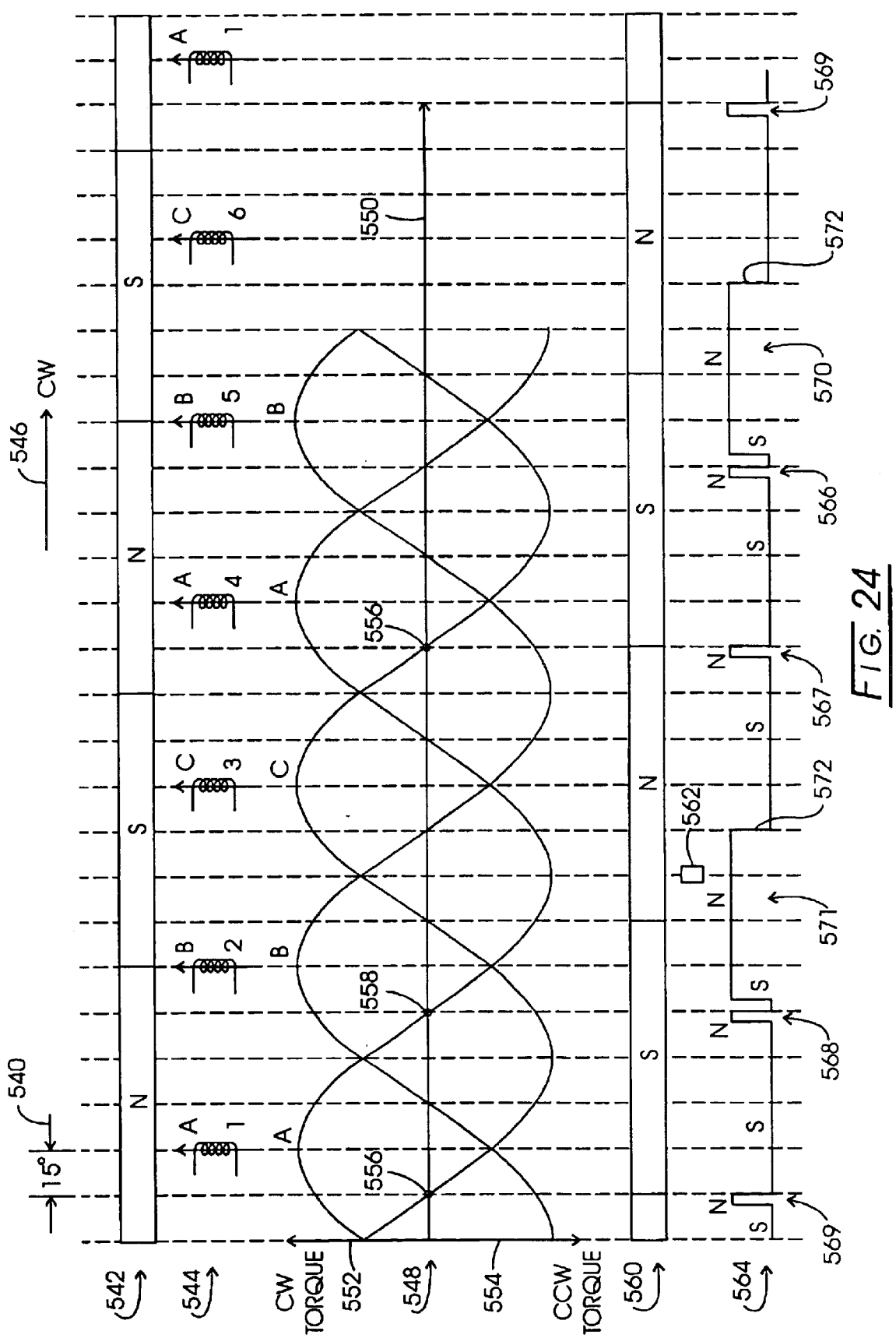
FIG. 24 is a motor schematic layout and torque curve diagram for a three-phase unipolar motor incorporating a single sensor and a sensible system for carrying out both an aligning phase energization and the utilization of a reference phase.
Figures 27, 28, 28A:
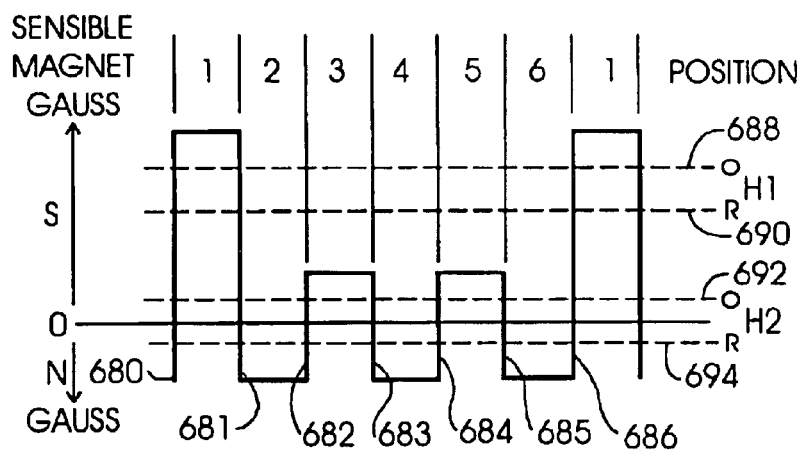
FIG. 27 is a truth table for the counting function described in connection with FIG. 26.
FIG. 28 is a schematic representation of sensible system magnetic Gauss intensities vs. position incorporating a reference phase, further showing operate or trip and release levels for a two level Hall device.
FIG. 28A is a truth table setting forth the logic state of the outputs of the two level Hall device for the architecture of FIG. 28.

Referring to FIG. 24, motor schematic layout information, rotor position and torque curves are revealed for a three-phase unipolar motor incorporating a noted reference phase in combination with the utilization of an initial aligning phase. In the figure, as before, a sequence of vertical dashed lines are presented. As represented at arrow pair 540, the spacing between adjacent ones of these vertical dashed lines represents 15° of mechanical rotation of the rotor. A schematic and developed representation of the face of the four pole rotor facing the stator poles is represented in general at 542. Below the rotor 542 the six stator poles are represented generally at 544. These six poles are shown numbered one through six and each is identified in conjunction with its assigned phase. With the arrangement, the rotor pole orientation illustrated represents an energization of phase B at maximum torque. This embodiment is operable in one direction only and that direction is assumed to be clockwise for motion from left to right in the sense of the figure and as represented at arrow 546. It is further assumed that energization of a given phase is in a south polar sense and that phase commutating or transition information is provided only as a south-to-north polar transition for carrying out the commutational sequence which is tabulated in FIGS. 25 and 27. Below the developed array of stator poles at 544 are torque curves represented generally at 548. These curves for phases A, B and C are provided in combination with a rotational angle x-axis arrow 550, a clockwise torque level arrow 552 and a counterclockwise torque arrow 554. The latter arrow is labeled for consistency. However, as noted above, this particular architecture provides for unidirectional rotor operation which for the instant demonstration is considered to be clockwise. Stable locations of the rotor for use as an alignment phase are represented, for example, at 556 and 558. For the instant demonstration, stable position 556 representing a C stable position is utilized. Next below the torque curves 548, is a developed orientation of the rotor poles following rotation to the C stable position as represented in general at 560, the single Hall effect sensor position is represented at 562 which is located under a north sensed portion of the sensible system. The sensible system is represented in general at 564. Note that the sensible system is formed as magnetic regions of relatively elongate and of short length or duration. The characteristic short duration south-to-north transitions as at 566–569 represent phase commutating attributes identifying phase transitions in the commutational sequence of phase energizations. Longer north region characteristics as at 570 and 571 represent an attribute functioning to provide an identification of a mandated reference phase which for the instant demonstration is phase A. Again note that an optical form of sensor can perform equally well in the application when the sensible system is comprised of optically detectable transitions in substitution for the long and short magnetic regions illustrated in FIG. 24 at 564. For C stable position 556, as shown in FIG. 24 and represented as step 0 in FIG. 25 shows, the starting phase for CW operation step 1, involves the energization of phase A, the selected reference phase. Accordingly, looking to the clockwise direction represented at arrow 546, the next south-to-north transition which will be recognized will be that seen at 568. That will represent step 2 as shown in FIG. 25 and the commencement of phase B. Step 3 as shown in FIGS. 25 and 27 represents the turning off of phase B and the energization of phase C. That will occur at the south-to-north transition represented at 569. As noted above, the pattern shown at 564 may be developed with the rotor poles 560 and located, for example, at the lower edge of the rotor magnets. With the philosophy of the reference phase system, whenever a reference phase attribute such as shown at 570 and 571 is encountered, the control will energize phase A in mandatory fashion notwithstanding the presence of any other phase energization. As noted in FIGS. 25 and 27, as a fourth or first step, following the energization of phase C, a next south-north transition will be represented at the commencement of one of the elongate or time extended reference attributes, for example, as seen at 572 in FIG. 24.

Figure 26:
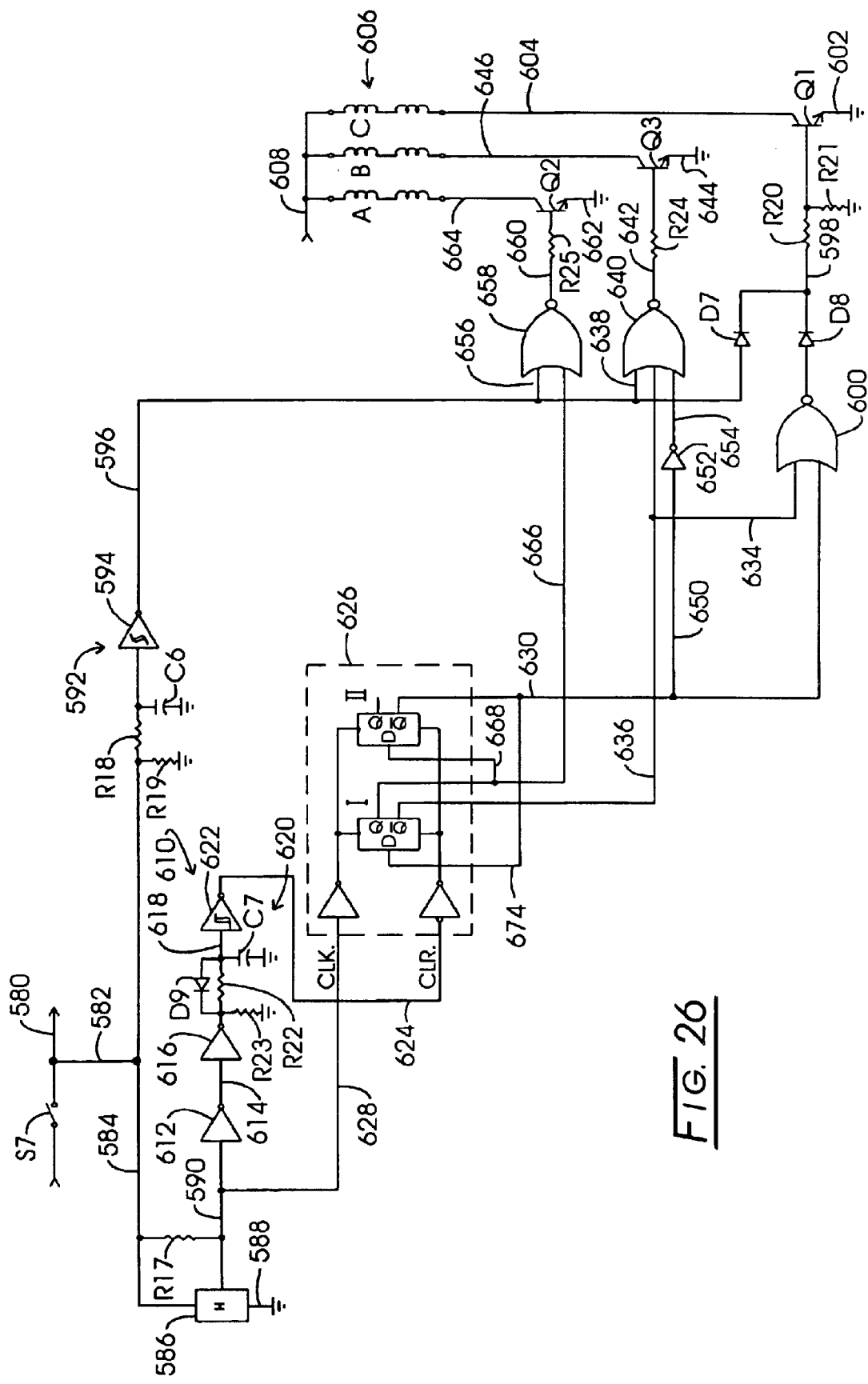
FIG. 26 is an electrical schematic diagram of the control system for the motor of FIG. 24.

In FIG. 26, the on/off switch S7 is seen located in line 580 which is coupled with the D.C. source. Line 580, in turn, extends via line 582 to line 584 extending to one input of Hall device 586. The opposite input to device 586 is coupled to ground as represented at line 588 and its open collector output is coupled with line 590. A pull-up resistor R17 is connected between line 590 and line 584. Energization of line 584 activates an alignment phase timing network represented generally at 592 and is comprised of an RC combination formed with resistor R18 and capacitor C6. A resistor R19 extending from line 584 to ground functions as a charge bleed device with respect to capacitor C6. As capacitor C6 commences to be charged, in effect, a logic 0 level is applied at the input of an inverter 594, the output of which is a 1 at line 596 and is directed through diode D7 to line 598. Line 596 connects through lines 656 and 638 to NOR gates 658 and 640. The 1 at line 596 instantly defines the outputs of the NOR gates at line 660 and 642 to be at a 0 level notwithstanding the level of the other inputs. The 0 level at lines 660 and 642 ensures Q2 and Q3 are switched off and consequently phase A and B are off. Line 598, incorporating steering diode D8 is at the output of NOR gate 600 which functions to normally control the energization of phase C during the commutational sequence of phases of A, B, C as described in connection with FIG. 25 in conjunction with steps 1–4. Returning to line 598, the diode D7 is forward biased during the alignment phase energization and is seen to direct a logic 1 level input through base resistor R20 to the gate of NPN phase C switching transistor Q1 turning it on. Where no drive or gate input is intended to be submitted to transistor Q1, it is held off by resistor R21 extending between line 598 and ground. The emitter of transistor Q1 is coupled to ground via line 602 and its collector to phase C windings via line 604. The six stator pole windings are represented generally at 606 and are seen to be coupled to source of power at line 608.

The output of Hall device 586 at line 590 is considered to be at a logic 1 level when detecting a north magnetic pole and at a logic 0 when detecting a south magnetic pole. Line 590 extends, inter alia, to the input of a clear delay network represented generally at 610. Network 610 is comprised of an initial inverter 612 having an output at line 614 extending to the input of a next inverter 616. The output of inverter 616 at line 618 is coupled with an RC timing network represented generally at 620 and comprised of capacitor C7 and resistor R22. A diode D9 extending about resistor R22 cooperates with a 0 level at the output of inverter 616 to bleed off any charge on capacitor C7 occasioned by the short 1 level output of inverter 616 due to the interaction of Hall device 586 with a short transition defining north level at the locations of the sensible system identified at 566–569. For such short pulses, line 590 will be at a logic 1 level for a very short interval. That logic 1 level is inverted at inverter 612 to provide a 0 logic level at line 614. The 0 logic level at line 614 is converted by inverter 616 to a logic 1 level at its output which, in turn, is supplied to integrating network R22, C7. The capacitor C7 begins to charge. The input of inverter 622 is positioned to respond to the charge level on capacitor C7. The short duration of intervals of charge due to the short transition defining north levels 566–569 cause the charge level on capacitor C7 never to reach an effective 1 level input to inverter 622 and therefore its output maintains a 1 level not resetting or clearing the counter stage represented by the dashed boundary 626. As before, however, a logic low level at line 624 will cause a clearing action to occur at these D-type flip-flops I and II. During the alignment interval as illustrated in connection with FIG. 24, Hall device 562 becomes positioned over an extended phase A north component of the sensible system 564. This along with the length of time of the alignment phase step causes capacitor C7 to be charged to the trip level of inverter 622 to create a clearing 0 logic level at line 624 functioning to clear flip-flops I and II. Looking momentarily to FIG. 27, the clear condition during this alignment step 0 is represented in connection with the flip-flop identification. In this regard, the Q and $\overline{Q}$ terminals of each flip-flop respectively are at 0 and 1 logic levels. Accordingly, the counting function 626 is cleared and set during the alignment phase. Thus, during the alignment phase energization, i.e., the energization of phase C through diode D7, steering diode D8 is back biased because the $\overline{Q}$ output of flip-flop II at line 630 is at a logic 1 level which is introduced to one input of NOR gate 600 causing its output at the anode of diode D8 to be at a 0 logic level. Additionally, input line 634 is seen to extend to line 636 and the $\overline{Q}$ terminal of flip-flop I. Thus, the input at line 634 is a logic 1 level reinforcing the 0 logic level output of NOR gate 600. As noted before, line 638 input to phase B associated NOR gate 640 is seen to be coupled with aligning phase input line 596 and thus is at a logic 1 level, causing the output of gate 640 at line 642 to have a 0 logic level. Line 642 incorporates resistor R24 and extends to the base of NPN transistor Q3 the emitter of which is coupled to ground via line 644 and the collector of which at line 646 extends to the phase B windings of winding array 606. Accordingly, phase B is held off. Returning to gate 640, input line 636 is seen to be coupled to $\overline{Q}$ of flip-flop I and thus carries a logic level 1 further assuring the 0 logic level at output line 642. Finally, line 650 extends to an inverter 652, the output of which at line 654 derives the third input to gate 640. Accordingly, inasmuch as line 650 is coupled with line 630 carrying a logic 1 level, line 654 asserts a 0 logic level to gate 640. In similar fashion, during the alignment interval, input line 656 to phase A, controlling NOR gate 658 will be at a logic 1 level due to its connection to line 596 causing the output of gate 658 at line 660 to have a 0 logic level. Line 660 extends through base resistor R25 to the base of NPN transistor Q2 which is the switching component for the windings of phase A of the winding array 606 and which is now held off during the aligning phase. The emitter of transistor Q2 is coupled to ground via line 662 while the collector thereof is coupled via line 664 to the paired windings of phase A of the array of phases 606. Returning to NOR gate 658, input line 666 is seen to be coupled to the Q terminal of flip-flop I and thus is at a 0 logic level. Note that line 666 is coupled to the D terminal of flip-flop II via line 668. Thus, phase A remains off during the alignment interval.

When capacitor C6 of the timing network 592 reaches the threshold of inverter 594, line 596 converts to a 0 logic level turning off phase C transistor Q1, because the output of gate 600 is also at a 0, and line 596 also asserts a logic level 0 through line 656 to phase A gate 658. Line 666 remains at a 0 logic level. Accordingly, the output of gate 658 at line 660 converts to a logic 1 level to turn on transistor Q2 and thus energize reference and start phase A. Looking momentarily to FIG. 24, the Hall effect device 586 is at the position shown at 562 with respect to the reference phase region 571 of sensible system 564. Accordingly, capacitor C7 of network 610 remains charged to hold the clear condition for the counting function 626 as represented at step 1 in FIG. 27. Inasmuch as the elongated north polar region 571 is present during a proper phase A orientation with respect to Hall device 562, the energization of reference phase A is mandated by virtue of the clear delay circuit 610 output achieving a 1 level and therefore clearing or resetting the flip-flops I and II and restoring a 0 on the output Q of flip-flop I. This can be overridden only during the aligning phase.

Reference phase A will remain energized until such time as Hall effect device 586 witnesses a south-to-north transition of sufficiently short length. As illustrated in connection with FIG. 24, near the end of the energization of phase A, a north-to-south transition occurs which releases the clear signal on flip-flops I and II and then shortly thereafter a south-to-north transition occurs, for example, as shown at 568. The extent of the north component of this transition is short thus, the output of clearing delay network 610 at line 624 which was released by the previous north-to-south transition is not reset to a 0, allowing the clock input to advance the flip-flops to step 2. The D terminal of flip-flop I is connected to the $\overline{Q}$ output of flip-flop II via lines 630 and 674 and, being at a 1 level, thus will respond to a short incoming pulse from line 628 to invert its Q output from a 0 to a 1 and its $\overline{Q}$ output from a 1 to a 0 as shown at step 2 in FIG. 27. Inasmuch as the D terminal of flip-flop II is coupled through line 668 to the Q terminal of flip-flop I, no change occurs in its output $\overline{Q}$ which remains at a logic 1 level. Line 596 and line 656 remain at logic 0 level at the input of gate 658. Line 666 has converted from a 0 to a 1 logic level and thus has caused output line 660 of gate 658 to assume a 0 logic level and thus turn off transistor Q2 terminating the energization of reference phase A. Now looking to phase B control NOR gate 640, as noted above, line 596 and thus line 638 are at a 0 logic level. The $\overline{Q}$ terminal of flip-flop I at line 636 is at a 0 logic level which is transmitted to gate 640. The $\overline{Q}$ output of flip-flop II is at a logic level 1 which is transmitted via lines 630 and 650 to inverter 652 and thence via line 654 to gate 640. Those three 0 logic level inputs then produce a logic level 1 at output line 642 to turn on transistor Q3 and thus energize phase B of the winding array 606. Phase B will remain latched on until a next south-to-north transition, for example, as shown at 569 in FIG. 24. As shown at step 3 in FIG. 27 this will cause the de-energization of phase B and the energization of the windings of phase C. Hall effect device 586 will create a short pulse output with the noted south-to-north transition representing step 3 in FIGS. 25 and 27. That transition will cause the Q output of flip-flop II at counter function 626 to assume a logic level 1 and the $\overline{Q}$ terminal to assume a logic level 0. Flip-flop I remains unchanged by virtue of the coupling of its D terminal via line 674 with the $\overline{Q}$ terminal of flip-flop II.

Looking to the phase control NOR gates, with respect to gate 640 and phase B, line 638 at its input remains at a 0 logic level. Line 636 extending to the $\overline{Q}$ output of flip-flop I remains at a 0 value and line 654 extending from inverter 652 converts to a logic 1 level by virtue of its connection via lines 650 and 630 to the $\overline{Q}$ output of flip-flop II. Thus, output line 642 converts to a 0 logic level turning off transistor Q3 and de-energizing phase B of the winding array 606. Looking to the phase C NOR gate 600, line 630, as noted above, has converted to a 0 logic level and line 634 coupled via line 636 to the $\overline{Q}$ output of flip-flop I remains at a 0 logic level. Thus, output line 598 assumes a logic 1 level to turn on transistor Q1 and energize phase C. As shown as a step 4/1 in FIGS. 25 and 27, the next phase in the commutational sequence is phase A which is the reference phase. Accordingly, a south-north transition similar to that shown at 572 in FIG. 24 will next be encountered in the transition from phase C to phase A. The initial transition acts like the short duration north poles from previous commutation steps. This causes the output of flip-flop I to invert setting the Q output to 0 and the $\overline{Q}$ output to 1. The 1 output at $\overline{Q}$ is applied to the input of NOR gate 600 via lines 636 and 634 causing its output at line 598 to switch to a 0 level turning off transistor Q1 and phase C. Such 0 output at Q is fed via line 666 to the input of NOR gate 658 causing its output to switch to a 1 level since line 656 is also at a 0 level. This turns on transistor Q2 reinstituting phase A on. Additionally, maintaining a north level for an interval of time of rotation sufficient to cause capacitor C7 to charge to the threshold level of inverter 622 provides a 0 logic level at line 624 to hold or reset the counter function 626 causing both flip-flops to reset to step 1 as shown in FIG. 27. This also forces a phase A on sequence along with resetting the counter function 626. The commutational sequence then repeats itself as tabulated in FIG. 27.

There is flexibility in the utilization of the reference phase. An example of particular utility is where there is a realistic possibility of a short loss of power to the circuit. Under the latter condition, without the reference phase, a need to restart the motor would exist. As noted, there are a variety of approaches for establishing a reference phase. In addition to an optical sensible system, a magnetic sensible system which incorporates three different field levels can be employed instead of the two levels incorporated in the previous embodiments. The reference phase may be incorporated, for example, every 360° of electrical rotation or less often, for example, every 360° of mechanical rotation.

Referring to FIG. 28, a sensible system magnetization for use with a two output Hall effect device is schematically portrayed. In order for the system to operate in both bipolar and unipolar modes the control system is structured so as to react to both south-to-north and north-to-south magnetic polar transitions. For example, in the figure transitions are represented at 680–686. Note, however, that, between transitions 680 and 681, the level of magnetization is quite high reaching, for example, 300 Gauss. One output of the Hall effect device will have a switch sensitivity ranging from a trip or operate level of about 200 Gauss as represented at horizontal dashed line 688 to a release level of about 150 Gauss as represented at horizontal dashed line 690. In general, the output (H1) of the Hall effect device at this higher trip level will be a transition to a 0 logic level when the sensed flux level exceeds the value at line 688. Control systems using this sensible system approach preferably are configured such that the lower level output of the Hall effect device (H2) is utilized to operate each phase independently of the reference phase. The reference phase is only utilized as a backup such that upon detection, energization of that reference phase is mandated. The lower level sensitivity will range, for example, between a +80 Gauss and –80 Gauss with a typical sensitivity extending, for example, from a trip or operate point of about 50 Gauss as represented at horizontal dashed line or level 692 and a release level of, for example, –50 Gauss as represented at horizontal dashed line or level 694.

It may be noted in FIG. 28 that the sensitivity levels deriving output H2 extend about the zero Gauss level. Note additionally, that the operate or trip levels are all at the south polar side of the diagram. The lower magnetization levels, for example, between transition lines 684 and 685 or 685 and 686 may be accomplished by magnetization procedures or by reducing the thickness of the sensing system magnet such that it is positioned further away from the Hall device. Looking to FIG. 28A, a truth table is provided illustrating the logic of the H1 and H2 outputs and showing the uniqueness of the reference phase identified as a step one of steps one through six in the diagram as well as in FIG. 28.

Figure 29:
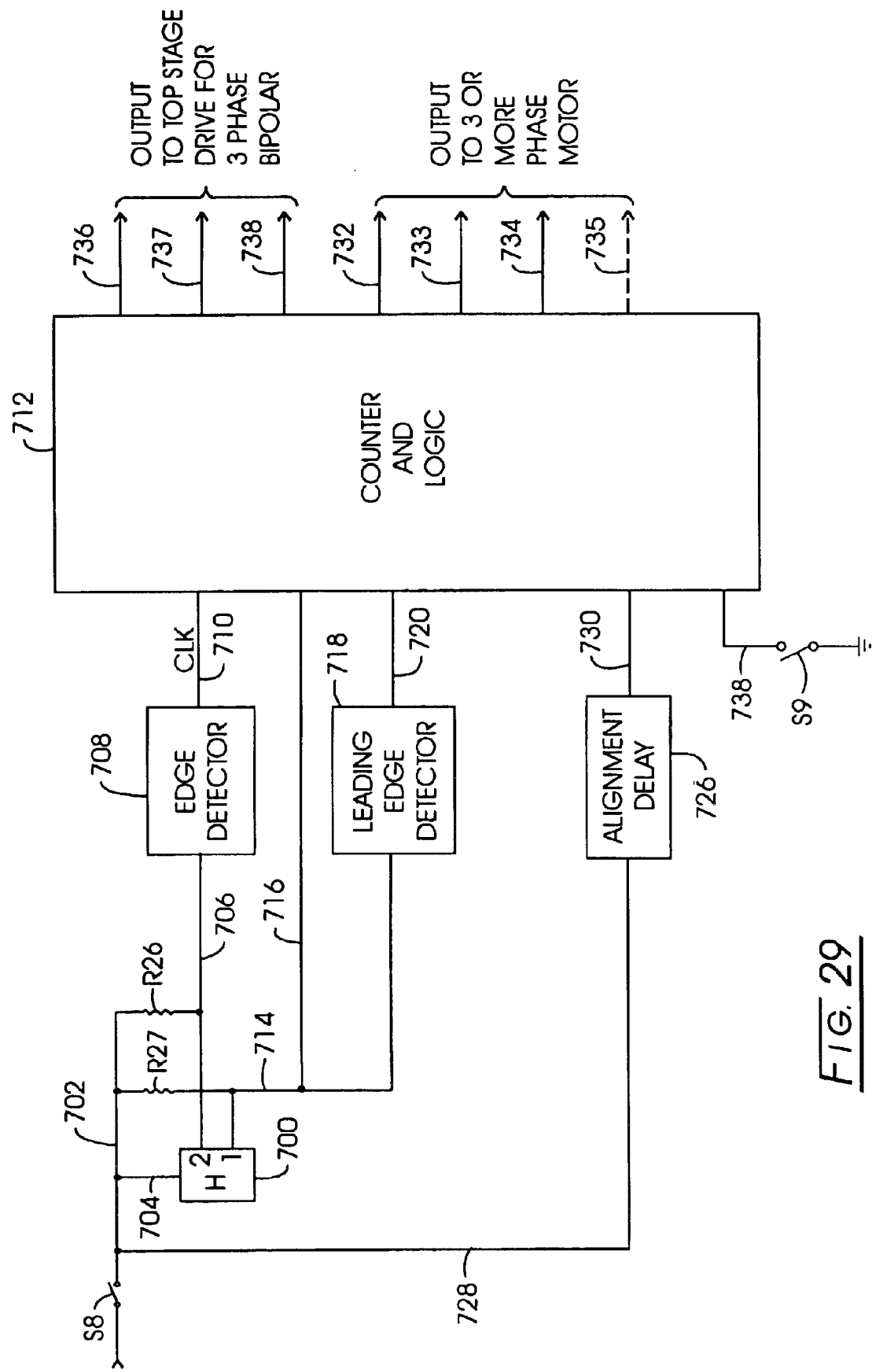
FIG. 29 is an electrical schematic and block diagram of a motor incorporating a single two level Hall effect sensor device with the sensible system drive in connection with FIG. 28.

Referring to FIG. 29 a block schematic diagram of the employment of a two level responsive Hall effect device with the sensible system approach of FIG. 28 is revealed. The two level Hall effect device is represented in the figure at 700 having a lower Gaussian level response output port as represented by the above horizontal dashed lines 692 and 694 at an output H2. Output H2 provides a transition to a zero value upon being tripped as discussed in conjunction with horizontal dashed line 692 in FIG. 28. The start switch for the control approach is shown at S8 extending from a D.C. source to line 702. Voltage line 702 is shown at line 704 being directed to Hall effect device 700. Output 2 of device 700 is shown at line 706. As before, due to the open collector nature of the output, a pull-up resistor R26 is provided between lines 702 and 706. Line 706, as discussed above, will carry both north-to-south transitions and south-to-north transitions and, accordingly, is directed to an edge detector network represented at block 708. Detector network 708 may be identical to the signal treatment network described in general at 418 in connection with FIG. 17. A resultant clock output is provided at line 710 which, in the fashion discussed above is directed to a counter and logic function represented at block 712. Output 1 of Hall effect device 700 is provided at line 714 which is coupled through pull-up resistor R27 to line 702 and extends to line 716 extending in turn, to the counter and logic function 712. Line 716 will extend directly to that gate system driving the reference phase so as to mandate its energization upon trip level 688 (FIG. 28) being reached. The output of line 714 additionally extends to a leading edge detector function represented at block 718 the output of which at line 720 is directed to counter and logic function 712 and serves to reset or clear the D-type flip-flops of the counter function.

An alignment delay function as earlier described is shown at block 726 being powered from line 702 as represented at line 728. The alignment delay and clearing function is asserted at the counter and logic function 712 as represented at line 730.

Figures 12, 13, 14, 16:
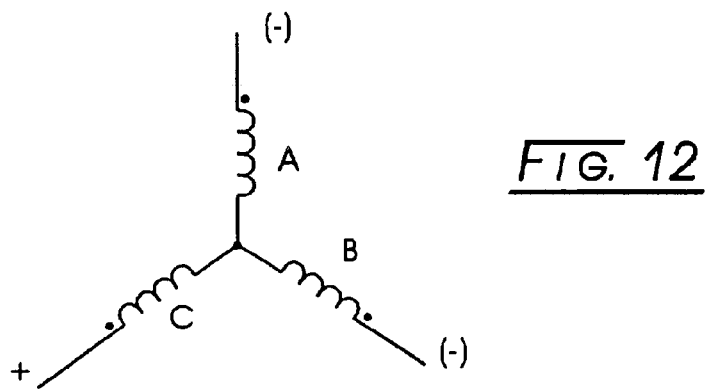
FIG. 12 is a schematic representation of a bipolar Y field winding circuit.
FIG. 13 is a tabulation relating steps and bipolar phase excitation sequences for clockwise rotation of the motor described in conjunction with FIG. 15.
FIG. 14 is a tabulation relating steps and bipolar phase excitation sequences for counterclockwise rotation of the motor described in conjunction with FIG. 15.
FIG. 16 is a truth table for the counting function of the motor described in connection with FIG. 15.

In general, for a three-phase operation, the counter function truth table will be identical to that described in conjunction with FIG. 11 for unipolar operation and FIG. 16 for bipolar operation. For three-phase unipolar performance the logic outputs to the power stage are represented at arrows 732 to 734 and for three-phase bipolar operation they are represented at 732–734 and 736–738. For a four-phase unipolar motor, the outputs are represented at arrows 732–735. Rotational direction selection is represented at switch S9 and associated line 738 extending to block 712.

Referring to FIG. 28B, a variation of the sensible system architecture shown in FIGS. 28 and 28A is revealed. In the figure, the vertical transition line identification 680–686 is carried over from FIG. 26 but in primed fashion. Similarly, the output H1 is identified by operate horizontal dashed line 688 and release horizontal dashed line 690 but in prime fashion. Output H2 is defined using the same numeration but in primed fashion as revealed at 692' and 694'. While this architecture derives a reference phase identification at position or step one of the sensible system, it exhibits a heavy bias to one polar field, here depicted as a south polar field. Looking additionally to FIG. 28C, a truth table is revealed with respect to outputs H1 and H2 and positions one through six. Note that at position one a unique zero logic is achieved and that the combined inputs of H1 and H2 for positions two through 6 provide an alternating logic output for carrying out phase commutation.

The architecture of the sensible system described in connection with FIGS. 28–28C is one calling for a reduced intensity magnetic field for certain of the steps. A more simple technique for achieving a third output logic combination is to remove a magnetic region such that for that region there is no significant magnetic field. Accordingly, that region may be described as having a zero field. In order to employ this zero field in conjunction with the Hall effect sensor, the straddling arrangement described in connection with FIG. 28 and dashed lines 692 and 694 is not employed. Those operate and release lines being now moved into the north polar zone to derive assured or positive output conditions.

Referring to FIG. 28D, the six regions of a sensible system for a three-phase bipolar architecture are revealed at 1 through 6. The first region or step is a reference and/or counter reset region. Vertical transition lines in the figure are positionally represented as in FIG. 28 but in double primed fashion at 680"–686". Additionally, the operate and release lines respectively described earlier at 688 and 690 are represented in the figure in double primed fashion as are the operate and release line 692" and 694". Note, however, that the latter operate and release lines 692" and 694" representing output H2 are within the north polar influence only. Inasmuch as it is possible to invert the Hall sensor plate output signal to provide a complimentary operate and release function an output H2' is shown in FIG. 28D in conjunction with release level dashed line 695 and operate level dashed line 696.

Figures 28E, 28F, 28G:
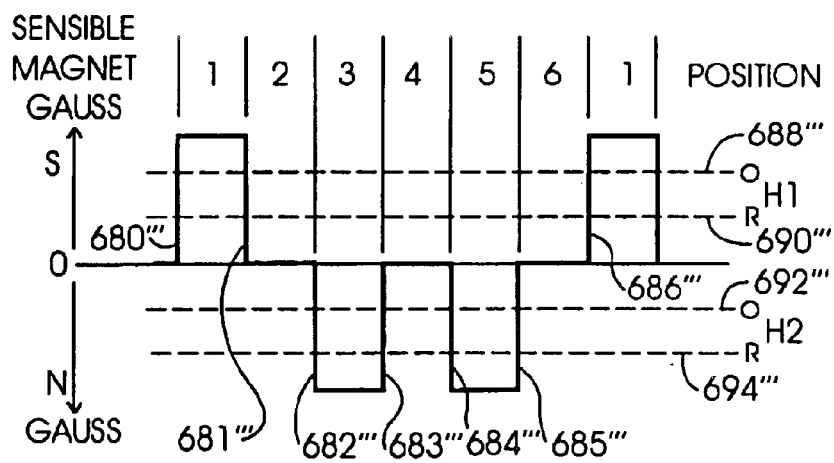
FIG. 28E is a truth table identifying the logic state of the outputs of the two level Hall device employable in conjunction with the sensible system architecture of FIG. 28D.
FIG. 28F is a schematic representation of sensible system magnetic Gauss intensities vs. position incorporating a reference phase and further showing operate and release levels for a two level Hall device.
FIG. 28G is a truth table identifying the logic state of the two outputs of a Hall device operating in conjunction with the magnetic architecture revealed in FIG. 28F.

Looking to FIG. 28E a truth table illustrating the resultant commutational logic for this three-phase bipolar demonstration wherein for every south pole there are three north poles is illustrated. Note looking to output H1, step region one exhibits a logic zero and for steps two through six a logic one is present. Accordingly, the H1 output may be utilized exclusively for reference phase information and/or for counter resetting. For FIGS. 28D and 28E an assumption is made that when the flux level exceeds the operate level of the Hall device, the output will be at a zero level. Note conditionally in FIG. 28E that the output H2 provides a regular sequential transition for identifying each of the requisite six steps in three-phase bipolar operation. In similar fashion, the complimentary output H2' provides an optionally usable alternating logic pattern for counter-based indexing in the commutational sequence.

Referring to FIG. 28F still another approach employing regions of zero or non-significant magnetic field regions or steps is portrayed. As before, the vertical transition lines are identified at 680–686 but in triple primed fashion. Operate and release levels for the H1 output are again represented at dashed lines 688 and 690 but in triple primed fashion. Similarly, the operate and release lines for providing output H2 are again represented at dashed lines 692 and 694 but in triple primed fashion. Note that the latter magnetic response levels are fully within the north polar field influence as opposed to the arrangement shown in FIG. 28. With this architecture for every south pole there are two north poles and the zero field regions are shown at steps two, four and six. However, referring to FIG. 28G, it may be observed that, while the output H1 provides a unique logic for identifying a reference and/or counting reset operation, the output H2 does not provide the necessary alternating logic outputs called for to index a phase commutating function. A combination of outputs H1 and H2 will provide that alternating pattern for the indexing function. Thus the control circuit looks to the combination of outputs H1 and H2 to derive commutational performance. It further may be observed in connection with FIGS. 28D and 28F that the north and south magnetic regions are of equal magnetic field intensity and thus provide a balanced field situation.

Figures 30A, 30B:
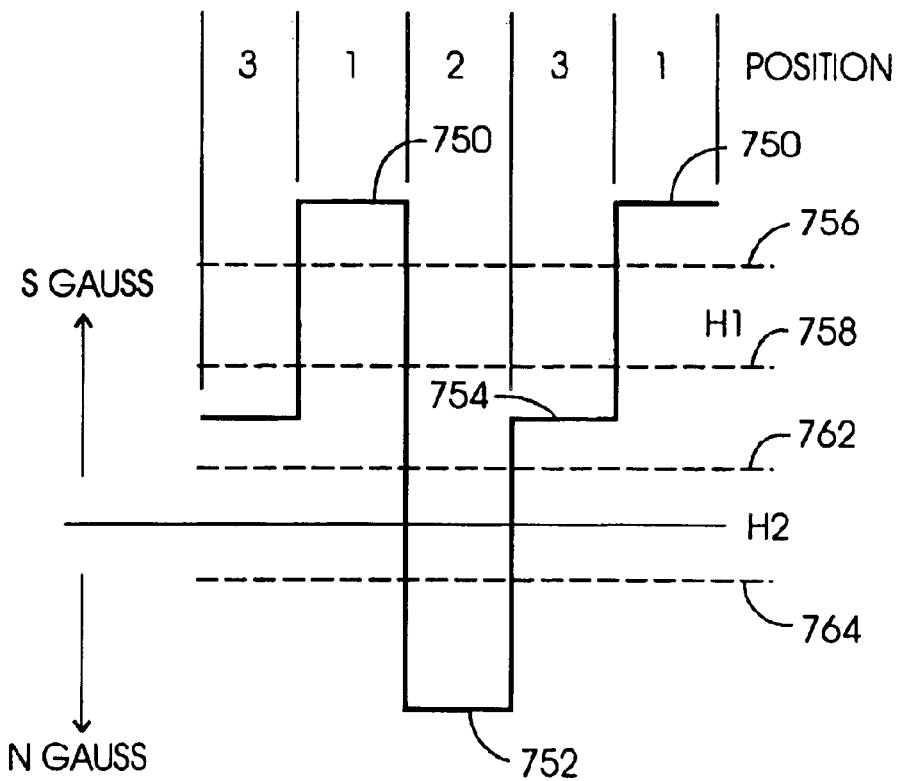
FIG. 30A is a schematic representation of sensible system magnetic Gauss intensities vs. position, the diagram further showing operate or trip and release levels for a two output Hall effect-based sensor.
FIG. 30B is a truth table showing the two outputs of a Hall effect-based sensor showing unique logic states for three-phases of stator windings.

The single sensor incorporating a Hall device response which is implemented to provide two discrete outputs also can be employed to derive the logic for an absolute or positive phase identification for three-phase unipolar commutation purposes. In this regard, for each of the three-phases unique logic states can be generated. Those three unique logics states then are readily implemented in an essentially simple commutational control circuit. For one embodiment, the sensible system for the motor will be magnetized with two levels of magnetic polarity for two of the phases and one level of an opposite polar state for the third phase. Referring to FIG. 30A, such an arrangement is depicted for a repeating sequence of sensible system magnetic field positions 1, 2 and 3. In the diagram, an assumption is made that a south polar field will provide a logic "zero" output from the sensor circuit if the field magnitude is sufficient to cause the operate level of the sensor to be exceeded. For the first field position shown, the sensible magnetic Gauss level as represented at 750 is of relatively high field intensity. For field position two, a magnetic field of opposite polar sense, i.e., north, is shown at a level 752. The third field position is shown again as having a south polar sense but at a lower flux or field intensity represented at level 754. In general, level 750 will be about three times the level at 754 and the magnetic field magnitude of opposite polarity at 752 will be equal to or greater than level 754. Superimposed upon these field positions and magnetic levels are horizontal dotted lines representing the sensor operating levels. For example, output H1 will be operative or "on" upon reaching the operate flux level identified at dashed line 756. That same output will release or switch "off" from its operative condition at the release flux level represented at dashed line 758. In similar fashion, the sensor output, H2 will operate or switch "on" at an operate flux intensity represented at dashed line 762 and will release or switch "off" at a release flux level represented at dashed line 764.

Looking additionally to FIG. 30B, a truth table is provided assigning logic states of 0, 1 for the above-noted outputs H1 and H2. Additionally positioned within this truth table are phase designations A, B, and C. As is apparent, in a commutational sequence these phases will be reiterated. Note in the figure that a unique logic state is present for each of the phases A, B, and C and this unique data is derived from a single sensor. Although it is most economical to obtain the two noted outputs from a single monolithic sensor integrated circuit with a single hall sensing area, the operating analogy could be achieved from a two sensor die with different sensitivities located in the same relative position in a single package or two Hall sensing plates on a single monolithic integrated circuit each with a different sensitivity level. Therefore, "single sensor" in this definition means, a single sensor package, and is not necessarily limited to a single Hall sensing plate or optically sensitive area in the sensor package, the purpose being to confine the entire sensing function that is associated with the sensible system in a single physical package that is located in one position relative to the sensible system. This was also true of the two output sensor previously described in conjunction with FIGS. 28, 28B, 28D and 28F.

Figure 31:
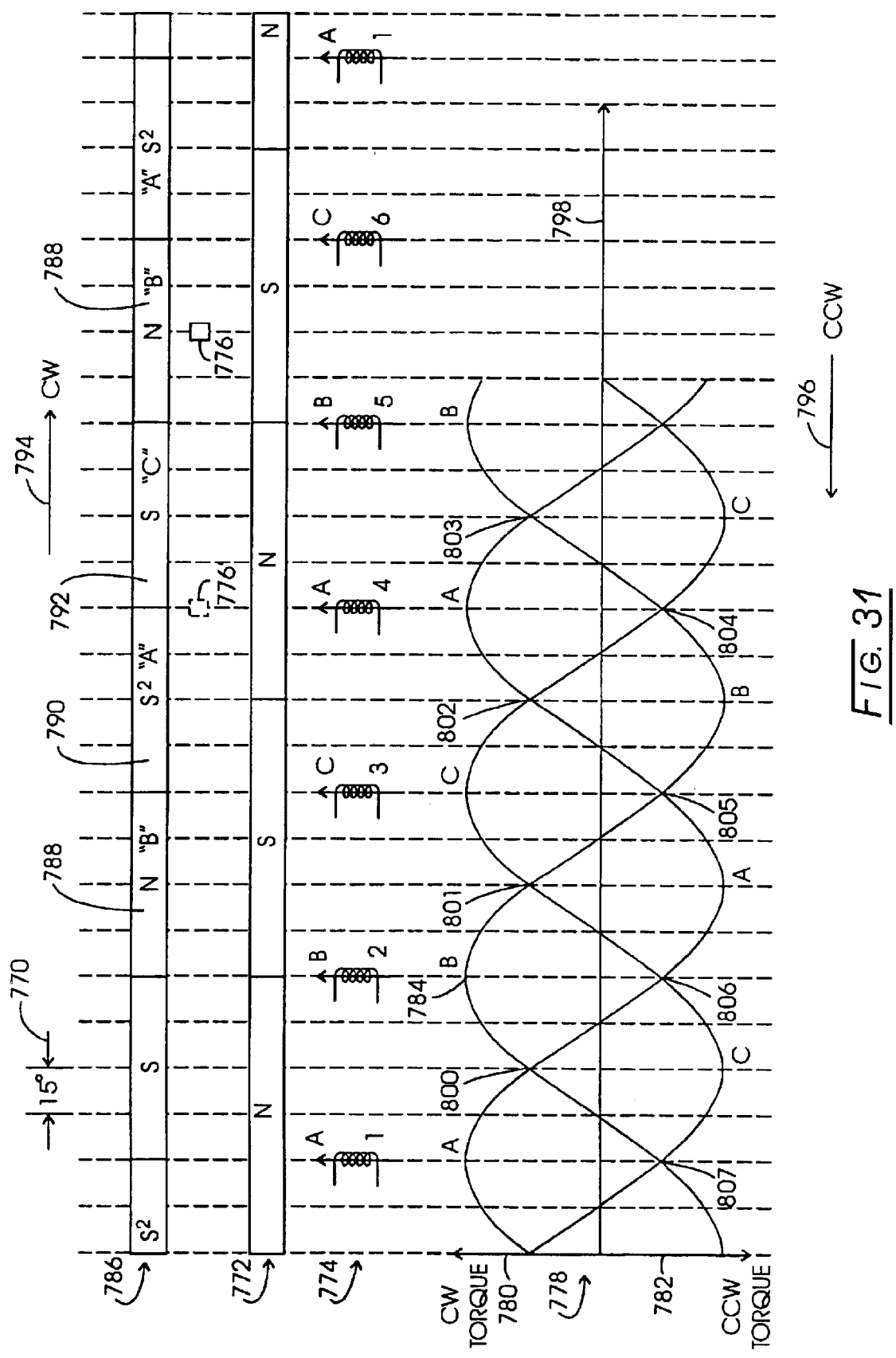
FIG. 31 is a timing and torque curve diagram for a three-phase unipolar motor incorporating a single, two output sensor.

A motor configured for three-phase unipolar operation with a rotor having magnetic regions representing ⅔ of the number of stator poles and implemented with such a two output sensor may be considered in connection with the timing diagrams and torque curves provided in FIG. 31. Looking to that figure, a sequence of vertical dashed lines are represented and, as identified at arrow pair 770, the spacing between adjacent ones of those vertical lines is intended to represent 15° of mechanical rotation (30° electrical rotation) of a four pole rotor. The motor type chosen for portraying this embodiment is a permanent magnet carrying rotor with iron pole stator type similar to those used in previous embodiments. This should not be considered limiting as this type of motor control will work equally well with other forms of electronically commutated motors such as double salient types and "ironless" stator types. The rotor magnet of the motor portrayed is shown in developed fashion in 772 and is illustrated so as to be performing rotationally in conjunction with six stator poles represented in general at level 774 and numbered 1 through 6 wherein stator poles 1 and 4 represent phase A; stator poles 2 and 5 represent phase B; and stator poles 3 and 6 represent a phase C. In terms of mechanical rotation, stator pole 1 may be considered at 0° mechanical rotation. Also, stator pole 1 following stator pole 6 may be considered to be at a 360° extent of rotor rotation or 0° for a next rotation. It is assumed that each phase is energized as a south pole. A single, two output sensor for clockwise operation is represented at block 776. The orientation of the rotor poles at 772 is representative of a maximum torque condition occurring with the energization of phase B. Note in this regard, that the junction or transition between north and south poles at level 772 is centered over phase B poles 2 and 5. Now look to the torque curves for phases A, B and C shown in general at 778 in conjunction with a zero torque defining axis 798. Clockwise rotational torque levels are represented by ordinate arrow 780 as increasing in an upward sense and counterclockwise rotational torque is represented by arrow 782 as increasing in a downward sense. Note that the maximum clockwise rotational torque evidenced at the phase B curve point 784 is in correspondence with the energization of phase B at poles 2 and 5 in correspondence with the rotor orientation represented in general at 772. The sensible system magnet is shown in developed form in general at level 786. Note that, for the convention presented, field position 2 as discussed in connection with FIG. 30A is shown having a north polar sense at magnetic region 788. Adjacent thereto at region 790 is the earlier-discussed field position 1 which is identified as having a south polar sense indicated as: "$S^2$" for the purpose of identifying the higher magnetic field intensity level as discussed at 750 in FIG. 30A. Field position 3 as discussed above is represented at magnetic region 792 and is further identified with the south polar designation, "S". The field level at region 792 corresponds with that described at 754 in FIG. 30A. Clockwise rotation of the rotor is considered in the sense from left to right in the figure and is further represented at arrow 794. Correspondingly, counterclockwise rotation of the rotor is represented in the sense of right to left as indicated at arrow 796. For clockwise performance, the positions of commutation are shown, for example, at 800–803. Correspondingly, the points of commutation for counterclockwise torque development are shown at 804–807. Note that these latter points of commutation are not aligned with commutation points 800–803. For clockwise operation, sensor 776 will cause phase B to be on when reading a north polar sense field as described at level 752 in FIG. 30A. When reading a south pole at the lower field intensity level as described at 754, the sensor will provide data causing phase C to be on. Finally, when the Hall effect-based sensor reads the higher flux level as at region 790 or field intensity level 750 the resultant data will cause phase A to be on. Following that logic note that sensor 776 is located centrally under the north sensible system magnet field causing phase B to be "on" and energized in a south polar sense as defined above. The movement of rotor magnet 772 30° mechanical in the clockwise direction will bring the motor torque to point 801 and the sensor to the junction with the "S" sensible system magnet field. Further CW rotation causes phase "C" to be energized. This follows for 60° mechanical rotation when point 802 is reached on the torque curves and the sensor reaching the "$S^2$" magnet field where phase "A" is energized. This continues clockwise operation with each phase being under absolute phase control similar to a conventional three discrete sensors system.

For counterclockwise performance, it is necessary to move the sensor 776 90° mechanical with respect to its position for clockwise performance. In this regard, for the instant demonstration, the sensor for counterclockwise operation is shown in phantom at 776' Note that the sensor 776' is located at the junction of "S" and "$S^2$". This corresponds to point 806 on the torque curves. Depending on exact location either phase "A" or phase "C" will be energized. If phase "A" is energized (sensor still under the influence of "$S^2$") CCW rotation will result. This will only last momentarily until the sensor comes under the influence of "S" at which time phase "C" will be switched "on". Phase "C" remains "on" until point 807 is reached. This coincides with the sensor coming under the influence of the "N" pole where phase "B" will be switched "on". The cycle continues from that point with each phase being under absolute phase control as described for clockwise rotation.

Figure 32:
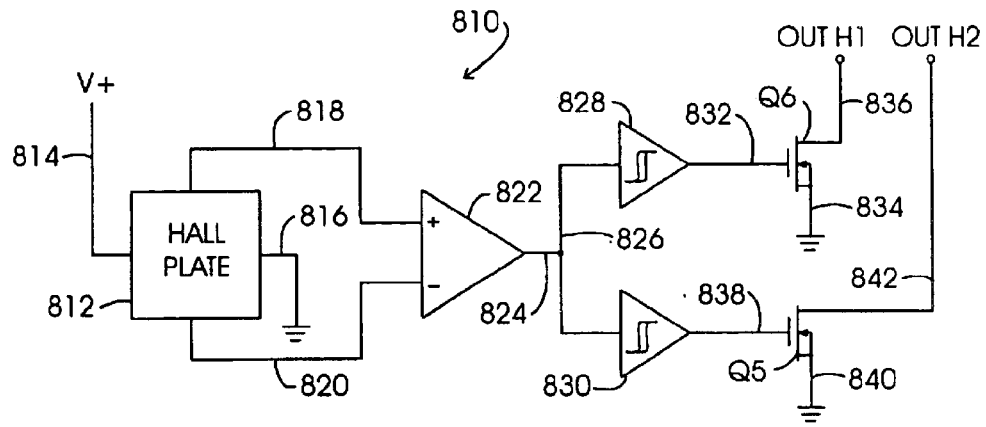
FIG. 32 is an electrical schematic diagram of an implementation for a two output Hall effect-based sensor.

Looking to FIG. 32, a sensor comprising a sensor circuit operatively configured with a Hall effect plate is represented in general at 810. A Hall plate is represented at 812 being coupled to + at line 814 and to ground via line 816. The outputs of the Hall plate 812 at lines 818 and 820 will provide a somewhat linear voltage signal varying with the flux intensity witnessed by device 812. In this regard, in general, Hall voltage can be calculated in accordance with the expression:

$V_{Hall} = \sigma B$, where:

$V_{Hall}$ = emf in volts

σ = sensitivity in Volts/Gauss

B = applied field in Gauss

Output lines 818 and 820 are directed to the input terminals of a differential amplifier 822, the output of which at line 824 will be provided as a voltage ramping up or down in correspondence with the input. That output at line 824 is directed, as represented at line 826, to the inputs of Schmitt triggers 828 and 830. As noted symbolically, triggers 828 and 830 are configured having a hysteresis characteristic. In this regard, returning to FIG. 30A trigger 828 is configured having a threshold corresponding with dashed operate line 756 and a hysteresis-based release corresponding with the release designated dashed line 758. That provides for the generation of output H1.

Correspondingly, Schmitt trigger 830 is configured with an operating threshold corresponding with dashed level 762 shown in FIG. 30A and exhibits a hysteresis characteristic establishing the release level as described at dashed line 764 in that figure. The output of Schmitt trigger 828 at line 832 extends to the gate of field effect transistor Q6, the source terminal of which is coupled via line 834 to ground and the drain terminal of which is coupled to line 836. Line 836 is considered as output H1 as discussed above.

In similar fashion, the output of Schmitt trigger 830 is provided at line 838 which, in turn, is coupled to the gate of field effect transistor Q5, the source terminal of which is coupled to ground via line 840 and the drain terminal of which is coupled to line 842. Line 842 is considered to represent earlier described output H2.

Figure 33:
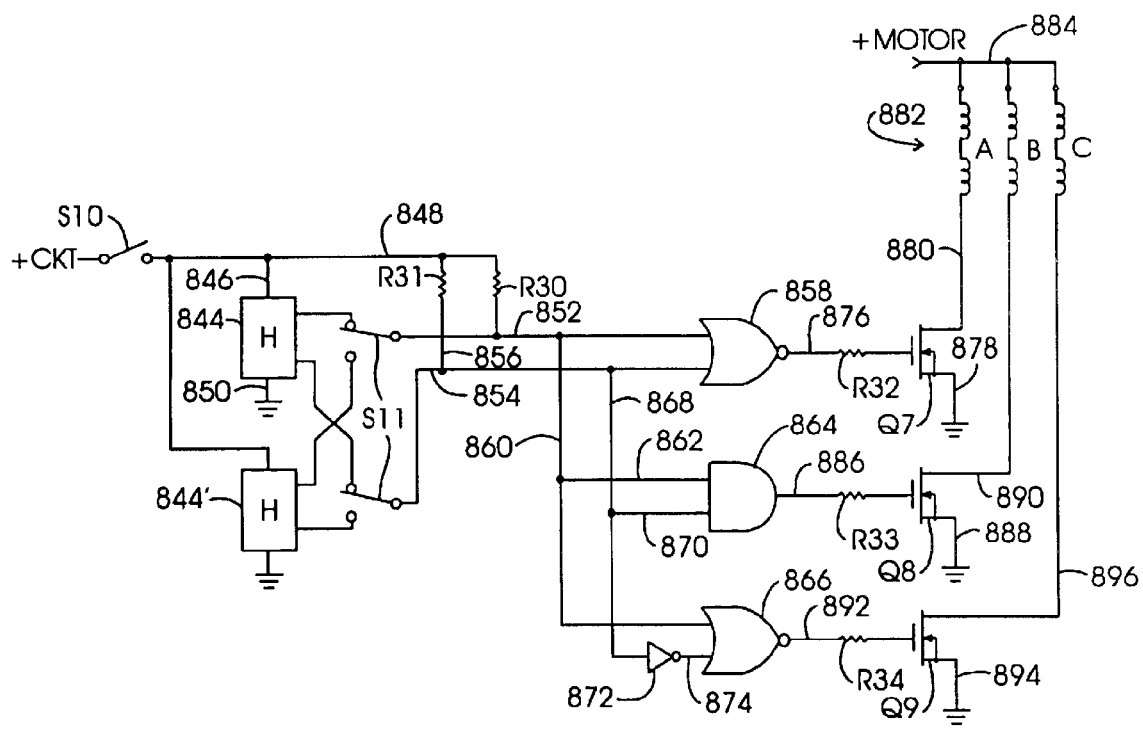
FIG. 33 is an electrical schematic diagram for a control circuit for a unipolar motor utilizing a two output Hall effect-based sensor for a three-phase unipolar drive.

With the arrangement shown, in the presence of the high flux intensity level described at line 750 in FIG. 30A, the outputs of both triggers 828 and 830 will turn on respective transistors Q6 and Q5 to provide a ground or zero logic at both output lines 836 and 842 when those outputs are coupled to pull-up resistors as shown in FIG. 33. When the operating flux level described at line 752 at FIG. 30A is encountered, then the outputs at both output lines 832 and 838 will be at a logic low level to turn off the transistors Q6 and Q5 and provide a logic 1 state at both output lines 836 and 842. When flux level 754 as described in FIG. 30A is encountered, trigger 830 will cause transistor Q5 to be turned on and create a logic zero level at output line 842 while Schmitt trigger 828 will maintain transistor Q6 in an off state to provide a logic 1 level at output line 836.

Other approaches to a dual output Hall effect-based latch will occur to those skilled in the art. For example, a dual output Hall-effect latch is marketed by Melaxis USA Corp. of Concord N.H. under the part designation MLX90224. That device employs two Hall plates in a singular integrated circuit package. In that device the two Hall plates are purposely separated by about 1.85 mm and the two outputs have approximately the same operate and release levels. This is done so the device can be used as a direction sensor for high speed choppers and not as a motor commutation sensor.

As noted earlier, the control circuit implementation of the unipolar motors using the above-described dual output sensor logic is quite simple. Looking to FIG. 33, such a circuit implementation is revealed. A dual output Hall based circuit is represented at block 844. One input to the sensor 844 is provided from lines 846 and 848. Note that line 848 extends through a switch S10 to the positive power supply of the circuit. Sensor 844 is coupled to ground via line 850 and provides an output earlier described as H2 at line 852 and a corresponding output earlier described as H1 at line 854. Line 852 is coupled through pull-up resistor R30 to line 848 and line 854 is coupled via line 856 and pull-up resistor R31 to line 848. Output line 852 is coupled to one input of NOR gate 858; also through lines 860 and 862 to one input of AND gate 864 and via line 860 to one input of NOR gate 866.

Correspondingly, output line 854 is directed to the opposite input of NOR gate 858; additionally through lines 868 and 870 to the opposite input of AND gate 864 and is coupled via line 868 to inverter 872, the output of which at line 874 is coupled with the opposite input of NOR gate 866.

NOR gate 858 output at line 876 is coupled through gate resistor R32 to the gate of transistor Q7, while the source terminal thereof is coupled to ground via line 878, and while the drain terminal thereof is coupled via line 880 to the phase A windings of the stator windings represented in general at 882. The opposite side of the phase A windings are seen coupled to the motor power supply via line 884.

AND gate 864 output at line 886 is coupled through gate resistor R33 to the gate of transistor Q8, while the source terminal thereof is coupled via line 888 to ground. Note that the drain terminal of the transistor is coupled via line 890 to the windings of phase B. The output of NOR gate 866 is coupled via line 892 and gate resistor R34 to the gate of transistor Q9, while the source terminal thereof is coupled via line 894 to ground. The drain of transistor Q9 thereof is connected with the C phase windings via line 896. Like phase A, the opposite sides of phase B and C windings are coupled to the motor power supply via line 884.

With the circuit thus developed, and looking additionally to FIG. 30B, when the outputs at both output lines 852 and 854 are at a logic zero level, the windings of phase A are energized by virtue of two "0" states at the input of NOR gate 858 to, in turn, turn on transistor Q7. Two "0" level inputs at AND gate 864 yield a "0" output and, one "0" input and one "1" input, due to inverter 872, yield a "0" output at NOR gate 866. Therefore transistor Q8 and Q9 are held off. Where output lines 852 and 854 are both at a logic one level, then NOR gate 858 yields a "0" output, in turn, holding transistor Q7 in an off condition. The inputs to AND gate 864 are both at the noted logic one level to thus cause transistor Q8 to be turned on and effect the energization of the windings of phase B. Additionally NOR gate 866 is at a "0" output condition, holding off transistor Q9 by virtue of a "1" input on line 860 and a "0" input on line 874. When output line 852 is at a zero logic level and output line 854 is at a one logic level, then gates 858 and 864 yield a "0" output condition holding transistors Q7 and Q8 in the off condition. The input to NOR gate 866 at line 860 is at a zero logic level and the logic one level at lines 854 and 868 is inverted to a zero logic level at line 874 to cause NOR gate 866 to turn on transistor Q9 and thus energize the windings of phase C. For combined CW and CCW operation, an additional Hall effect device positioned as shown at 776' in FIG. 31 may be employed. That device is represented at 884'. Directional change is thus implemented by actuating switch S11.

The principal system magnetization architecture represented in FIG. 30A can be adapted to utilization of zero field steps or regions. Referring to FIG. 34 one such implementation is represented. In the figure, sensible system magnetic regions or steps of commutation again are represented as step one through three. The steps are defined by the transition lines 901–904. An output, H1 is evolved with respect to horizontal operate dashed line 906 and horizontal release dashed line 908. Positioned entirely within the north polar field of influence is operate horizontal dashed line 910 and release horizontal dashed line 912 to evoke an output H2. As before, the Hall sensing plate output signal may be inverted to provide a complimentary output H2'. In this regard, shown in the figure is a partial horizontal dashed line 914 representing a release level and partial horizontal dashed line 916 representing an operate level for the output H2'. It may be observed that steps one through three of the architecture of FIG. 34 correspond with the first three steps described in connection with FIG. 28D. As in the case of FIG. 30, in progressing from step one through step three, the system has gone through 360° of electrical rotation.

Looking to FIG. 35, a truth table corresponding with FIG. 34 shows that unique logic is available for each of the three steps in combining outputs H1 and H2. Additionally, as an alternative to output H2, H2', when combined with output H1 achieves a distinct logic for each of the three positions or steps.

Referring to FIG. 36 an alternative arrangement to the architecture of FIG. 34 is presented. In the figure, positions or steps one through three again are identified and are established by the vertical transition lines 918–921. Output H1 is identified by horizontal dashed operate line 924 and horizontal dashed release line 926. Similarly, output H2 is established between horizontal dashed operate line 928 and horizontal dashed release line 930. Looking to FIG. 37, the truth table established by this sensible system architecture is represented. Note that the combination of outputs H1 and H2 provides a unique logic state for each of the phases A, B, and C which is necessary to carry out absolute phase identification and energization as shown in previous embodiments in FIGS. 30A and 34.

Referring to FIG. 38A, a sensible system incorporating the noted zero field intensity regions or zones in combination with a motor or rotor magnet is revealed. In the figure, zones of radially oriented magnets of alternating polar sense are established as rotor magnetic zones or regions. Two such radial magnetic regions are revealed at 940 and 941. This schematic depiction shows the rotor magnetic region faces in the sense of their axially disposed height. For instance, such a height is generally represented in FIG. 1 at PM 76 as combined with backiron 72. The sensible system magnetic regions combined with this radial field rotor magnet are axially oriented magnetic regions as represented at 943 and 944. Note that the polar sense of the axial field and the radial field are the same. Intermediate regions 943 and 944 is a gap defined region 945 which does not contain magnetic materials. This is the zero field zone or Gauss region exhibiting no significant axial magnetic field intensity when read in the location of the sensing device which is centered over the axial portion of the combined rotor magnet and sensible system. In general the axial field based sensible system is integrally configured with the rotor function magnets and the backiron extends axially in height only to the sensible system interface. For an integrally formed embodiment ceramic magnets preferably are employed. Each of the regions 943–945 will encompass 120° of electrical rotation such that for each 360° of electrical rotation there are three transitions for commutational purposes.

Looking to FIG. 38B, rotor magnetic regions 948 and 949 having radially oriented magnetization are depicted. For this embodiment, a region of no significant axial magnetic field intensity is provided for the sensible system by, in effect, providing a gap of no permanent magnet material between that radially oriented rotor magnets 948 and 949 as represented at gap 950. Region 950 represents 120° of electrical rotation. Adjacently disposed regions 951 and 952 also are of that extent of electrical rotation for providing three transitions for each 360° of electrical rotation. For this embodiment either ceramic or rare earth magnet material may be employed. Further the backiron of uniform axial height extends the entire axial height of the assembly with no discontinuity at region 950. For some applications it may be beneficial to "fill" the permanent magnet gap 950 with steel or backiron material. This architecture is represented at dashed line 953. In this embodiment the sensor is generally placed axially above the radial edge of the permanent magnet to sense the axial field present at that edge. Such a location is shown in FIG. 3 at sensor points 110, 111 or 112 where the sensors for reading the position of the rotor magnet for a conventional three-phase three sensor controller read the axial flux from the edge of the rotor magnet.

Referring to FIG. 39, a sensible system architecture for a four-phase unipolar or two-phase bipolar motor with absolute phase identification is diagrammatically represented. This architecture is somewhat similar to that described in connection with FIG. 28 inasmuch as it utilizes the H1 and H2 output features of that figure and an H3 output similar to the output H2 seen in FIGS. 28D and 28F. To achieve the three outputs with a single sensor, the Hall device may incorporate three Hall plates or one Hall plate with three different trigger points.

Looking to the figure, vertical transition lines are represented at 956–960 which delineate positions or sensible system steps or regions one through four in 360° of electrical rotation. The H1 output is shown defined by horizontal dashed operate line 962 and horizontal release dashed line 964. An H2 output is defined by the horizontal operate line 966 and horizontal dashed release line 968, and the H3 output is defined by the horizontal dashed operate line 970 and horizontal dashed release line 972. Referring to FIG. 40, a truth table is set forth showing the logic of the combined outputs H1–H3. Note that for each position or sensible system defining transition a unique three part combinational logic is provided.

Four-phase commutation also is available but without the positive all phase identification of the embodiment of FIGS. 39 and 40 but a reference phase identification by simply utilizing the first four steps or positions of the sensible system architecture of FIGS. 28, 28B, 28D and 28F in application with the associated two output sensor.

From the foregoing discourse commencing with FIG. 24 it may be observed that motor commutation with a reference phase for motors with a three or more step commutation sequence is achieved with a single Hall device with one or more outputs combined with a sensible system having three or more transitions in each 360° of electrical rotation. Also, absolute phase identification and energization can be accomplished for three and four-phase unipolar motor operation by use of a two or three output single Hall device where each output is responsive to a different level of flux intensity or polarity and with a sensible system having three or more transitions in each 360° of electrical rotation.

Figure 41:
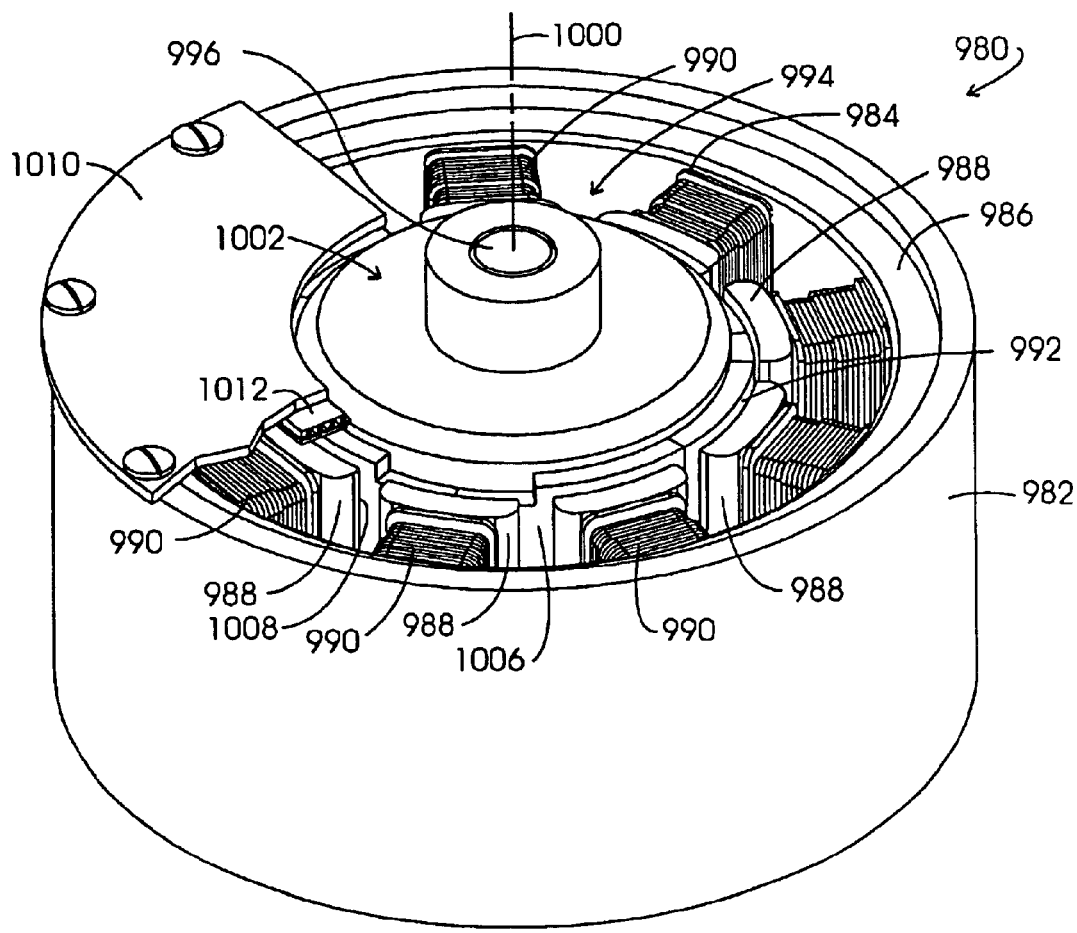
FIG. 41 is a pictorial representation of a motor according to the invention with a radial implementation of its stator array.
Figure 42:
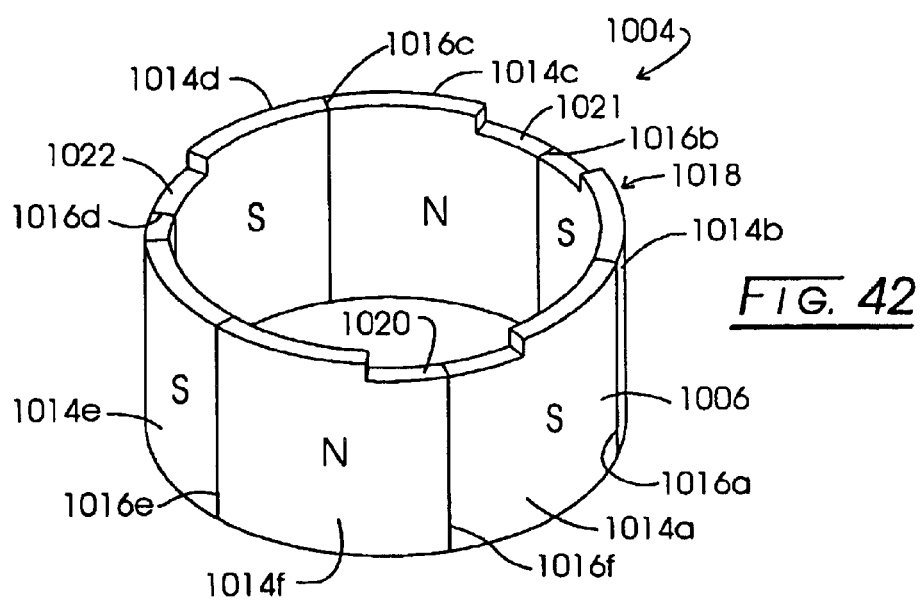
FIG. 42 is a perspective representation of the permanent magnet and sensible system employed with the motor of FIG. 41.

The precepts of the invention are applicable to most all three or more phase electronically commutated motors here being applied to motor configurations having radially disposed as opposed to vertically disposed stator assemblies. Referring to FIG. 41, a pictorial illustration of a radially configured motor is represented generally at 980. Motor 980 includes a cylindrical outer cover 982 which surmounts a nine pole stator array represented generally at 984. Each stator assembly in the array 984 is formed with a pressed powder metal stator pole core assembly which extends from a cylindrical backiron region 986 to flux interaction regions, certain of which are identified at 988. Regions 988 are integrally formed with winding regions (not shown) over which bobbin mounted field windings are positioned, certain of which are revealed at 990. The radially inwardly facing surfaces of the flux interaction regions 988 confront the radially disposed cylindrical surface 992 of a rotor represented generally at 994. Motor 994 includes a shaft 996 mounted in a bearing (not shown) which is drivably rotated about motor axis 1000. As before, the rotor 994 incorporates a backiron region 1002 which extends radially outwardly to support a permanent magnet represented generally at 1004 (FIG. 42). The radially outwardly disposed confronting magnetic surface 1006 of the permanent magnet 1004 is spaced from the radially inwardly disposed surfaces of flux interaction regions 988 to define a working gap 1008. A circuit board 1010 is seen to support a sensor containing control circuit 1012 over the working gap 1008 containing, for example, a two output Hall device and additional motor control circuitry as described above. The axially inwardly disposed surface of circuit 1012 may be positioned above the upper edge of the permanent magnet 1004, for example, ½ millimeter and while the position of circuit 1012 is accurate in a radial sense, its position is altered in a circumferential sense for improved illustration.

Looking additionally to FIG. 42, it may be observed that the permanent magnet 1004 is configured with six polar alternating magnetic regions 1014a–1014f defined by junctions 1016a–1016f. The sensible system of the motor 980 as represented in general at 1018 is integrally configured within the upper region of permanent magnet 1004 and is seen to exhibit a configuration earlier described in connection with FIG. 38B wherein, for the six pole rotor at hand, three regions of no significant magnetic field intensity as read at sensor control circuit 1012 appear as cutouts or notches 1020–1022 (FIG. 42). No significant magnetic field is meant to define flux levels below the respective operate or release levels of the two output sensor for instance flux levels between level 926 and 928 in FIG. 36. With the arrangement, the two output Hall effect sensor component of circuit 1012 will read the axially disposed leakage flux above the edge of the permanent magnet 1004 as a south pole, a north pole, and within the cutouts or notches 1020–1022 essentially a zero flux field or no significant magnetic field. This yields a three step commutation sequence used for three phase unipolar motor operation. In the latter regard, the two output Hall sensor in circuit 1012 will be positioned above the top of the permanent magnet 1004 at a cutout or notch 1020–1022 by a distance, for example, of 2.5 millimeters instead of ½ millimeter. The latter terms are intended to indicate a region of no significant axial magnetic field intensity with respect to the operate and/or release levels of the two output Hall sensors at circuits such as at 1012. Note initially for the instant embodiment that the cutouts or notches 1020–1022 are configured extending symmetrically about magnetic region junctions 1016b, 1016d and 1016f, the left side of the notches being present in a north polar region and the right side of the notches being present in a south polar region. In an alternate arrangement of the cutouts or notches, they may be formed intermediate the junctions 1016a, 1016c and 1016e.

Figure 43:
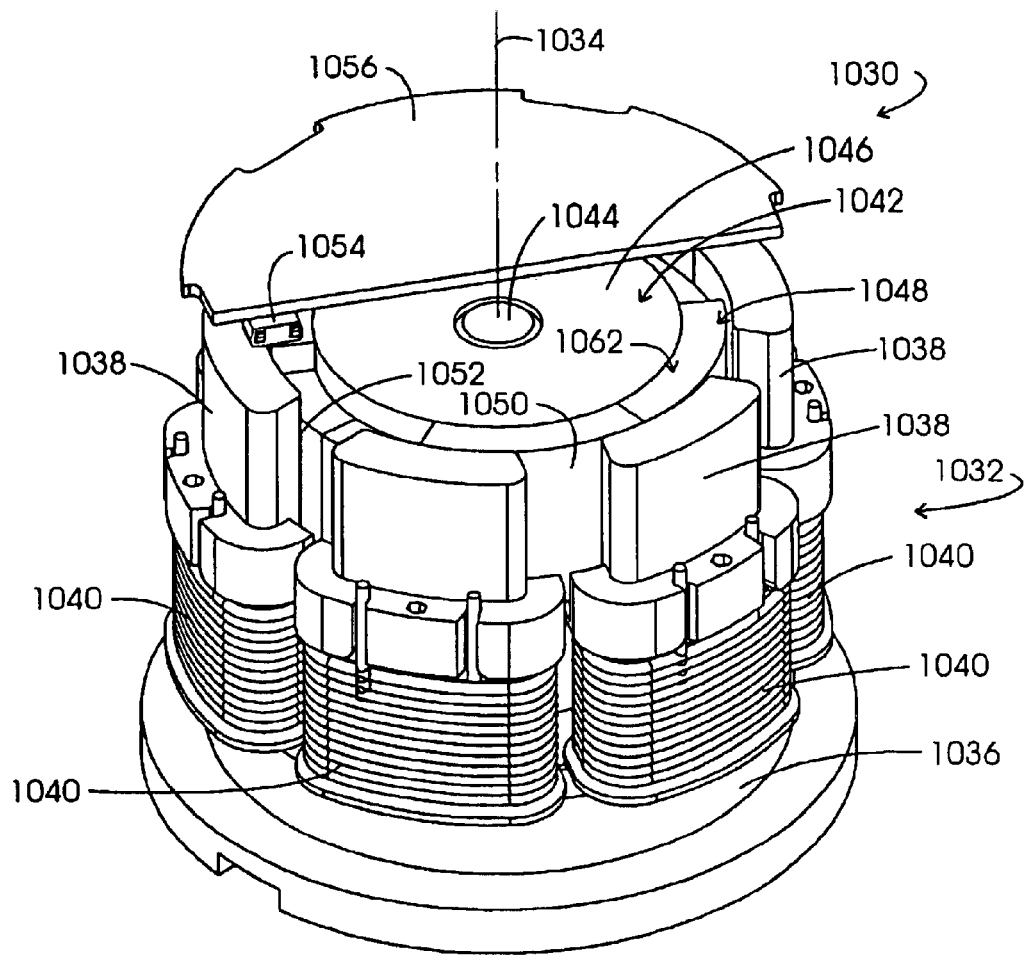
FIG. 43 is a pictorial representation of another motor according to the invention.
Figure 44:
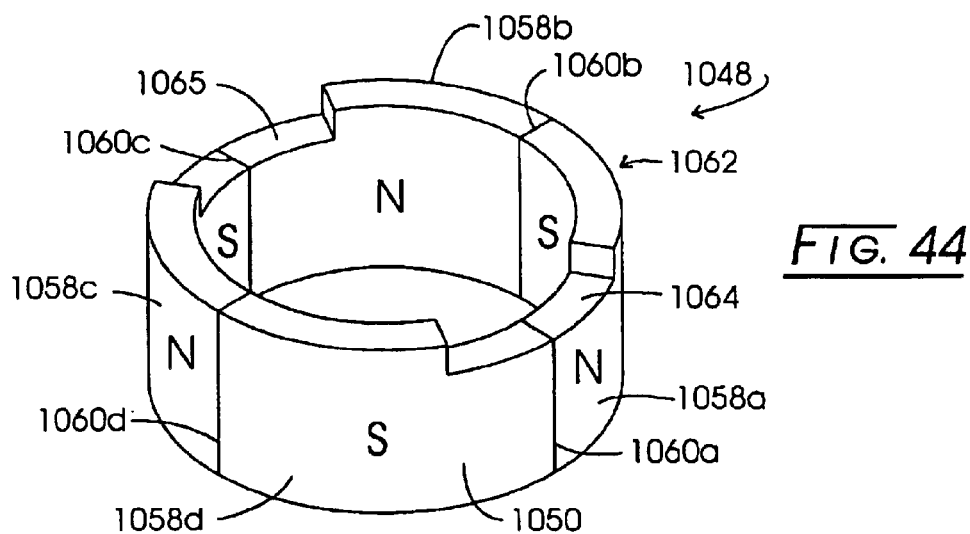
FIG. 44 is a pictorial representation of the permanent magnet employed with the motor of FIG. 43 showing an integrally incorporated sensible system.

Referring to FIGS. 43 and 44, a motor represented generally at 1030 is configured having a vertical stator assembly array represented generally at 1032. Note that the motor 1030 is quite similar to motor 10 shown in FIGS. 1 and 2. In this regard, the vertical stator assemblies are arranged in parallel with motor axis 1034. As in the case of motor 10 the stator assembly array 1032 is configured with pressed processed powder metal stator core assemblies ascending from a backiron region 1036 to vertically disposed flux interaction regions certain of which are identified at 1038. Extending between the regions 1038 and backiron 1036 are winding regions (not shown) which are surmounted by bobbin mounted field windings, certain of which are represented at 1040. A rotor is represented generally at 1042 mounted upon a shaft 1044 for driven rotation about axis 1034. Rotor 1042 incorporates a backiron region 1046 which, in turn, supports an outwardly disposed cylindrical permanent magnet represented generally at 1048. The radially outwardly disposed confronting magnetic surface of the permanent magnet 1042 is seen at 1050 and is spaced from the radially inwardly directed faces of stator assembly flux interaction regions 1038 to define a working gap 1052. Disposed above working gap 1052 is a control circuit 1054 seen mounted upon a circuit board 1056. The two output Hall effect sensor component of the circuit 1054 is located in general alignment with the working gap 1052 such that it may respond to axially directed flux leakage paths extending from the upper edge of permanent magnet 1048. As before, that spacing may be about ½ millimeter. The circuit 1054 is shown for illustrative purposes in an appropriate orientation radially but not necessarily in its proper circumferential aspect.

FIG. 44 reveals that the permanent magnet 1048 incorporates four poles or magnetic regions of alternating polarity shown at 1058a–1058d. The demarcation between these regions of alternating polarity are represented at junctions 1060a–1060d and the sensible system represented generally at 1062 is present, as before, as integrally formed within the upper edge of permanent magnet 1048. For the instant embodiment, the sensible system no significant axial magnetic field regions are provided in the manner of cutouts or notches seen at 1064 and 1065. In this regard, notches 1064 and 1065 are configured in the manner described in connection with FIG. 38B, notch 1064 extending symmetrically about junction 1060a from a south pole on the left to a north pole on the right. In similar fashion notch 1065 extends symmetrically about junction 1060c in the same manner. As in the case of FIGS. 41 and 42, the notches 1064 and 1065 can alternately be incorporated uniformly around junctions 1060b and 1060d. As before, the sensor component of circuit 1054 will respond to leakage path flux at the top edges of the permanent magnet regions located without the notches 1064 and 1065. Conversely, it will not respond to that form of flux where the top edge of the magnet is located, for example, 2.5 millimeters below it to define a near zero or no significant axial field flux response condition.

It may be noted that with respect to motors 980 and 1030 the cutouts or notches are configured such that there is one such notch per north-south rotor pole pair, there being three such pairs in the motor 980 embodiment of FIG. 41 and two such pairs in the motor 1030 embodiment of FIG. 43.

Motors 980 and 1030 are configured for three-phase unipolar operation with the rotor having three distinct sensible magnetic regions per 360° of electrical rotation and are implemented with the above-described two output Hall device base sensor. Motor 1030 may be considered in connection with the timing diagrams and torque curves provided in FIG. 31A as well as with the arbitrary phase assignments shown in FIGS. 31B and 31C. As with the other timing diagrams presented herein, their layout is shown as one of several potential timing and phase layouts possible for the motor shown and should not be considered in a limiting sense. Looking to FIG. 31A the sensible system 1062 (FIG. 43) is linearly developed at level 1072 as an "Alternate B". An alternate sensible system wherein the cutouts or notches are located between adjacent junctions is linearly developed at level 1070 and identified as an "Alternate A". The six stator poles or assemblies, for example, of the array 1032 (FIG. 43), are represented at level 1074 and numbered 1–6 wherein stator poles 1 and 4 arbitrarily represent phase A; stator poles 2 and 5 represent phase B; and stator poles 3 and 6 represent a phase C. In terms of mechanical rotation, stator pole 1 may be considered at 0° mechanical rotation. Also, stator pole 1 following stator pole 6 may be considered to be at a 360° extent of rotor rotation or 0° for a next rotation. It is assumed that each phase is energized as a south pole. The rotor magnetic region junctions again are identified but with downwardly pointing arrows 1060*a*–1060*d*. A single two output sensor for clockwise operation with respect to level 1070 is represented at 1076, while a single two output Hall device location for counterclockwise rotation is represented at 1078. Clockwise rotation of the rotor is considered in the sense from left to right in the figure and is further represented at arrow 1080. Correspondingly, counterclockwise rotation of the rotor is represented in the sense of right to left as indicated at arrow 1082. In similar fashion, a location for a two output Hall device sensor with respect to the sensible system at level 1072 is represented at 1084, while a corresponding location for a two output Hall device sensor for counterclockwise rotation is represented at 1086. It should be understood that the sensors can be positioned at other locations. The positioning shown in the figure is selected to correspond with the tabulations of FIGS. 31B and 31C. The orientation of the sensible systems 1070 and 1072 and, consequently, the rotor poles is representative of a maximum clockwise torque condition occurring with the energization of phase B. Note in this regard, that the junctions or transitions 1060*d* and 1060*b* are centered over respective phase B poles 2 and 5. Now look to the torque curves for phases A, B and C shown in general at 1088 in conjunction with zero torque defining axis 1090. Clockwise rotational torque levels are represented by ordinate arrow 1092 as increasing in an upward sense and counterclockwise rotational torque is represented by arrow 1094 as increasing in a downward sense. Note that the maximum clockwise rotational torque evidenced at the phase B curve point 1096 is in correspondence with the energization of phase B at poles 2 and 5, while the corresponding maximum rotational torque for counterclockwise operation is represented in connection with phase C at point 1098. For clockwise performance, the positions of commutation are shown, for example, at 1100–1103. Correspondingly, the points of commutation for counterclockwise torque development are shown at 1104–1107. Note that these latter points of commutation are not aligned with the commutation points 1100–1103.

Looking additionally to FIG. 31 B, for clockwise rotation with respect to level 1070, sensor 1076 will permit phase B to be energized under the influence of a south polar field. The sensor will effect the energization of phase C as at transition 1101 in the presence of a near zero field, and the sensor will permit the energizaton of phase A as at commutation point 1102 in the presence of a north polar field. The commutation sequence then repeats.

For counterclockwise performance, with respect to level 1070, sensor 1078 will permit the energization of phase C in the presence of a near zero sensible system field; will permit the energization of phase B in the presence of a south polar field as it occurs at commutation points 1104 and 1107; and will permit the energization of phase A in the presence of a north polar field as occurs at commutation points as at 1105. The commutation sequence then repeats. With respect to the Alternate B sensible system at level 1072, then looking to FIG. 31C, for clockwise rotation sensor 1084 responds to a south polar field to energize phase B which is seen at poles 2 and 5 to be located beneath respective junctions 1060*d* and 1060*b*. Next, in the presence of a north polar field, sensor 1084 will permit the energization of phase C, for example, at commutation point 1101. Next, in the presence of a near zero sensible system field, sensor 1084 permits the energization of phase A as represented, for example, at commutation point 1102. The commutational sequence then repeats itself.

Correspondingly, for counterclockwise performance, sensor 1086 permits the energization of phase C in the presence of a sensible system north polar field. Next, the sensor permits the energization of phase B in the presence of a south polar field, for example, as represented at commutation points 1104 and 1107. Next, sensor 1086 permits the energization of phase A in the absence of a sensible system field or near zero field as represented at commutation point 1105. The commutational sequence then repeats itself.

Figure 45:
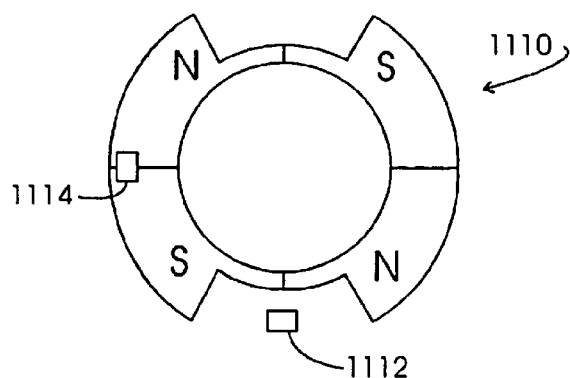
FIG. 45 is a plan view of a slave based sensible system according to the invention.

In connection with FIGS. 1 and 2, a slave magnet 102 was carried by and rotated in correspondence with rotor 70. If motor 10 is operated in three-phase unipolar fashion in conjunction with a two output Hall device based sensor, then the slave magnet may take the configuration shown in general at 1110 in FIG. 45. The slave magnet 1110 presents a south field, a near zero field and north field step sequence with respect to two, two output Hall device based sensors 1112 and 1114 which may provide for clockwise and counterclockwise performance. These sensors are spaced apart by 90° of mechanical rotation (180° electrical) as were the sensors in FIG. 31*a*.

With respect to motor 10 shown in FIGS. 1 and 2, the slave magnet 102 presented two six step sequences wherein the single output Hall device base sensor read transitions between north and south poles wherein a change in state or transition was read as opposed to the absolute phase identification heretofore discussed. As a consequence, an initial alignment phase was energized following which a start phase was energized, whereupon the transitions carried out a predefined commutation sequence. A corresponding six step sequence for 360° of electrical rotation can be achieved with a control circuit having a two output Hall device based sensor. The sensible system for this arrangement is integrated into the rotor and incorporates the noted regions of no significant axial magnetic field intensity by providing the noted gaps in the edge of the rotor. This six step sequence arrangement is carried out by providing the cutouts or notches of no magnetic influence in the middle of the north rotor pole and south rotor pole at the sensible system disposed edge region of the rotor magnet. Looking to FIG. 46, such a sensible system is represented in general fashion in developed form at 1120. A six step sequence for paired rotor north and south poles is identified at level 1122. Correspondingly, magnetic field intensities are represented at level 1124 and the associated output logic states are represented at level 1126.

The field intensity diagram at level 1124, as before, shows the Hall device with operate and release levels shown respectively at 1128 and 1130 within a south polar field intensity; and operate and release levels shown respectively at 1132 and 1134 within the north polar field of influence. Near zero field values at the regions of no magnetic influence on the sensor are represented at line 1136. Operate and release levels 1128 and 1130 are shown providing an output H1, while operate and release levels 1132 and 1134 are shown as providing output H2. At level 1126, outputs H1 and H2 reappear in conjunction with logic states 1,0 and arcs representing transitions which are read by the dual output Hall based control system. In this regard, assuming rotation is represented as left to right, transition or step 1 is represented on the approximational curve at line 1138 extending from the south polar field to the north polar field and switching respective outputs H1 and H2 to 1 and 0 from the previous 0 and 1 states. The next transition extends as represented at curve component 1140 from the north polar field to the near 0 field to switch the H1, H2 outputs to 1, 1. This transition occurs as the sensor reads the transition from a north polar field to a near 0 field at the cutout of step 2, to provide the H1, H2 output of 1, 1. Next, the step three transition is represented at curve portion 1142 occurring when the H2 sensor reads the transition from near 0 field at the cutout or notch to a north polar field to produce the H1, H2 outputs 1, 0. The step 4 transition is represented at curve portion 1144 and occurs as the sensors read the junction between the north polar field and south polar field to produce H1, H2 outputs 0, 1. The transition to step 5 is represented at curve portion 1146 and occurs as the H1 sensor meets the transition from a south polar field to a near 0 field at the cutaway within the south polar magnetic region. The transition to step 6 is represented at curve portion 1148 extending from the near 0 field to south polar field influence. This transition is read by sensor H1 as it moves from reading a zero field within a cutaway or notch and into a south polar field influence to produce H1, H2 outputs 0, 1. The sensing process then repeats itself. It can be noted that two different magnetic regions exist in every 120° of electrical rotation to generate the six transitions in 360° of electrical rotation. Those regions consist of a north and a south detected region, or an absence of any detected field due to the notches and a north or a south detected region.

Figure 47:
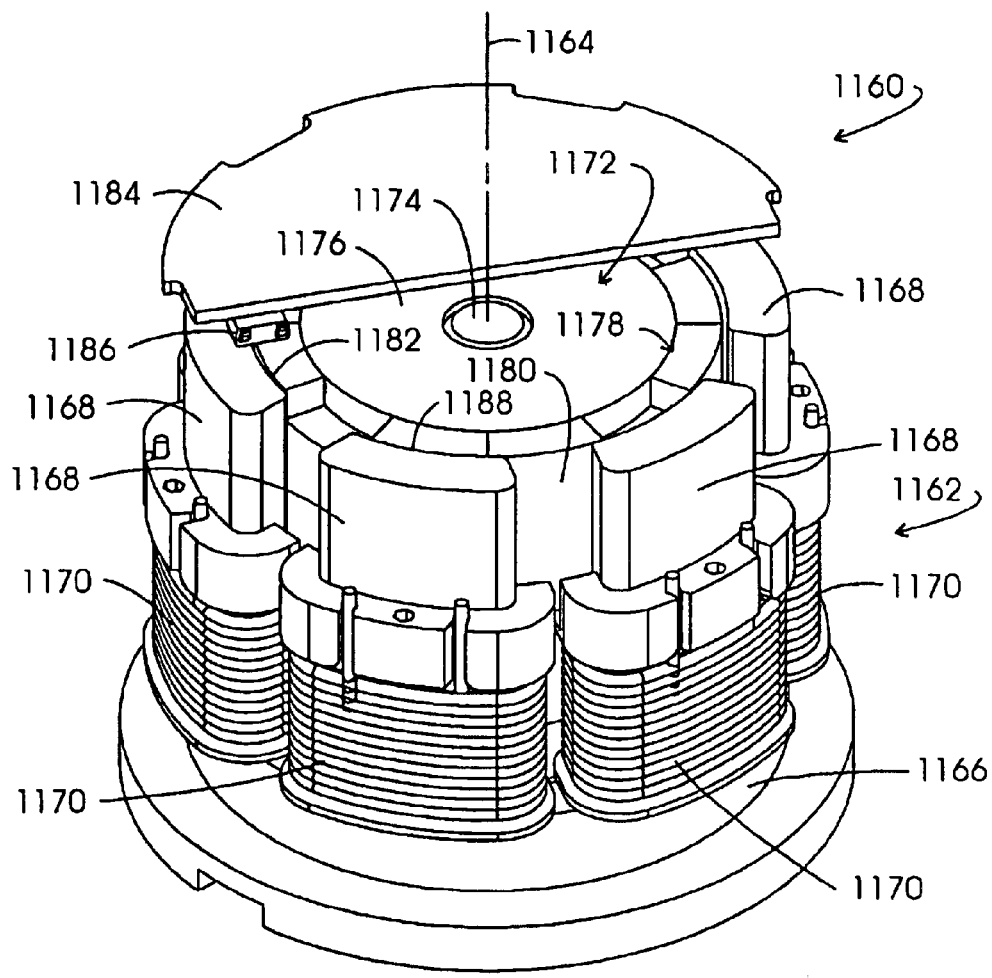
FIG. 47 is a pictorial representation of a motor according to the invention incorporating the sensible system described in connection with FIG. 46.
Figure 48:
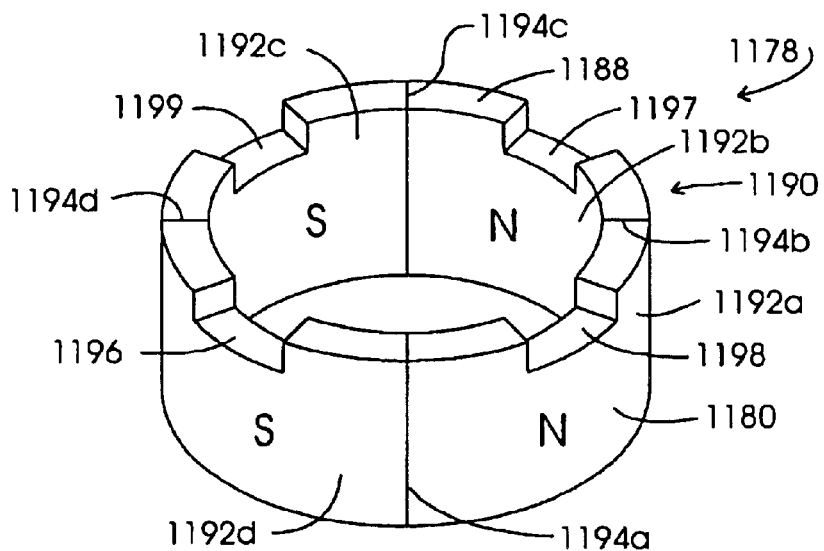
FIG. 48 is a pictorial representation of the permanent magnet employed with the motor of FIG. 47 showing an integrally formed sensible system.

Referring to FIGS. 47 and 48, this six step transition based sensible system approach is portrayed in conjunction with a motor represented generally at 1160. Configured in the manner of motor 10 shown in FIGS. 1 and 2, motor 1160 incorporates a six pole array of vertical stator assemblies represented in general at 1162 arranged about a motor axis 1164. Each of the stator assemblies is formed having core components and backiron regions fashioned with the earlier described pressed processed powder technology and in this regard, the core components extend from backiron region 1166 to flux interaction regions certain of which are shown at 1168. Intermediate the flux interaction regions 1168 and backiron region 1166 are six winding regions (not shown) about which are positioned bobbin mounted field windings certain of which are revealed at 1170. A motor shaft 1174 is seen extending about axis 1164. Upon this shaft there is mounted a rotor represented in general at 1172 having a backiron region 1176 extending to a cylindrically shaped permanent magnet represented generally at 1178. Permanent magnet 1178 is revealed in perspective fashion in FIG. 48 and is seen to have a radially outwardly disposed confronting magnetic surface 1180 spaced from the inward faces of flux interaction regions 1168 to define a working gap 1182. A cover 1184 supports a chip implemented control circuit 1186 at a location positioning the two output Hall sensor in alignment over the gap 1182 and slightly above the uppermost edge 1188 of permanent magnet 1178. So arranged, the dual output Hall sensor at circuit 1186 can read leakage flux extending over the edge 1188 of the permanent magnet at locations where no notches or cutouts are present. Where those cutout regions are under the sensor, then the noted near 0 field output will be present.

Figure 46:
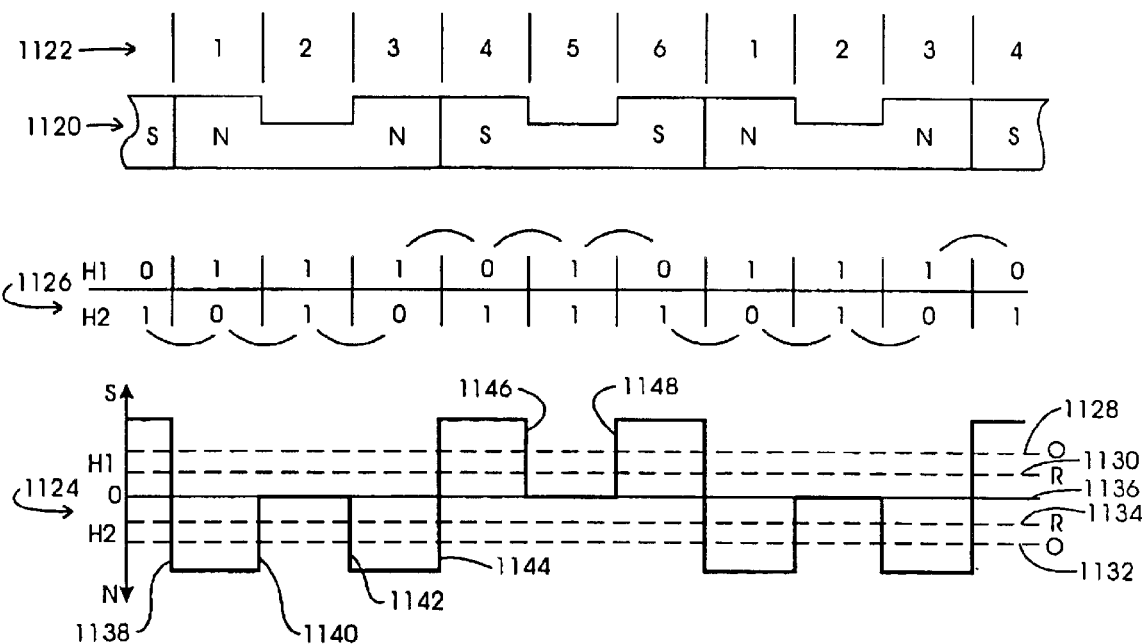
FIG. 46 is a timing diagram for a transition based sensible system according to the invention.

FIG. 48 reveals that the motor permanent magnet 1178 incorporates an upwardly disposed sensible system region represented generally at 1190 which is patterned in consonance with developed sensible system shown at level 1120 in FIG. 46. The permanent magnet 1178 is seen to be configured with four radial magnetized magnetic regions of alternating polarity as represented at 1192*a*–1192*d*. Regions 1192*a*–1192*d* are delineated by junctions 1194*a*–1194*d*. Cutouts or notches defining a near 0 field to the two output Hall sensor of control circuit 1186 for the south outwardly facing polar regions are shown at 1196 and 1197 as being centered within respective regions 1192*d* and 1192*b*. Correspondingly, cutouts or notches 1198 and 1199 are seen to be centered within north outwardly facing polar sense magnetic regions identified respectively at 1192*a* and 1192*c*. Thus the sensible system configuration described at level 1120 in FIG. 46 is provided. In general, the sensor at control circuit 1186 will be positioned about ½ millimeter above the uppermost edge 1188 of permanent magnet 1178 and will be located about 2 millimeters away from the upper edge of the slots when reading a near 0 field condition.

Since certain changes may be made in the above described apparatus, method and system without departing from the scope of the invention herein involved, it is intended that all matter contained in the description thereof or shown in the accompanying drawings shall be interpreted as illustrative and not in a limiting sense.

What is claimed is:

1. A method for commutating an electronically commutated multiphase electric motor having a rotor rotatable about a motor axis and a stator assembly configured with stator windings defining phases, comprising the steps of:
    (a) providing a sensible system rotatable in correspondence with the rotation of said rotor and having phase commutating information defining sensible transitions at the commencement of each of said phases as they occur in commutational succession;
    (b) providing a single sensor operatively associated with said sensible system, having a sensor output altering between sensor states in response to said sensible system transitions;
    (c) identifying a starting phase for energizing said stator windings to cause said rotor to rotate about said motor axis in a given direction;
    (d) commencing the operation of said motor by energizing those said stator windings establishing an aligning phase occurring prior to said identified starting phase in said commutational succession to an extent effective to cause said rotor to rotate toward a magnetically stable position exhibiting substantially zero torque;
    (e) then de-energizing said stator windings representing said aligning phase and energizing said stator windings representing said starting phase; and
    (f) energizing only those said stator windings representing a next phase in said commutational succession in response to said sensor output.

2. The method of claim 1 in which:
    said step (a) sensible system phase commutating information is provided as magnetic regions of first and second magnetic polarity; and
    said step (b) provides said sensor as a Hall effect device.

3. The method of claim 2 in which:

said step (a) provides said regions of first and second magnetic polarity in integral form with said rotor regions of alternating polarity.

4. The method of claim 2 in which:

said step (a) provides said regions of first and second magnetic polarity as a slave magnet assembly drivably rotatable in correspondence with the rotation of said rotor.

5. The method of claim 1 in which:

said step (b) provides said sensor as an optical detector; and said step (a) sensible system phase commutating information is provided as optically detectable transitions.

6. A method for commutating a multiphase electronically commutated electric motor having a rotor rotatable about a motor axis and a stator assembly configured with energizable stator windings, comprising the steps of:

providing a sensible system rotatable in correspondence with the rotation of said rotor and having a reference sensing attribute defining a reference phase and a phase commutating attribute corresponding with the commencement of each phase in a commutation sequence of phases;

providing a sensor having an output with a first attribute in the presence of said sensible system reference sensing attribute and having a second attribute in correspondence with said phase commutating attribute;

mandatorily energizing those said stator windings representing said reference phase in the presence of said output with said first attribute; and de-energizing those said stator windings representing said reference phase upon the occurrence of said output having said second attribute in the absence of said first attribute and then successively energizing those said stator windings representing subsequent phases in said commutation sequences.

7. The method of claim 6 in which:

said step for providing a sensible system provides said reference sensing attribute once within each 360° of electrical rotation of said rotor.

8. The method of claim 6 in which:

said step for providing a sensible system provides said reference sensing attribute once within each 360° of rotation of said rotor.

9. The method of claim 6 in which:

said step for providing a sensor provides said sensor as a Hall effect device; and said step for providing a sensible system provides said reference sensing attribute as a magnetic region corresponding with a first rotor rotational extent and of first magnetic polarity.

10. The method of claim 6 in which:

said step for providing a sensor provides said sensor as an optical sensor; and said step for providing a sensible system provides said reference sensing attribute as a uniform optical characteristic region corresponding with a first rotor rotational extent.

11. The method of claim 10 in which:

said step for providing a sensible system provides said phase commutating attribute as a second region of rotationally shorter uniform optical characteristic with the same optical path property as said first rotor rotational extent.

12. The method of claim 9 in which:

said step for providing a sensible system provides said phase commutating attribute as a magnetic region corresponding with a second rotor rotational extent and of said first magnetic polarity.

13. The method of claim 12 in which:

said step for providing a sensible system provides said magnetic region corresponding with said first rotor rotational extent as being greater in extent than said second rotor rotational extent.

14. The method of claim 6 further comprising the steps of:

identifying a starting phase for energizing said stator winding to cause said rotor to rotate about said motor axis in a select direction;

commencing the operation of said motor by energizing those said stator windings representing an aligning phase occurring prior to said identified starting phase in said commutation sequence of phases for an alignment interval effective to cause said rotor to rotate toward a stable position within said alignment phase exhibiting substantially zero torque wherein said rotor is oriented to derive rotational torque upon energization of said stator windings of said starting phase; and de-energizing said stator windings representing said aligning phase and energizing said stator windings representing said starting phase.

15. The method of claim 14 in which:

said step for identifying a starting phase, identifies said starting phase as said reference phase.

16. The method of claim 13 in which:

said step for providing a sensible system provides each said magnetic region in integral relationship with rotor regions of alternating magnetic polarity.

17. A control system for the electrical commutation of a multiphase motor having a rotor and a stator assembly comprising:

a sensible system having sensible information transitions which are equal in number to or greater than the number of said motor phases for each 360° of electrical rotation of said rotor;

a single sensor with at least a single output responsive to said transitions to provide sensor output signals; and a control circuit configured to process said sensor outputs into sequencial motor phase switching command outputs.

18. The control system of claim 17 in which said single sensor is combined with said control circuit in the form of an integrated circuit.

19. The control system of claim 17 in which said single sensor comprise a single Hall effect device and said sensible system comprises magnetic regions.

20. The control system of claim 18 in which said integrated circuit includes power switching devices which control current flow to said electric phases of said motor.

21. The control system of claim 17 in which said control circuit controls at least three discreet power switching devices that effect current flow in said electrical phases of said motor.

22. The control system of claim 17 in which said sensor and said control circuit are combined within the confines of said motor.

23. The control system of claim 17 in which:

said motor is configured for three-phase operation; and said sensible system contains six said sensible information transitions in 360° of electrical rotation of said rotor.

24. The control system of claim 17 in which:
said sensible system is configured with six sensible information transitions in 360° of electrical rotation of said rotor; and
said control circuit is configured with six outputs to effect energization of said multiphase motor in a three phase bipolar form.

25. The control system of claim 17 in which:
said motor is configured for four-phase unipolar operation; and
said sensible system contains four said sensible information transitions in 360° of electrical rotation of said rotor.

26. The control system of claim 17 in which:
said motor is configured for two-phase bipolar operation; and
said sensible system contains four said sensible information transitions in 360° of electrical rotation of said rotor.

27. The control system of claim 17 in which:
said single sensor is an optical device; and
said sensible system transitions comprise optically detectable transitions.

28. The control system of claim 17 in which said sensible information transitions comprise alternating areas of magnetic field polarity.

29. The control system of claim 17 in which:
said sensible system sensible information transitions are comprised of the presence of a magnetic field polarity and the substantial non-presence thereof.

30. The control system of claim 17 in which:
said sensible system sensible comprises magnetic regions of two polarities and one of said polarities contains flux intensities of two different levels occurring in 360° of electrical rotation of said rotor.

31. The control system of claim 19 in which:
said single sensor is configured to provide two or more said output signals, each said output signal being derived at a unique magnetic sensitivity level.

32. The control system of claim 31 in which:
said Hall effect device is configured with a single Hall plate in an assembly deriving two or more levels of sensitivity to magnetic field intensities encountered at said sensible system, each said level differing from any other such level by at least about 50 Gauss.

33. The control system of claim 31 in which:
said Hall effect device is configured with two or more Hall plates on a monolithic substrate.

34. The control system of claim 31 in which:
said single sensor is comprised of two or more Hall effect circuits positioned in a single integrated circuit package.

35. A motor commutational control circuit for use with a sensible system having three unique magnetic level regions in 360° of electrical rotation of the rotor of said motor and rotatable in correspondence with the rotation of said rotor to provide multiphase motor performance, said circuit comprising:
a Hall effect sensor based network in a single location responsive to said magnetic level regions to provide information to motor control logic circuitry to effect energization of a predetermined motor phase associated with each of said three unique magnetic level regions, said Hall effect sensor based network being located in a single semiconductor package.

36. The motor commutational control circuit of claim 35, in which:
said Hall effect sensor based network and said motor control logic circuitry are combined in a monolithic integrated circuit.

37. The motor commutational control circuit of claim 35, in which:
said Hall effect sensor based network contains two outputs each responsive to a different magnetic polarity.

38. A motor commutational control circuit for use with a sensible system having four unique magnetic level regions in 360° of electrical rotation of the rotor of said motor and rotatable in correspondence with the rotation of said rotor to provide four-phase unipolar or two phase bipolar motor performance said circuit comprising:
a Hall effect sensor based network in a single location responsive to said magnetic level regions to provide information to motor control logic circuitry to effect energization of a predetermined motor phase associated with each of said four unique magnetic level regions, said Hall effect sensor based network being located in a single semiconductor package.

39. A Hall effect sensor based motor control circuit, comprising:
a sensing network including a Hall effect device with one or more Hall plates responsive to flux intensity of given levels and polar sense of an encountered magnetic field to provide Hall plate output or outputs corresponding with said flux intensity and polar sense;
an amplification and level detecting network responsive to said Hall plate output or outputs and deriving therefrom two or more differing sensitivity, level detecting network outputs, each said network outputs differing in sensitivity level by about 50 or more Gauss; and
control circuit with logic responsive to said network outputs to provide motor drive output signals for multiphase motor operation.

40. The Hall effect sensor based motor control circuit of claim 39 in which:
said amplification and level detecting network sensitivity levels comprise first operate and release levels responsive in the presence of a first said polar sense and a first said flux intensity to provide a first said network output; and
second operate and release levels at least one of which is responsive in the presence of a second said polar sense and a second said flux intensity to provide a second said network output.

41. A control system for an electronically commutated three phase unipolar driven electric motor having a permanent magnet rotor rotatable about a motor axis and a stator assembly configured with stator windings arranged for three phase unipolar operation comprising:
a permanent magnet based sensible system rotatable in correspondence with the rotation of said rotor and having phase commutating information defined by three distinct sensible regions in 360° of electrical rotation;
at least a single magnetic sensing sensor circuit located in a single position with first and second outputs each responsive to different flux levels from said sensible system to define a succession of three distinct combined logic states when under the operational influence of said sensible system; and
a control circuit coupled with said single sensor circuit said first and second outputs to effect an operational sequencing drive to three outputs providing said three phase unipolar driven electric motor operation.

42. The sensor circuit and control circuit of claim 41 which are integrated on a monolithic silicon die.

43. The control system of claim 41 in which:

said sensible system is formed as an integral part of said permanent magnet rotor.

44. The control system of claim 43 in which:

said permanent magnet rotor is radially magnetized and said sensible system with said three distinct sensible regions are each of approximately 120° in electrical length and two of said regions are comprised of the permanent magnet material as radially magnetized and the third region is composed of an absence of said permanent magnet material on an axial end edge of said radially magnetized said permanent magnet.

45. The control system of claim 44 in which:

said sensor is located adjacent to said axial end edge of said permanent magnet and is set to detect the axial flux field or lack of field present at said axial end edge comprising said sensible system.

46. The control system of claim 41 in which:

said sensor said first and second outputs combine to create three distinct digital codes when under the operational influence of said sensible system said three distinct sensible regions in 360° of electrical rotation; and said three distinct digital codes combine with said control circuit to effect said operational sequencing drive.

47. The control system of claim 41 in which:

said permanent magnet based sensible system is formed of a permanent magnet separate from said permanent magnet rotor and provides said three distinct sensible regions as read by said sensor as a region of magnetic field intensity of one polar sense, a region of no significant magnetic field intensity and a region of magnetic field intensity of a second polar sense.

48. The control system of claim 41 in which:

said permanent magnet based sensible system is formed of a permanent magnet separate from said permanent magnet rotor which provides said three distinct regions as read by said sensor as a first region of magnetic field intensity of one polar sense, a second region of the same polar sense but of lesser field magnitude by about ½ to ⅓ of said first region and a third region of magnetic field intensity of a second polar sense.

* * * * *